Feb. 27, 1951 A. H. BUCKLEY 2,543,435

RECORD FORMING, TRANSLATING AND PRINTING APPARATUS, AND AUTOMATIC CONTROL MECHANISMS THEREFOR

Filed Dec. 29, 1945 12 Sheets-Sheet 1

Arthur H. Buckley

Peck & Peck Attorneys

Feb. 27, 1951 A. H. BUCKLEY 2,543,435

RECORD FORMING, TRANSLATING AND PRINTING APPARATUS, AND AUTOMATIC CONTROL MECHANISMS THEREFOR

Filed Dec. 29, 1945 12 Sheets-Sheet 2

Inventor

Arthur H. Buckley

By Peck + Peck

Attorneys

Feb. 27, 1951 A. H. BUCKLEY 2,543,435

RECORD FORMING, TRANSLATING AND PRINTING APPARATUS, AND AUTOMATIC CONTROL MECHANISMS THEREFOR

Filed Dec. 29, 1945 12 Sheets-Sheet 3

Inventor

Arthur H. Buckley

By Peck + Peck

Attorneys

Inventor
Arthur H. Buckley
By Peck + Peck
Attorneys

Feb. 27, 1951 A. H. BUCKLEY 2,543,435

RECORD FORMING, TRANSLATING AND PRINTING APPARATUS, AND AUTOMATIC CONTROL MECHANISMS THEREFOR

Filed Dec. 29, 1945 12 Sheets-Sheet 5

Inventor

Arthur H. Buckley

By Peck + Peck Attorneys

Feb. 27, 1951 A. H. BUCKLEY 2,543,435

RECORD FORMING, TRANSLATING AND PRINTING APPARATUS, AND AUTOMATIC CONTROL MECHANISMS THEREFOR

Filed Dec. 29, 1945 12 Sheets-Sheet 6

Inventor

Arthur H. Buckley

By Peck + Peck

Attorneys

Inventor
Arthur H. Buckley
By
Peck + Peck
Attorneys

Feb. 27, 1951 A. H. BUCKLEY 2,543,435

RECORD FORMING, TRANSLATING AND PRINTING APPARATUS, AND AUTOMATIC CONTROL MECHANISMS THEREFOR

Filed Dec. 29, 1945 12 Sheets-Sheet 8

Inventor
Arthur H. Buckley
By Peck + Peck
Attorneys

Feb. 27, 1951 A. H. BUCKLEY 2,543,435

RECORD FORMING, TRANSLATING AND PRINTING APPARATUS, AND AUTOMATIC CONTROL MECHANISMS THEREFOR

Filed Dec. 29, 1945 12 Sheets-Sheet 9

Inventor

Arthur H. Buckley

By Peck & Peck

Attorneys

Feb. 27, 1951 A. H. BUCKLEY 2,543,435

RECORD FORMING, TRANSLATING AND PRINTING APPARATUS, AND AUTOMATIC CONTROL MECHANISMS THEREFOR

Filed Dec. 29, 1945 12 Sheets-Sheet 10

By Arthur H. Buckley

Peck + Peck Attorneys

Inventor
Arthur H. Buckley
By Peck + Peck
Attorneys

Inventor
Arthur H. Buckley
By Peck + Peck
Attorneys.

Patented Feb. 27, 1951 2,543,435

UNITED STATES PATENT OFFICE 2,543,435

RECORD FORMING, TRANSLATING AND PRINTING APPARATUS, AND AUTOMATIC CONTROL MECHANISMS THEREFOR

Arthur H. Buckley, Chicago, Ill., assignor to George Gorton Machine Co., Racine, Wis., a corporation of Wisconsin Application December 29, 1945, Serial No. 638,202

60 Claims. (Cl. 164—113)

This invention relates to certain improvements in and relating to record forming, translating and printing apparatus, and automatic control mechanisms therefor; and the nature and objects of the invention will be readily recognized and understood by those skilled in the arts to which the invention relates, in the light of the following explanation and detailed description of the accompanying drawings illustrating what I at present consider to be the preferred embodiments and mechanical and electrical expressions of my invention, from among various other embodiments, forms, designs, constructions, combinations and arrangements, of which my invention is capable and adapted within the broad spirit and scope thereof.

Basically my present invention is directed to, and has as a general object, the provision of a unitary apparatus for operative association and combination with a typewriter, preferably a typewriter of the so-called "motorized" type, or with some other suitable or adaptable type of printing or writing unit, by which an operator through manual operation of the keys of a keyboard separate and, if desired, remote from the typewriter or other printing or writing unit, and including keys duplicating or representing all of the typewriter printing or typing characters and typewriter functions, respectively, of the typewriter, can encode a message or other intelligence onto a record tape in the form of successive groups of perforations spaced apart longitudinally of the tape, with the perforations of each group arranged in accordance with a predetermined code designation for the typewriter printing character or typewriter function represented by that key of the keyboard of the unitary apparatus that has been actuated by the operator, and by which unitary apparatus such a perforated record tape, when the coding of the desired message thereon has been completed, can then after the perforated tape has been put into a translator be automatically translated into the character printing and functional operations of the typewriter respectively corresponding to the groups of code perforations in the record tape to cause fully automatic functioning and operation of the typewriter to print or type and set up the message or intelligence encoded on the record tape in accordance with the code perforations formed therein, with accuracy and a high rate of speed of typing.

And, a further general object of the invention is to provide such an apparatus which is composed of simple mechanical and electrical mechanisms having a minimum of parts and elements so as to require a minimum of maintenance and repair while attaining and maintaining accuracy and speed of operation with a minimum of false or erroneous operations over extended periods of continuous or of intermittent operations; and which apparatus is of compact form and of overall dimensions to occupy a minimum of space, so that the apparatus may, if desired, be practically positioned and located adjacent and grouped with a typewriter, and may be readily operatively associated, combined and connected with a conventional or standard typewriter, and which apparatus, when so combined, associated and connected with a typewriter, will not interfere with or prevent normal, conventional manual operation of the typewriter by the operator, and which may be completely disconnected from the typewriter with a minimum of effort in a relatively short period of time.

Also, an alternate feature of my present invention resides in an arrangement by which the manual actuation by an operator of the keys of the keyboard for operating the punching apparatus can, at the option of the operator, be caused to simultaneously and automatically operate the character type and typewriter function actuating levers of the typewriter to cause the typewriter to print or type and set up the message or intelligence being encoded on a record tape by the manual operation by the operator of the keys of the keyboard of the unitary apparatus, so that the typewriter prints or types and sets up the message being encoded on the record tape as the operator actuates the said keyboard to "spell out" the message.

Another characteristic and a feature of the invention resides in the provision of such a record forming, translating and printing apparatus, by which an operator may encode a message on a record tape by manual operation of the keyboard for operating the punching apparatus, and may then cause the apparatus to automatically translate such record tape with the encoded message thereon into the required character and functional operations of the typewriter to cause the typewriter to automatically print or type and set up the exact message encoded on the record tape, and which apparatus may, at the option of the operator, be also caused to function to automatically and simultaneously with the translation of the record tape, prepare and form a duplicate record tape of the record tape being translated, so that, if desired, any number of such duplicate record tapes may be automatically accurately formed by the apparatus by "re-translating" a record tape with the apparatus for each duplicate record tape desired therefrom.

The invention is further featured by the fact that if desired, the keyboard for operating the punching apparatus may also be utilized as the keyboard for a normally unitary keyboard operated typewriter associated and combined with the apparatus, so that the keyboard of a typewriter, or other manually operable printing or typing unit for operative association with an apparatus of the invention, may be entirely eliminated as such and all manual typing with the typewriter carried out from the keyboard of the punching apparatus by conventional manual operation of such keyboard.

A further feature of an apparatus of the invention is found in the design, arrangement and construction of the mechanisms for forming the perforated record and for translating such record into the corresponding character and functional operations of the typewriter, by which it is possible to utilize standard motion picture film as a record tape and thus take advantage of the relatively narrow widths of such film, motion picture film being a readily obtainable stock article of commerce and being formed and sold prepared with standard size and spacing of sprocket holes spaced longitudinally of the film along and adjacent the opposite longitudinal edges of the film, so that, by this feature of the invention not only is the necessity of preparing special record tape with the attendant high cost avoided, but the several physical characteristics inherent in motion picture film favorable to its use as a record tape for such apparatus, are utilized to add to the efficiency as well as the low cost of operation of apparatus of the invention.

Another feature of the invention is found in the design and arrangement of the record tape perforating and tape feeding mechanism which is actuated and controlled by and from a keyboard, through the medium of electro-mechanical means including a code mechanism selectively controlled by the keys of the keyboard, by which only a small number of punches relative to the total number of character printing and functional operations of the typewriter, is required, so that such punches can be positioned closely together in parallel relation in a plane disposed transversely across and perpendicular to the plane of the path of the feed movement of the record tape past the punches, with the result that a tape of relatively narrow width, such, for example, as a standard 35 mm. motion picture film, may be efficiently utilized as the record tape by selectively permutably operating punches of the series of punches by selective manual actuation of the keys of the keyboard, in order to form transverse groups of perforations across the tape respectively spaced apart longitudinally of the tape; and further by which a record tape feed roller is provided having sprocket teeth therearound adjacent opposite ends thereof for engaging the longitudinal rows of sprocket holes in the record tape along the opposite longitudinal edges of the tape, so that the tape may be fed step by step past the row of punches by intermittent partial revolutions of the feed roller to successively move the tape to successive positions for tape perforating operations of the punches.

The record tape punching and feeding mechanism is characterized by the provision of tape perforating punches, each of which is automatically returned upon the completion of a tape punching stroke to its inactive position for the next punching stroke by an individual spring unit which is placed under tension by the movement of the punch on its punching stroke, and a feature of the invention resides in the mounting and association of such spring units on their respective punches, in such a manner that sufficiently heavy spring units may be employed for exerting the required forces for effecting the return strokes of the punches, while permitting the punches to be positioned close together in a row or line in parallel relation with a minimum spacing for operating clearance therebetween, so that the punches may be grouped together in position to form transverse rows of perforations across the width of relatively narrow tape; between opposite longitudinal edge rows of sprocket holes in the tape, such as, for example, a tape formed from standard 35 mm. motion picture film.

In accordance with another feature, the record tape punching and feeding mechanism includes means by which the tape feeding mechanism can be operated to feed the tape through the punching mechanism without causing actuation of the punching mechanism, a manually operable key 28 being provided, preferably on the keyboard of the apparatus, for controlling an electrical switch in the control circuits for the record tape feed mechanism of the record tape punching means, so that an operator can by intermittently actuating said key cause the tape feed mechanism to feed the record tape step by step through, but without causing actuation of, the punching mechanism.

Another feature of the record tape punching and feeding mechanism resides in the arrangement of the operating lever for effecting the intermittent partial revolutions of the feed roller to cause step by step feed of the tape through the mechinsm, by which such operating lever is actuated on its feeding stroke by the forces generated by a spring unit which has been placed under tension prior to the feeding stroke of the lever, and is withdrawn upon completion of a feeding stroke during a perforating operation of the punches, by the armature of an energized electro-magnet, so as to again place the spring unit under tension to condition the unit for actuating such lever on the next feeding stroke thereof.

In connection with the record tape perforating and tape feeding mechanism, the invention is featured by the association with such mechanism of a semi-automatic gauging switch that simplifies and materially assists in obtaining the correct alignment of the record tape on the translating feed roller of the translator mechanism, so that the use of standard tape or film having sprocket holes of standard dimensions and spacing therein, such as standard motion picture film, is rendered practical and efficient for the apparatus.

An apparatus of my invention also embodies as a feature thereof, a translating mechanism of the motorized type for causing the translation of a perforated record tape into character printing and functional operations of the typewriter to type and set up the message encoded on the record tape, through the medium of electro-mechanical means operatively associating the translating mechanism with the typewriter, which translating mechanism embodies a translating feed roller having sprocket teeth therearound for engaging the sprocket holes of the record tape, with the feed roller providing electrical conducting material to form a portion of the electrical circuits of the electro-mechanical means which associates the translating mechanism with the typewriter, and with the electrical contacts engaging the conducting surface of the feed roller through perforations in a record tape being fed by said roller, to close electrical circuits through the roller conducting surface to cause translation of the record tape perforations into electrical impulses for actuating the electro-mechanical mechanism associated with the typewriter, so that the feed roller not only functions as such but also functions as a part of the electrical control circuits, thus reducing materially the number of parts and elements and associated wiring required to effect the desired functions, as well as increasing the accuracy and efficiency of the translating operation.

The invention is further featured by an arrangement of the translating mechanism in which a continuously driven motor actuates the translating feed roller in intermittent steps through partial revolutions to accurately successively place the transverse rows of code perforations in the record into operative alignment with the electrical contacts for engaging the conducting surface of the feed roller through the tape perforations, and in the provision of a cyclically actuated cam switch controlling the circuits through the feed roller, arranged and timed to close such circuits as the feed roller comes to rest with a row of perforations in alignment with the feed roller engaging contacts, and to open such circuits just at the moment the next rotation of the feed roller and the feed movement of the record tape starts, so that the contacts are not required to make contact with the feed roller simultaneously as they enter the perforations in the record tape, and the cam actuated switch thus insures positive contact over a large range of alignment discrepancy between the several contacts entering and leaving not quite simultaneously, a row of perforations in the record tape.

A further feature of the invention in connection with the translating mechanism and the translating feed roller thereof, resides in an arrangement by which the electrical circuits through the conducting surface of the feed roller and the contacts for engagement with such surface are broken or opened at a point in the circuits remote from the points of contact between the feed roller conducting surface and the contacts; and further by which such circuits are not closed until after the contacts are in engagement through perforations in a record tape, with the conducting surface of the roller, and are opened before the disengagement of the contacts with the conducting surface of the feed roller, so that arcing and possible carbonizing of the conducting surface of the contacts, as well as possible ignition of the record tape by arcing, is avoided.

Another feature of the translating mechanism is found in the mounting and arrangement of the translating feed roller and the drive mechanism for intermittently rotating the roller through partial revolutions for feeding the tape step by step, by which the feed roller may be freely rotated manually in one direction independently of the drive mechanism, so that an index or starter line provided on the surface of the roller may be accurately positioned for locating a perforated record tape in proper starting position on the feed roller (see Fig. 3*a*).

The invention presents as a further feature the provision of an arrangement of motor circuits for controlling the motor driving the record tape translating mechanism by which the motor can be caused to run at different rates of speed, together with a simple manually operable switch for selectively controlling said motor circuits, respectively, so that the motor can be operated to translate a record tape at different rates of speed, one of which rates of speed is desirable for automatic typing from a perforated record being translated, while the other of such rates of speed is preferable when operating the apparatus to duplicate a record tape in the tape punching mechanism from a perforated record being translated on the translating mechanism, with the result that the apparatus provides for operating the translating mechanism at maximum speed for either of two essentially different operations of which the apparatus of the invention is capable.

Another feature of the invention is presented by the provision of means for automatically rendering unresponsive the manual electrical controls in the punch device for actuating the character printing and functional operations of the typewriter while a record tape is being translated by the translating mechanism, so as to prevent false operations of the apparatus by careless or accidental pressure on or actuation of the keys of the keyboard of the punching apparatus.

Another feature is the provision of automatic means responsive to a predetermined characterized group of perforations in a record tape for stopping the motor driving the translating mechanism during translation of a record tape, so that by forming such a group of perforations at the end of an encoded message, the operation of the translating mechanism and of the typewriter is automatically stopped at the desired time; and further in providing a manually operated key on the keyboard of the apparatus for actuation to cause the punching mechanism to punch such group of perforations in a record tape on which a message is being encoded.

A feature also resides in the arrangement of the automatic control mechanism, by which one electrical relay unit functions to stop operation of the driving motor for the record tape translating mechanism, either through manual actuation by the operator of an electrical switch, or by the establishment of electrical circuits to the relay from and through the translating mechanism, by a stop code signal group of perforations in the record tape being translated; and further by which starting of the drive motor of the translating mechanism is effected and carried out through the medium of the same relay by actuation of the same manual switch used for stopping the motor.

Another feature resides in the formation of the length of perforated tape on which a message has been encoded by the punching mechanism, into an endless tape of a character such that one end portion of the endless tape may be formed into a bight for fitting over and around the feed roller of the translating mechanism and the other end portion may be formed into a coil for mounting on a tape holding and feeding mechanism in such a manner that the endless tape extends between the translating feed roller and the tape holder and feeds from the coil on the holder to the translating feed roller and from the feed roller back to the coil, so that, with such an endless tape mounted in operative position on the translating mechanism, such mechanism can be continuously operated for repeated translation of the coded perforations in the endless record tape without removing the tape from or repositioning or adjusting the same on the translating and tape holding mechanism for each translating run thereof through the translaing mechanism.

A further feature is found in the design and arrangement of a record tape holding and feeding means for such an endless record tape, which enables the tape to be quickly mounted thereon by the operator simply placing the coiled end of the tape over the holder with the endless tape extending from the holder over and around the translating feed roller, in such a manner that the endless tape under the action of the feed roller moves from one side of the coiled end of the record tape holder, over and around the feed roller and back to the other side of the coil of tape on the holder, where it automatically winds itself back into the coil as the tape from the other end or side of the coil moves forward to the feed roller.

An apparatus embodying my present invention includes a plurality of solenoids, one for each character printing operation and one for each functional operation of the typewriter, with the armature of each solenoid operatively connected by a separate line or linkage with that key bar of the typewriter keyboard which is to be operated by such solenoid, together with a plurality of electrical relays adapted to be permutably energized for selectively causing the energization of any one of the solenoids; and one of the features of the invention resides in grouping the solenoids and relays into a compact unit and in mounting and locating such unit below and to the rear of the keyboard of the typewriter with the separate lines or linkages from the solenoid armatures suitably guided upwardly from the solenoids forwardly to the typewriter key bars, respectively, in such a manner that the solenoid and relay unit and the operating lines or linkages from the solenoids to the key bars of the typewriter keyboard will be removed from the space normally occupied by the legs of an operator seated in a normal position at the typewriter for manual operation thereof, so that the operator will be in no way inconvenienced either by the solenoid-relay unit or by the disposition of the lines or linkages connecting the keys of the typewriter keyboard with the solenoids of the unit.

In accordance with a further feature, a stand or desk is provided for receiving and positioning the typewriter, with the solenoid and relay unit concealed in the rear lower portion of such stand or unit and with the key bar operating lines or linkages from the solenoids to the key bars, respectively, of the keys of the typewriter keyboard, guided rearwardly from the keyboard across the upper side of and downwardly across the rear side of the normal knee-hole space provided by the stand or desk, to the solenoids of the unit, such lines being so guided over groups or sets of guides.

Another feature resides in the provision of an automatic code signal responsive means mounted on and included with the solenoid unit for actuation by the energization of that solenoid of the solenoid unit which operates the shift lock function of the typewriter, so as to automatically lock the type basket of the typewriter into upper case or capital type printing position, together with an automatic code signal responsive means for actuation by energization of that solenoid of the solenoid unit for operating the shift release function of the typewriter, so as to automatically unlock and release said automatic lock means to cause the type basket of the typewriter to return to its lower case or small type printing position.

Another feature is found in the circuit arrangements for the series of typewriter key bar operating solenoids by which the number of contacts and contact actuating mechanisms, necessary for full and complete selective energization of the solenoids, is materially reduced, through connecting the solenoids into a plurality of groups with the solenoids of each group connected in series, in such a manner that one set of movable contacts is utilized for selective control operation of the plurality of solenoids of each group, thus eliminating the requirement for a contact for each solenoid of the entire series of solenoids.

The invention is further featured by an arrangement of electrical circuits and electro-mechanical mechanisms through the medium of which the series of solenoids for selectively actuating the type and function operating levers, respectively, of the typewriter, and for selectively actuating the solenoid magnets for selectively operating the punches, respectively of the record tape perforating mechanism, can be simultaneously operated from the keyboard for the punching mechanism through the same set of electrical relays adapted to be selectively permutably controlled through a single code bar mechanism, which in turn is adapted to be selectively permutably operated by manual operation of the keys of the keyboard; and which arrangement is also such that the typewriter lever actuating solenoids and the solenoid magnets of the record tape perforating mechanism can be simultaneously operated by and through such set of electrical relays by the operation of the translating mechanism of the apparatus to translate a record tape.

Another feature resides in the arrangement of the controlling circuits of the translating mechanism driving motor, and in the provision in such circuits of a simple manually operated switch of the momentary contact type for starting and for stopping the motor through selective actuation of an electrical relay mechanism for opening and closing the motor control circuits.

With the foregoing general objects, features and results, as well as certain other objects, features and results in view, which will be readily apparent from the following detailed explanation and description, my invention consists in certain novel features in combinations and arrangements of mechanisms and units, and in subcombinations thereof, making up an apparatus of the invention, and in certain novel features in construction and arrangement of parts and elements of such mechanisms and units, and in various combinations of such parts and elements, all as will be more fully referred to and specified hereinafter. Referring to the accompanying drawings, in which similar reference characters refer to corresponding parts and elements throughout the several figures thereof:

Fig. 1 is a perspective view of a form of a keyboard controlled punching and record tape translating apparatus of my invention in operative combination and association with a motorized typewriter, the units of the apparatus and the typewriter being shown grouped in mounted, associated position on a suitable stand or desk.

Fig. 2 is a perspective view of the unit of the apparatus of the example of Fig. 1, which consists of the keyboard and coding mechanism, the record tape perforating mechanism, and the perforated record tape translating mechanism, together with elements of the electro-mechanical mechanisms and electrical circuits operatively associating and through which such mechanisms are controlled, the view having been taken from the rear of such unit with the housing or covering for the unit removed.

Figure 4:
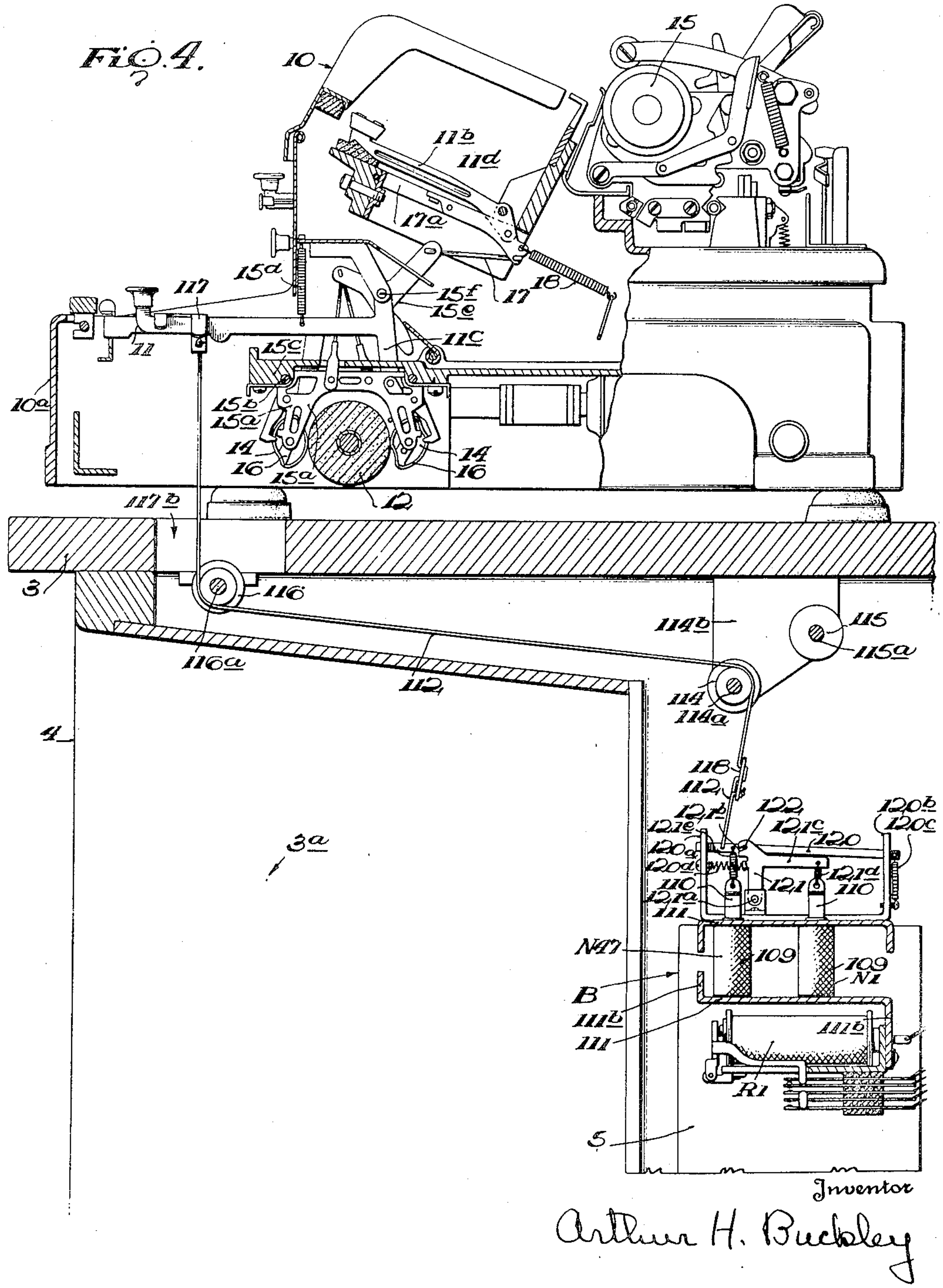

Fig. 4 is a vertical, transverse section through the motorized typewriter and the desk or stand on which it is mounted, and through the typewriter key bar actuating mechanism and the arrangement of key bar actuating lines or cables and the guiding rollers therefor, connecting such mechanism with the typewriter key bars, showing particularly the mechanism for actuating the shift lock and shift lock release bars of the typewriter.

Figure 5:
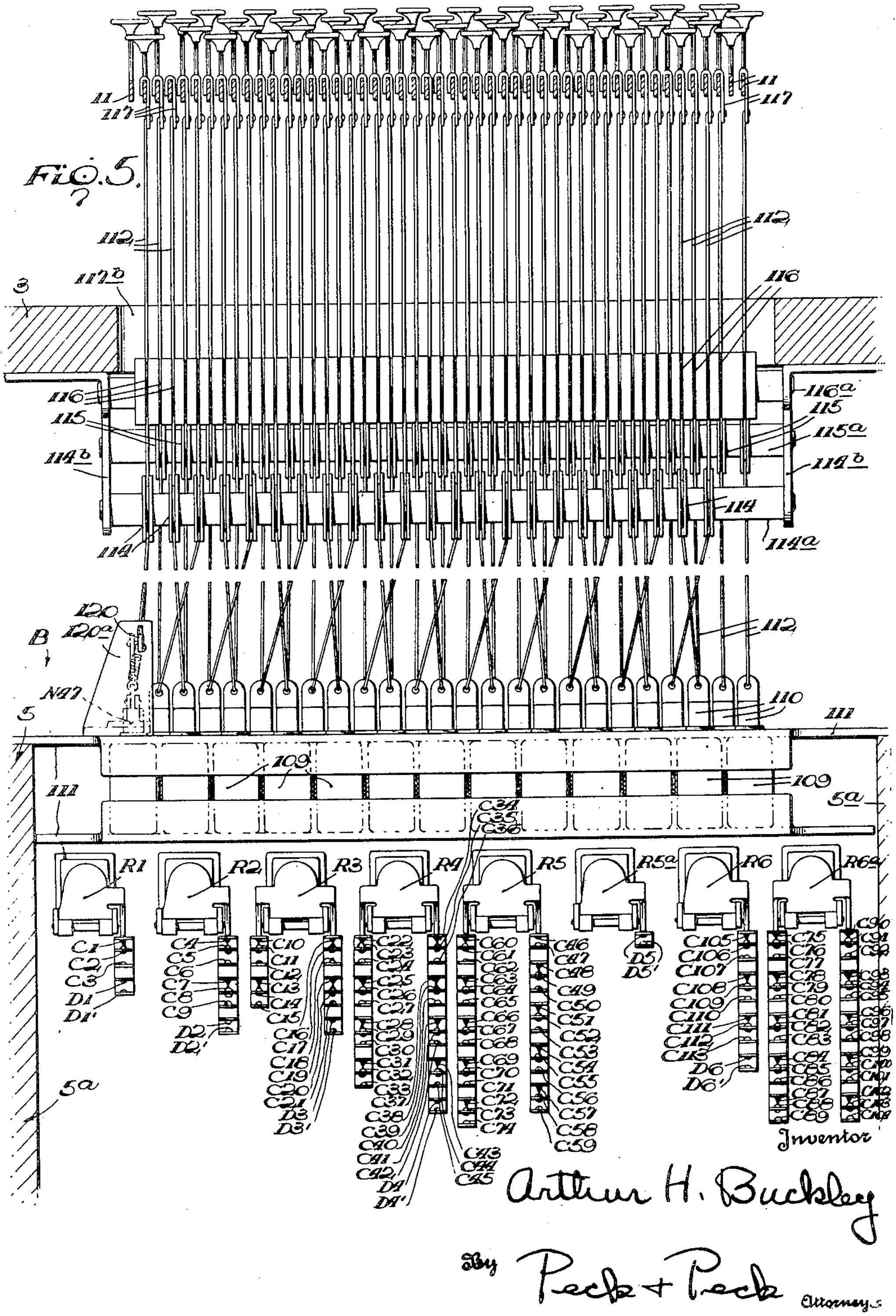

Fig. 5 is a view in front elevation of the typewriter lever actuating solenoids and the main set of electrical relays of the apparatus, assembled together into a unit mounted in the stand or desk below and to the rear of a typewriter, and showing the mounting and arrangement of the flexible cords or linkages and the guides therefor, from each solenoid to the typewriter keyboard, the key levers of the typewriter keyboard being schematically illustrated in connected relation with the solenoid actuated, flexible lines or linkages, respectively.

Figure 6:
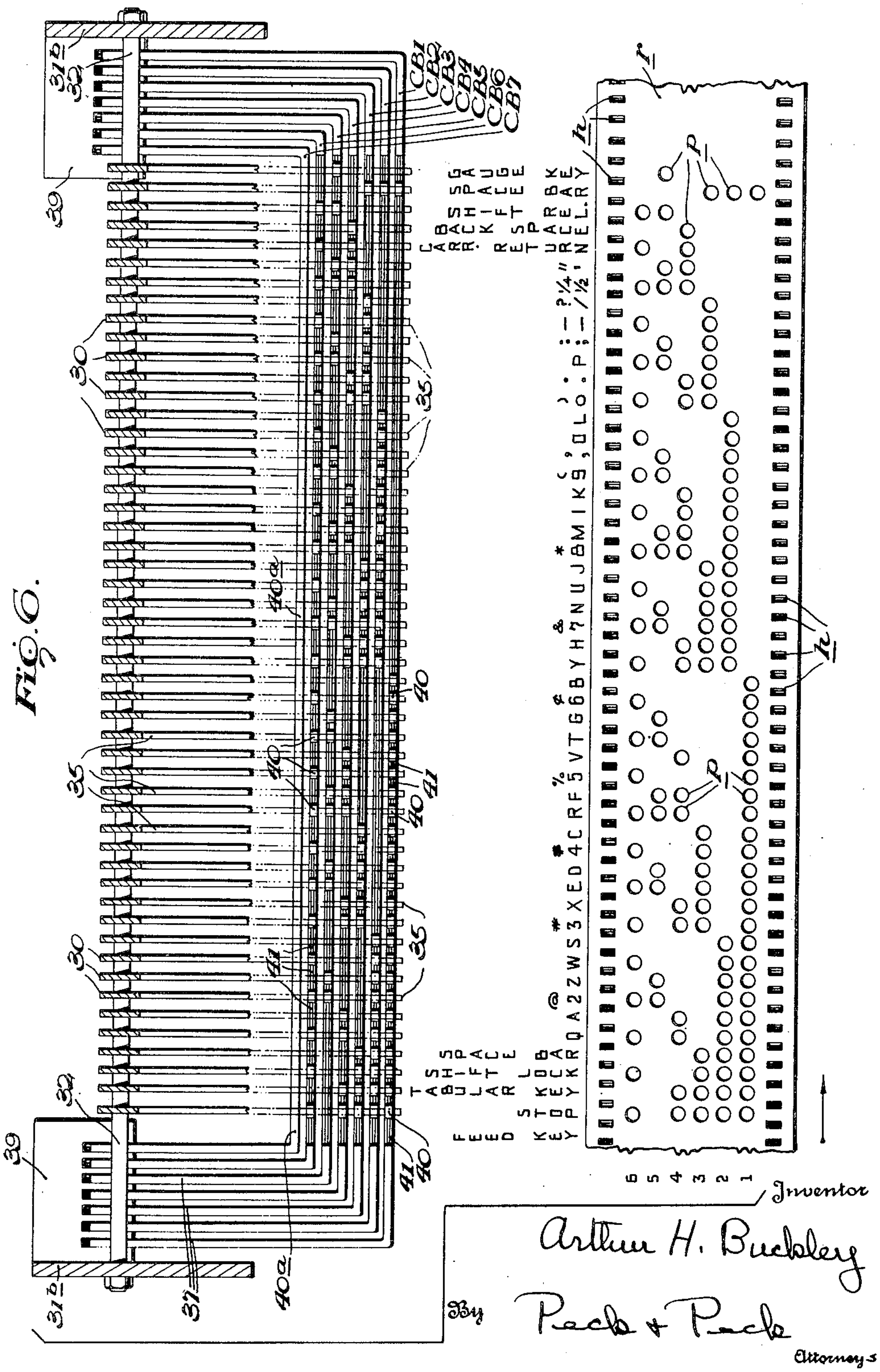

Fig. 6 is a view in vertical transverse section through the key bars of the keyboard for the punching mechanism, showing in front elevation the permutably movable code bars and the key bar actuated lever arms for selectively permutably operating such code bars; and also showing a plan view of a portion of a perforated tape formed of standard 35 mm. motion picture film, with the groups of code perforations therein identified for each character and typewriter function to be controlled thereby, with such groups of code perforations positioned relative to the code bars to show the corresponding permutation of code bars corresponding to each group of code perforations, respectively.

Figure 3:
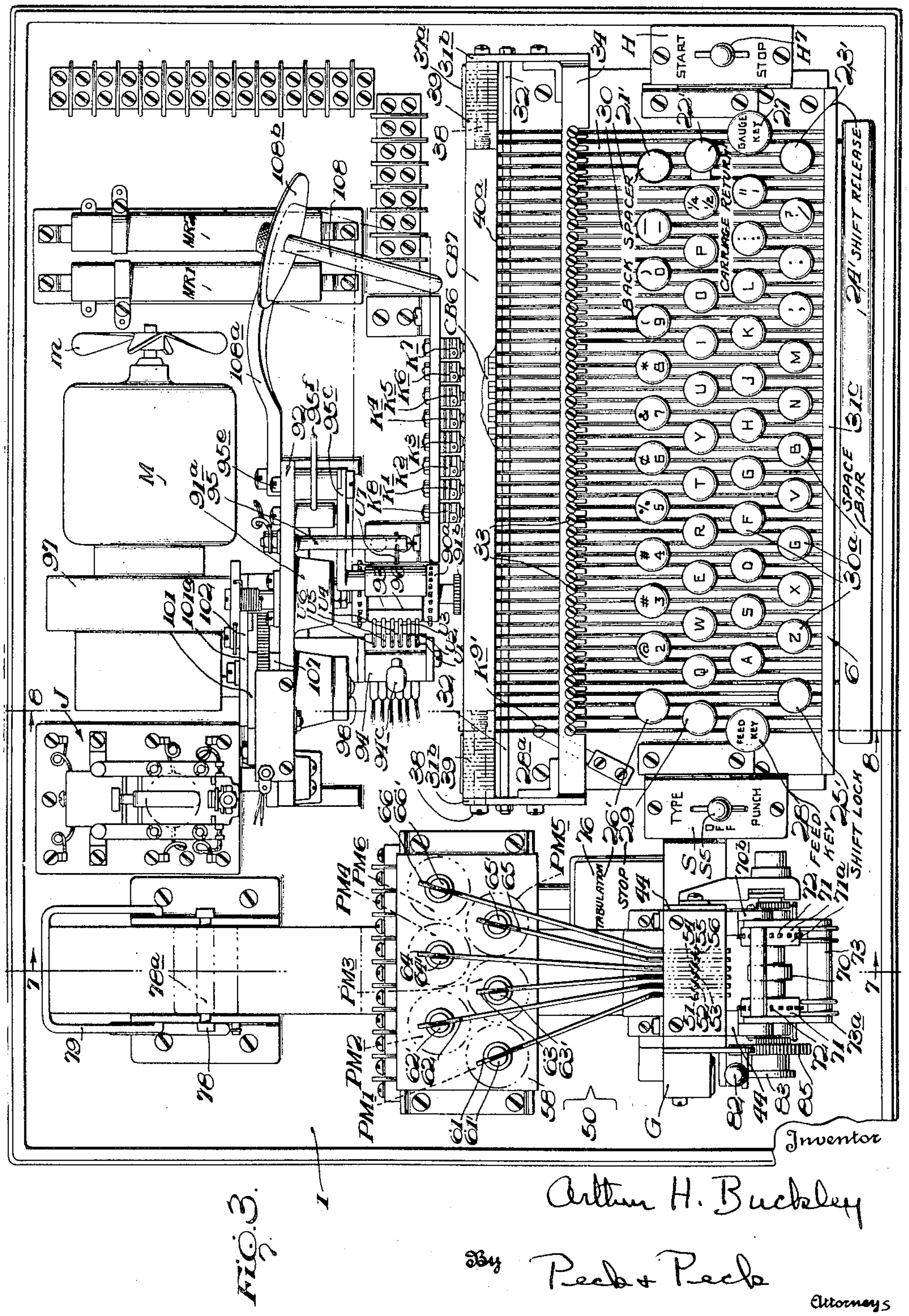
Fig. 3 is a view in top plan of the group of mechanisms of the apparatus forming the unit of Fig. 2, the covering or housing of the unit having been removed.
Figures 7, 7A, 7B:
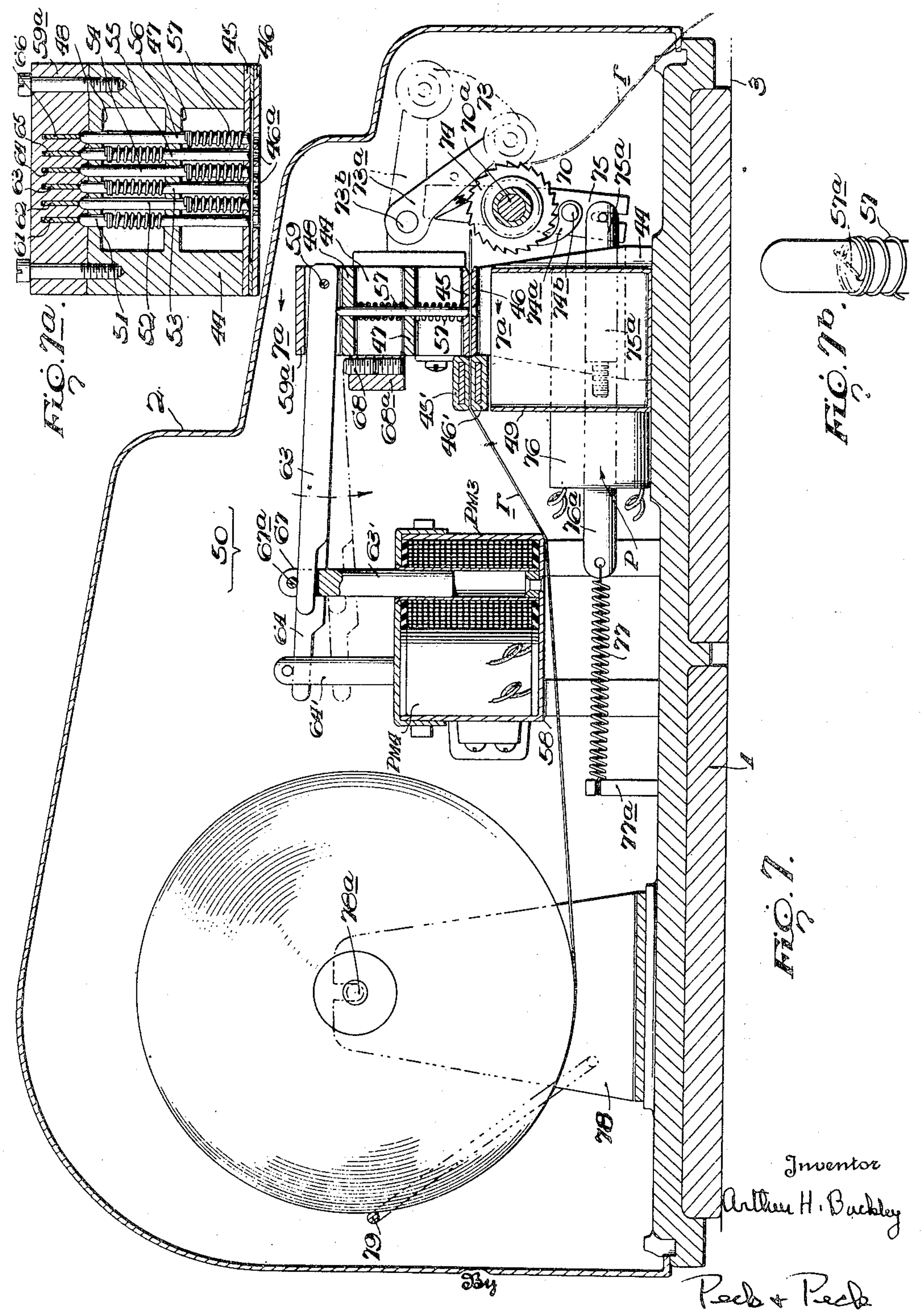

Fig. 7 is a vertical, transverse section taken as on the line 7—7 of Fig. 3, through the record tape perforating and tape feeding mechanism of the apparatus, showing a supply roll of tape on the tape supply roll holder, with the tape extended from the roll to the perforating mechanism in operative position therein for step by step feeding therethrough, by the feed roll, the tape feed roll actuating magnet and armature being shown in side elevation.

Fig. 7a is a vertical section through the punching mechanism, taken as on the line 7a—7a, of Fig. 7, and showing the relative arrangement and mounting of the tape perforating punches and the return stroke springs, respectively, of the punches.

Fig. 7b is a detail perspective view of the upper end of one of the punches of Fig. 7a, showing the manner of attaching the upper end of a return stroke spring to the punch.

Figures 8, 8A:
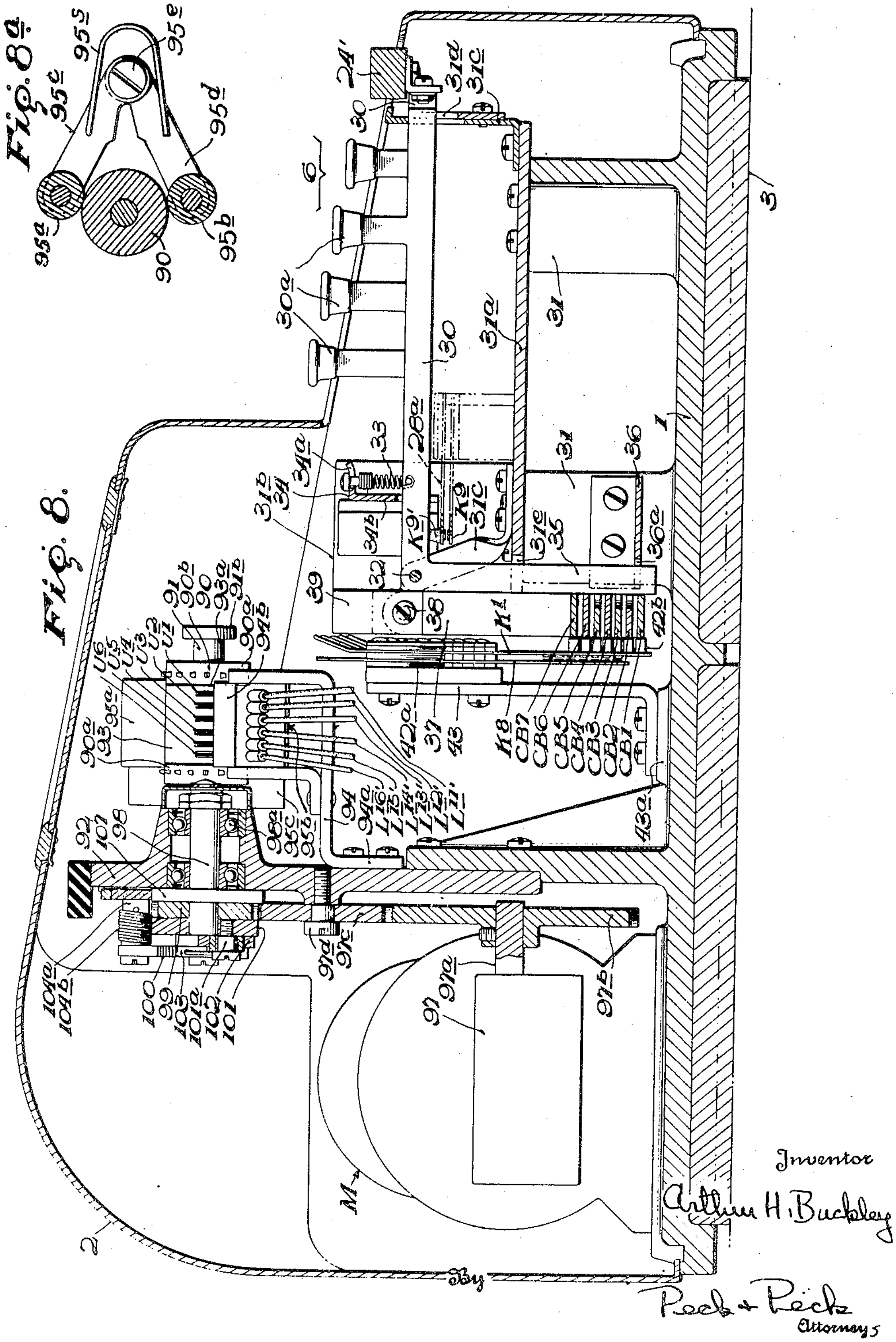

Fig. 8 is a vertical, transverse section taken as on the line 8—8 of Fig. 3, through the keyboard and its associated coding mechanism and electrical contacts controlled thereby, and through the gear drive and the oscillating cam linkage from the driving motor to the translating mechanism and the cams of the cam switches operated by the gear drive, the translating mechanism, including the translating feed roll and contact brushes associated therewith, being shown in side elevation.

Fig. 8a is a fragmentary detailed vertical sectional view showing the upper and lower pressure rollers associated with the perforated tape feed roll of the translating mechanism.

Figures 9, 10:
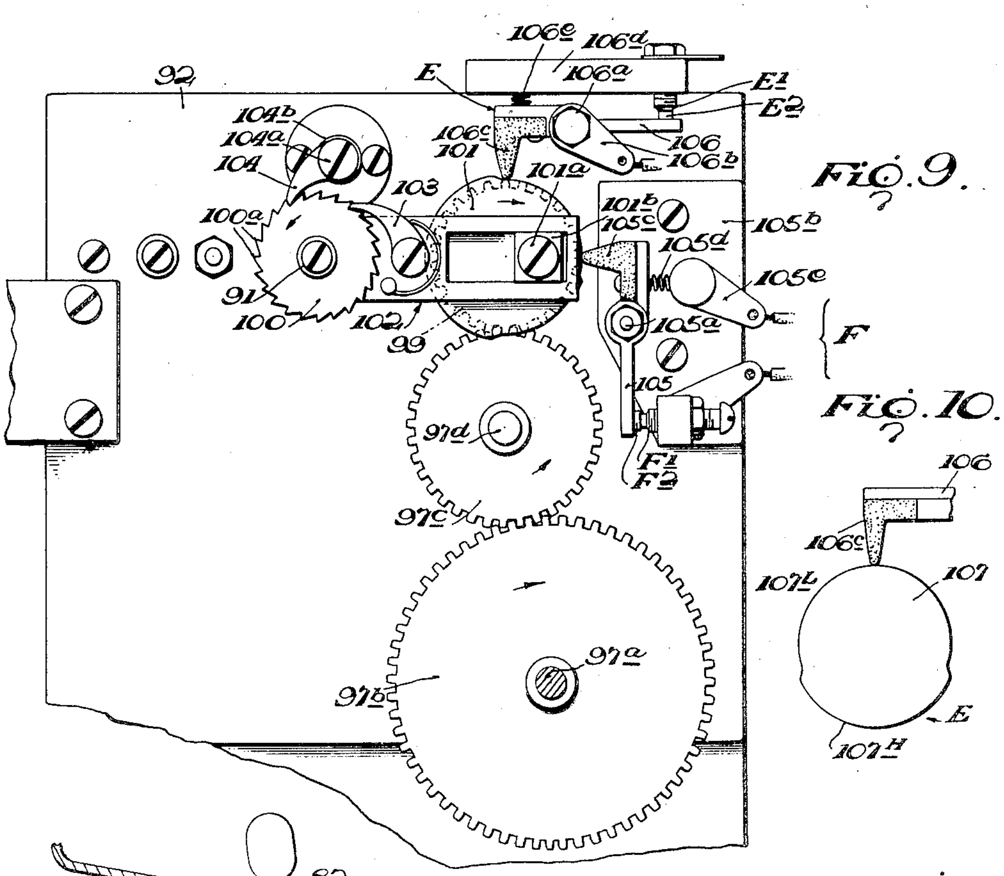

Fig. 9 is a view in rear elevation showing the cam switches operated by the translating feed roller drive, together with the translating feed roller ratchet drive mechanism for rotating the feed roller step by step during the translating operation.

Fig. 10 is a view in side elevation of the cam of the cam switch for intermittently opening and closing the electrical circuit controlling the actuating mechanism for the type bars of the typewriter, the cam being shown in position with the low side thereof engaging the switch contact actuating arm with the switch in closed position.

Figure 11:
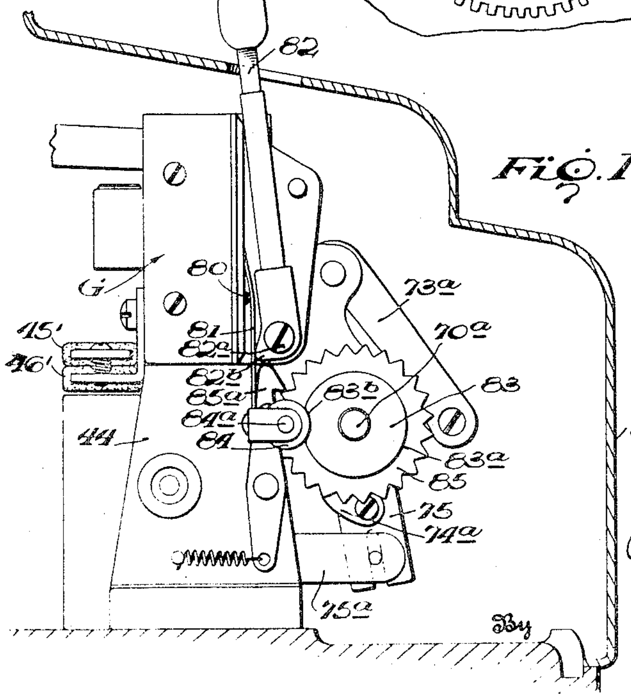

Fig. 11 is a view in side elevation showing the cam of the cam switch for intermittently opening and closing the electrical circuits to the record tape translating feed roller of the translating mechanism, the cam being shown in position with the low side thereof engaging the switch contact actuating arm to position such arm to close the switch contacts.

Figure 12:
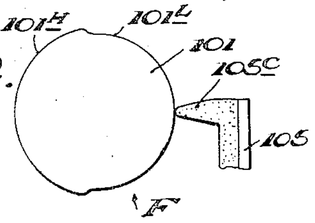

Fig. 12 is a view in side elevation of the gauging switch of the record tape perforating mechanism, the gauging cam being shown in position with the roller of the switch actuating arm in position in the cam recess with the switch controlled by such arm in open position.

Figure 13:
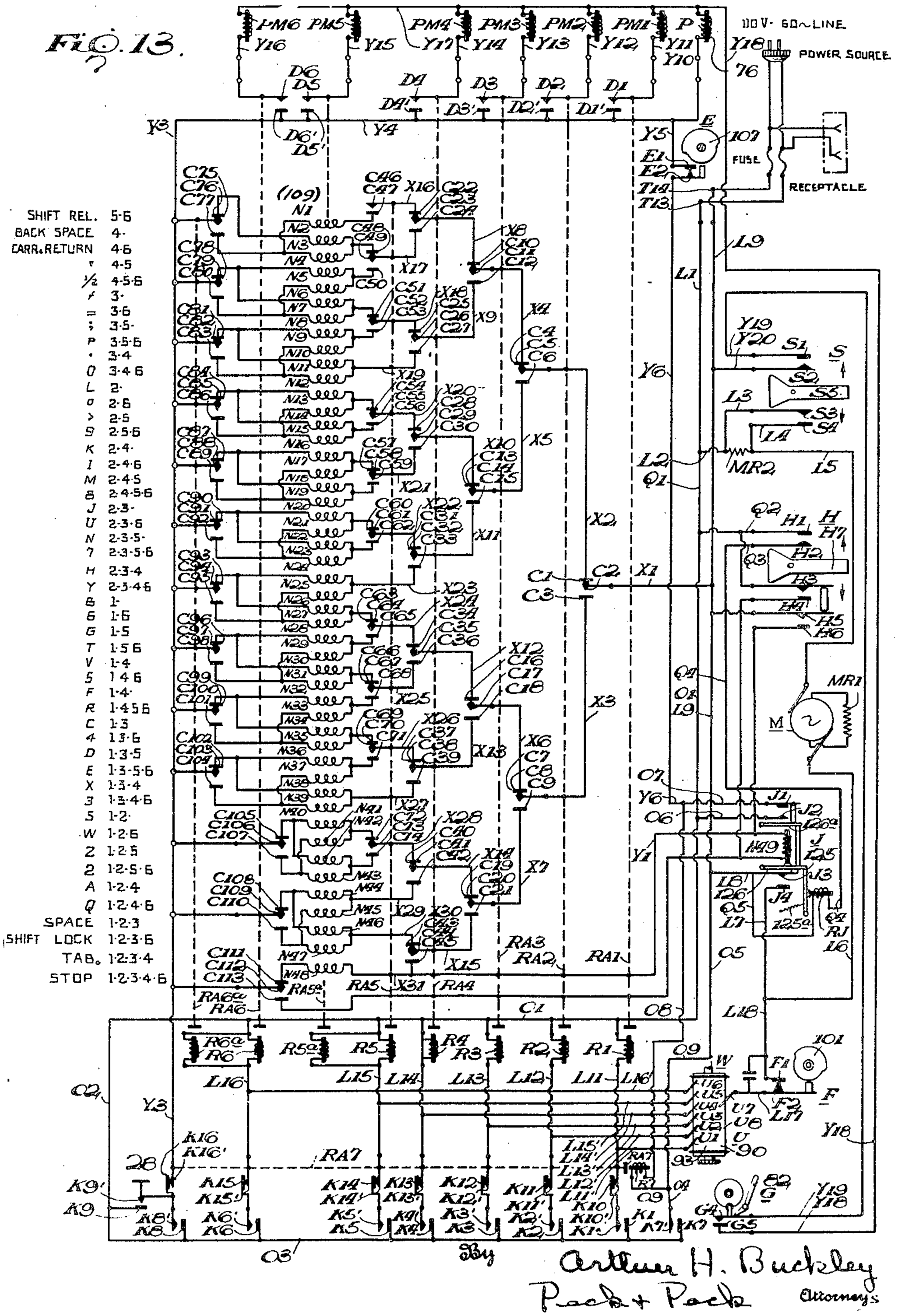

Fig. 13 is an electrical wiring diagram completely illustrating schematically, the various electro-mechanical means and elements of the apparatus and the various circuit forming wires for electrically connecting the same into operative relation for carrying out all of the functions and operations of the apparatus.

Figure 14:
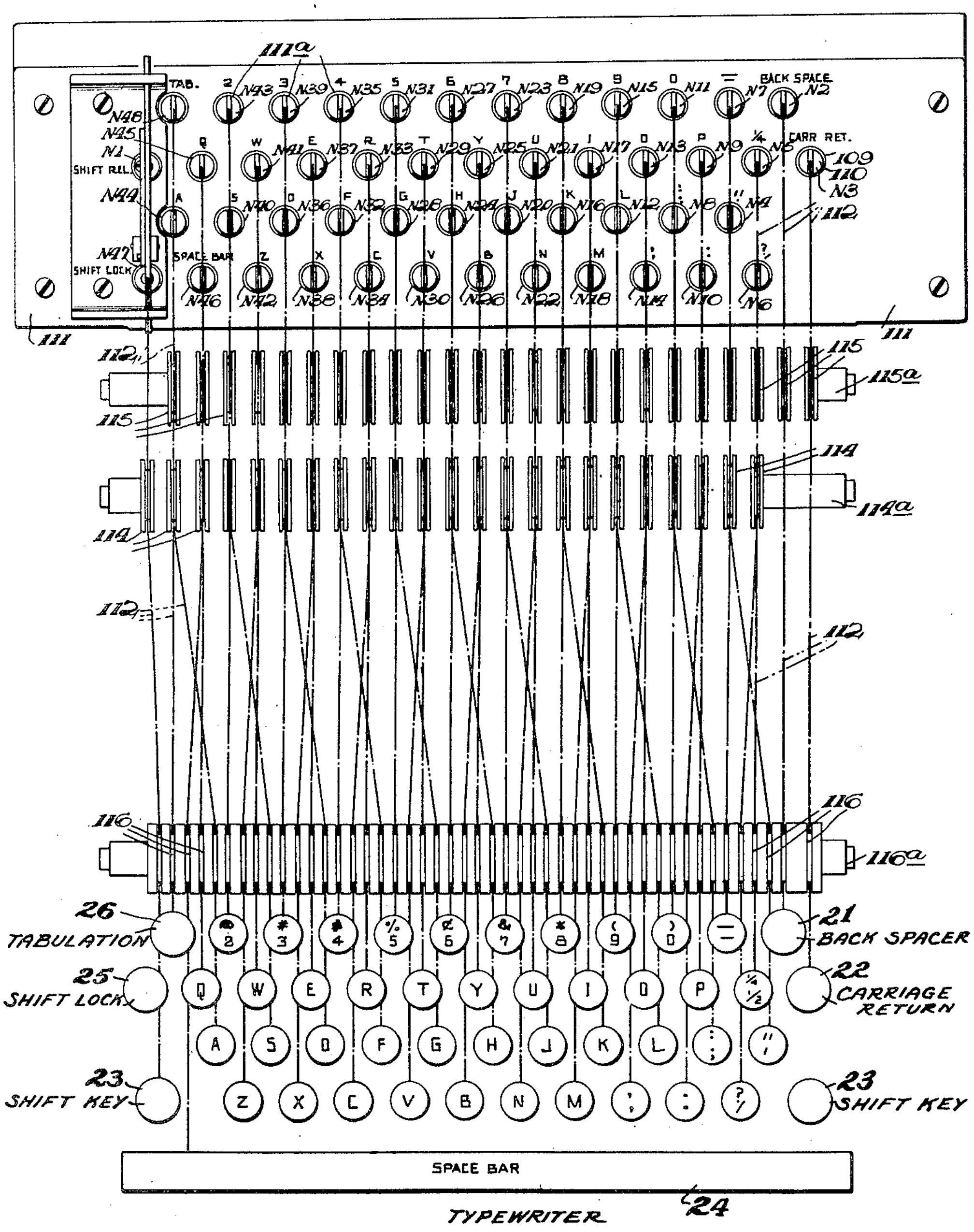

Fig. 14 is a schematic view in top plan of the keys of the typewriter keyboard and of the group or set of key lever actuating solenoids with the arrangement of flexible cords or linkages and the sets of guides thereof, diagrammatically illustrated in relative positions between and connecting the solenoids with the key levers, respectively.

Figure 15:
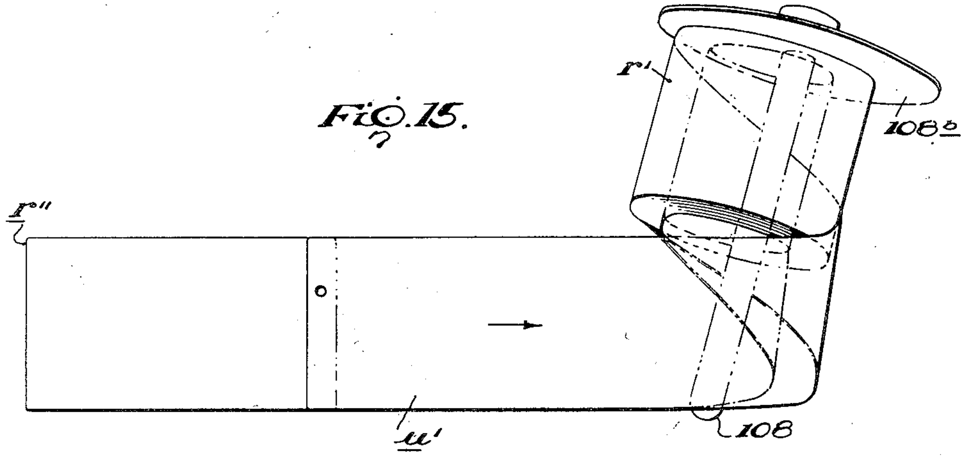

Fig. 15 is a top plan view, more or less diagrammatic, showing an endless record tape formed in accordance with the invention to form a roll of tape with connected lengths of the tape extended to provide a bight for mounting the tape on a feed roller, the roll of the endless tape being shown in mounted position on an endless tape holder embodying certain features of the invention.

Figure 16:
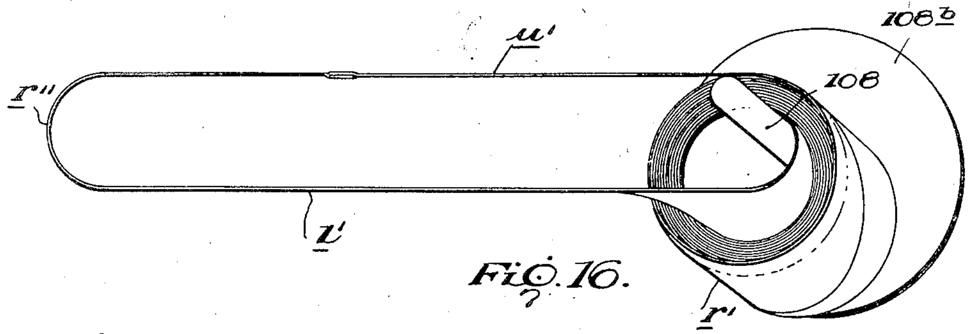

Fig. 16 is a view in side or edge elevation of the endless tape and holder as more or less diagrammatically illustrated in Fig. 15.

Figure 17:
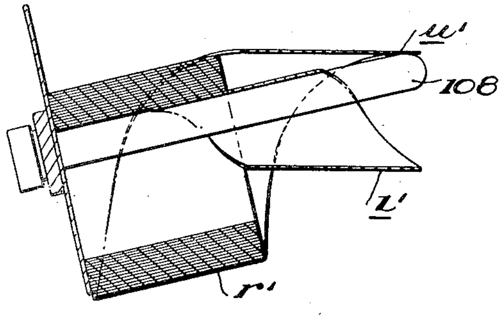

Fig. 17 is a more or less diagrammatic view taken as a vertical section through the tape roll along the longitudinal axis of the fulcrum rod of the tape holder of Fig. 15.

The particular form and embodiment of record forming, translating and printing apparatus of my invention, which I have selected and described herein by way of example, is primarily designed and intended to include as the printing instrumentality thereof, a typewriter of a standard and well-known form of electric or so-called "motorized" typewriter. However, my invention is not limited or restricted to apparatus in which the printing instrumentality is comprised by an electric or so-called motorized typewriter, either of the particular form of such a typewriter herein disclosed or of any other type or form of motorized typewriter, but is capable of and includes embodiments in which the printing instrumentality is comprised by a typewriter of the non-motorized types as well as any other form or type of printing or marking apparatus in which the printing or marking is performed or carried out by printing or character forming elements, or groups of such elements, capable of selective functioning by and under the control of an apparatus embodying the principles of my invention.

In its broad aspects, an apparatus embodying the principles of my invention and the several features thereof as hereinbefore outlined, is characterized by a combination and operative association into a unitary apparatus of certain primary mechanisms or units; namely, a tape punching and tape feeding mechanism for encoding a message in the form of groups of perforations in the tape; a perforated record tape translating and record tape holding and feeding mechanism for decoding or translating the message on a perforated tape to cause automatic operation of the typewriter or printing unit to type or print the translation of the encoded message; a typewriter actuating mechanism controlled by and from the translating mechanism to selectively operate the character printing and other functional operations of the typewriter required to type or print the translated message; a manually operated keyboard in a punch device, at least including a key for duplicating each character printing and typewriter function of the typewriter; a coding mechanism controlled by operation of the keys of the keyboard of the apparatus to cause the tape punching mechanism to form the groups of perforations in a record tape in accordance with a predetermined code for the character or typewriter function represented by that key of the keyboard that has been operated, and/or to operate the typewriter actuating mechanism to cause simultaneous automatic operation of the typewriter in accordance with and corresponding to those keys of the keyboard of the apparatus that have been manually operated; and electro-mechanical means and mechanisms and electrical circuits therefor, for causing operation of said tape perforating mechanism and/or said typewriter actuating mechanism, by and in accordance with the manual operation of the keys of the keyboard of the apparatus, and for causing operation of the typewriter actuating mechanism by the operation of the translating mechanism to translate a record tape, to cause automatic operation of the typewriter to type or print the message being decoded or translated from a perforated record tape being fed through the translating mechanism.

With the form of the apparatus of the instant example, designed for combination and operative association with an electric or motorized typewriter, such primary units or mechanisms may be assembled into two major groups, one of which groups may consist of the keyboard of the punching apparatus, together with the coding mechanism, the record tape perforating and feeding mechanism, the translating mechanism with its driving motor, and various elements and parts of the electro-mechanical operating mechanisms and electrical circuits, while the other of such groups may consist of the typewriter actuating mechanism together with various elements and parts of the electro-mechanical operating mechanism and the electrical circuits therefor. In this manner, such two major groups may be mounted and positioned in operative electrical connection and association with each other, adjacent and in proximity to the typewriter, so as to form a compact arrangement for the apparatus in operative combination with the typewriter, to occupy a minimum of space and to so locate the typewriter together with other elements and members of the apparatus to be manually actuated by the operator in controlling and operating the apparatus, that the operator may conveniently perform all required operations from one central operating position.

Figure 1:
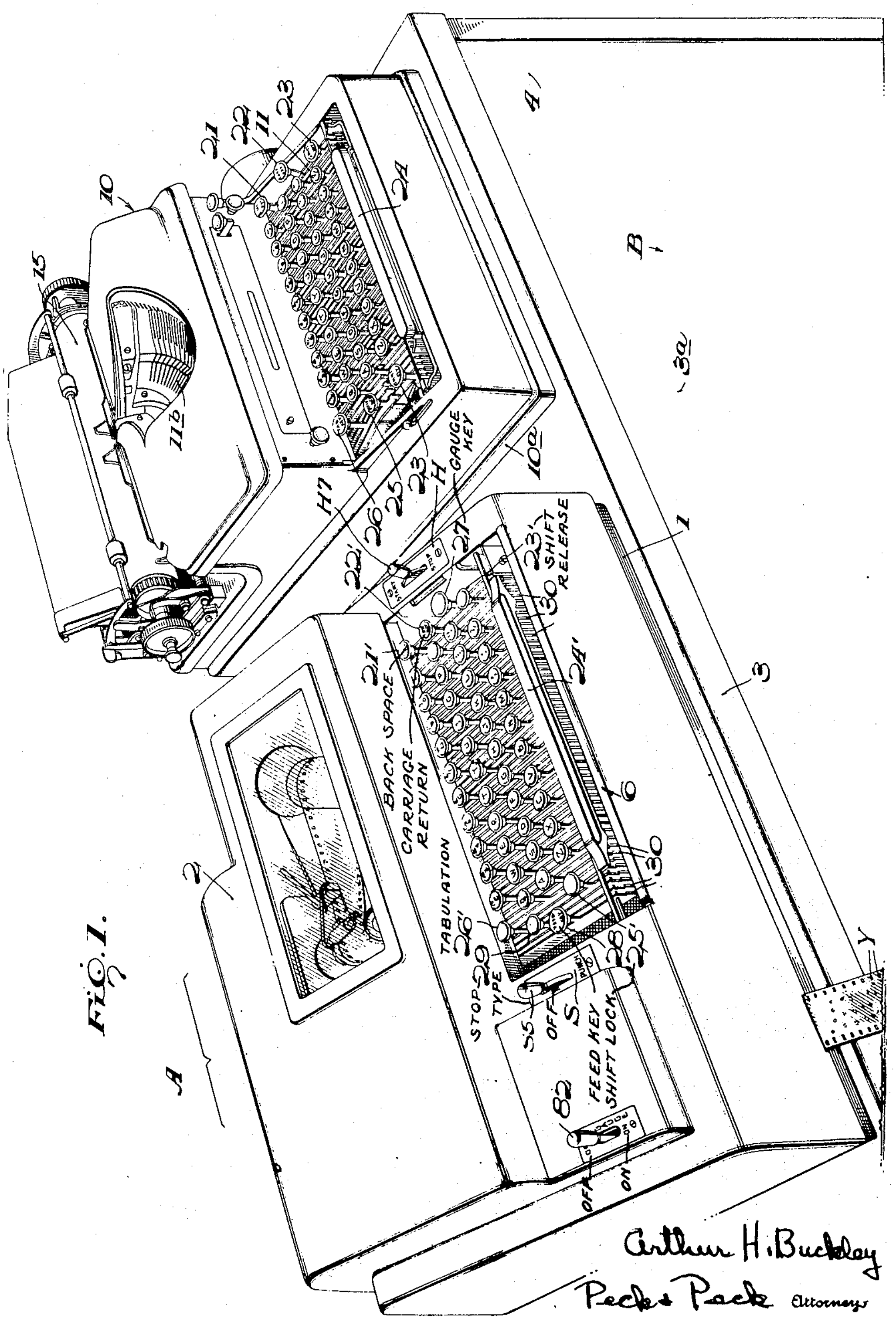

In carrying out such an arrangement of major grouping of the mechanisms of the apparatus and the combination and operative association thereof with a typewriter, such as the electric or motorized typewriter 10 of this example, referring now to Figs. 1 and 4 of the accompanying drawings in particular, the major group A, which consists of the keyboard 6 with the coding, tape perforating and record tape translating mechanisms, is formed by assembling such mechanisms into a compact relationship, preferably upon a suitable base, such as the base 1, so as to form the group as a compact, portable unit, with the assemblage or group of mechanisms preferably enclosed and housed within a suitable removable cover 2. The major group B, which consists primarily of the actuating mechanism for the key bars of the typewriter 10, together with a series of the primary electrical relays of the electro-mechanical mechanism and controlling circuits for the apparatus, is formed into a compact assemblage providing a unit which, in the particular example hereof is preferably mounted on a suitable supporting structure provided for the purpose, so as to be positioned spaced a distance below the typewriter 10 and spaced to the rear of the typewriter keyboard. Thus, with the primary mechanisms of the apparatus assembled into the major groups A and B, and with such groups positioned adjacent the typewriter 10, the only connections required between group A and group B are the wires or cables necessary to form and complete the electrical circuits between those portions or sections of the electro-mechanical mechanisms and the operating and controlling circuits therefor contained in and included in and as a part of group A and group B.

While in the preferred arrangement and relative positioning of the groups of mechanisms A and B of the apparatus, as illustrated in Figs. 1 and 4 of the drawings, such groups are located adjacent and in proximity to the typewriter 10, so as to form therewith a compact group, it is here pointed out that group A can be remotely positioned relative to the typewriter 10 and to group B, if desired, or if found expedient in any particular installation thereof, or the various mechanisms forming group A need not necessarily be assembled into the unit group but may be separated and arranged in any desired sub-grouping. For example, as will be hereinafter pointed out, the keyboard 6 of the apparatus together with the coding mechanism can be remotely located relative to the typewriter 10 and/or to the record tape perforating mechanism and/or to the perforated type translating mechanism, all of which variations are here pointed out and generally referred to in order to make clear that I recognize that the basic principles and various features of my present invention are in no sense limited or restricted to the particular grouping or arrangement of mechanisms of the example of the invention here selected for purposes of illustration and explanation.

In the particular embodiment of the invention of the instant example, a suitable desk or stand, referring now to Figs. 1, 4 and 5, of the drawings, is provided which includes an elevated flat top or base 3 supported upon any usual or desired leg structure 4. With such desk or stand, the typewriter 10 is preferably mounted at the right hand end thereof on the top 3, with the desk or stand providing the usual knee-hole space 3a thereunder for receiving the legs of an operator seated in typing position at the typewriter 10. A suitable supporting structure, generally indicated by the reference numeral 5 in Figs. 4 and 5 of the drawings, is provided at the rear side or back of the knee-hole space 3a beneath the typewriter 10 but to the rear of the keyboard of the typewriter located at the forward side of the desk or stand. The portable group or unit A of the apparatus is preferably mounted on the stand or desk top 2 at the left hand side of the typewriter 10, while the group or unit B of the apparatus is mounted in position on the supporting structure 5 of the desk or stand in position clear of and without obstructing the knee-hole space 3a, as will be clear by reference to Figs. 4 and 5 of the drawings. The group or unit A may be arranged with its keyboard 6 at the forward side of the unit and the unit may be so mounted that the keyboard thereof is located adjacent and preferably substantially laterally aligned with the keyboard of the typewirter 10, as will be clear by reference to Fig. 1 of the drawings. An operator may thus take an operating position at the keyboard of the unit A of the apparatus and from such position conveniently, efficiently operate and control all of the operations of the apparatus, both manual and automatic, in making a perforated tape and in causing the apparatus to translate such tape and automatically operate the typewriter 10 to print or type the encoded message on the record tape.

As the apparatus embodying the invention of the selected example, is designed for combination with and for automatically operating an electric or motorized typewriter, such as the typewriter 10, as the typing or printing unit, and as the motorized typewriter 10 of the illustrated example is of a standard design and construction familiar in this art, such typewriter and its construction and operation will first be generally described before proceeding with the detailed description and explanation of the apparatus of the invention and its operation and functioning when in combination and operative association with the typewriter 10.

*The electric or motorized typewriter*

The typewriter 10, referring now to Figs. 1 and 4 of the drawings, includes a frame 10a, a keyboard including a full set of key levers 11 for controlling the usual number of typing bars and associated typewriter functions or actions, such as the spacing mechanism, shift lock, tabulator, back spacer, case shift and carriage return; type bars 11b controlled by the key levers 11; and a drive roll 12 which is driven by an electric motor (not shown) in a manner well understood in the art. A series of devices 14 is provided spaced apart longitudinally along the roll 12, and each device 14 is adapted to be coupled to and uncoupled from the roll 12 for individually shifting that type bar 11b or that associated action or typewriter function bar with which the device is operatively coupled, by power derived from the roll 12. The typewriter 10 also includes a platen carriage 15 of any usual desired construction. The devices 14 are alternately arranged at the front and rear of the roll 12, spaced apart longitudinally along the roll. Each shifting device 14 comprises a bellcrank lever 15a which is fulcrumed on a rod 15b which is supported in fixed position in a member of the frame 15c. The horizontally extended arm of each lever 15a is adapted to shift a type bar or typewriter action or function, through a link 15d and a three-armed lever 15e which is fulcrumed on a rod 15f. The vertically extended arm of each lever 15a carries at its lower end a rotatable element 16 which is provided with cam faces which are normally disengaged from the roll 12. Each key lever 11 is provided with a depending arm 11c which is adapted to control a latch for controlling the rotation of element 16 and shifting it into contact with the roll 12 for causing the element to be rotated a cycle of less than one-half revolution and automatically disengaging it, as will be readily understood by those familiar with this design of motorized typewriter. One arm of each lever 15e is connected by a link 17 to the rear end of a toggle lever 17a which is adapted to shift the type bar 11b on its pivot 11d by power derived from the roll 12, or suitably connected to another typewriter action or function. A spring 18 is applied to each lever 15e for retracting said lever and the levers 15a connected thereto. Details of the devices 14 and the connection for shifting them from key levers 11 are more fully set forth in U. S. Letters Patent 2,247,275, granted to me June 24, 1941, to which reference may be had for the details thereof as the exemplification of motor operable devices for shifting the type bars and other typewriter functions or actions of a motorized typewriter of the form and design of typewriter 10 of the example hereof.

The keyboard of the typewriter 10 is a standard keyboard such as universally used on typewriters and familiar in this art, and consists of forty-two (42) character or symbol printing or typing keys 11, and in addition includes the typewriter action or functional keys as follows: a "Backspacer" key 21; a "Carriage Return" key 22; "Shift" keys and (release) 23; a "Space" key or bar 24; a "Shift Lock" key 25; and a "Tabulator" key 26. Such typewriter action or functional keys, as identified above, are illustrated in Fig. 1 of the accompanying drawings, and in view of the thorough familiarity in the art with the standard typewriter keyboard, it is not here deemed necessary or essential to an understanding of the present invention, to specifically identify each of the forty-two (42) character or symbol typing keys, beyond the general identification of these keys in Fig. 1 of the drawings, by the reference character 11, particularly as each of these character or symbol keys 11 bears on the cap thereof in Fig. 1, the character or symbol which the particular type bar 11b, with which the key is operatively connected, will print or type when the key is operated. The typewriter actions or functions respectively controlled and operated by the keys 21, 22, 23, 24, 25, and 26, are familiar and well understood by those skilled in the art, as well as the design of the typewriter 10.

*The keyboard of the control apparatus*

The apparatus of the invention which is designed for combination and operative association with a motorized typewriter, such as the typewriter 10, includes a manually operable keyboard 6, which, in the particular form of the invention of the example hereof, is included as and forms a part of the assemblage of mechanisms constituting group A hereinbefore referred to and generally discussed. This keyboard 6 is primarily for manual operation by an operator for actuating the record tape perforating mechanism alone through the medium of which a message is encoded in the form of groups of perforations in the record tape, as will be hereinafter referred to and fully explained, but this keyboard, in accordance with one of the features of the apparatus of the invention, may also function by the manual operation thereof, to also cause automatic typing operation of the typewriter 10 to simultaneously print or type the message being "spelled out" by manual operation of the various keys of this keyboard.

In this connection attention is directed to the fact that the invention contemplates and includes the use of the keyboard 6 of the apparatus, not only as the keyboard for operating the record tape perforating mechanism, but also separately as the keyboard for manual typing with the typewriter 10, so that, if desired or found expedient, the keyboard caps of the typewriter 10 may be completely eliminated and the typewriter unit for cooperative association with the apparatus of the invention may be constructed without keyboard caps. With such arrangement, the keyboard 6 of the apparatus is used for both forming a record tape on the perforating apparatus and/or for conventional typing with the typewriter 10 by manual actuation of the keyboard 6, through the medium of the electro-mechanical mechanisms and electrical circuits hereinafter disclosed and described in detail.

Figures 2, 3A:
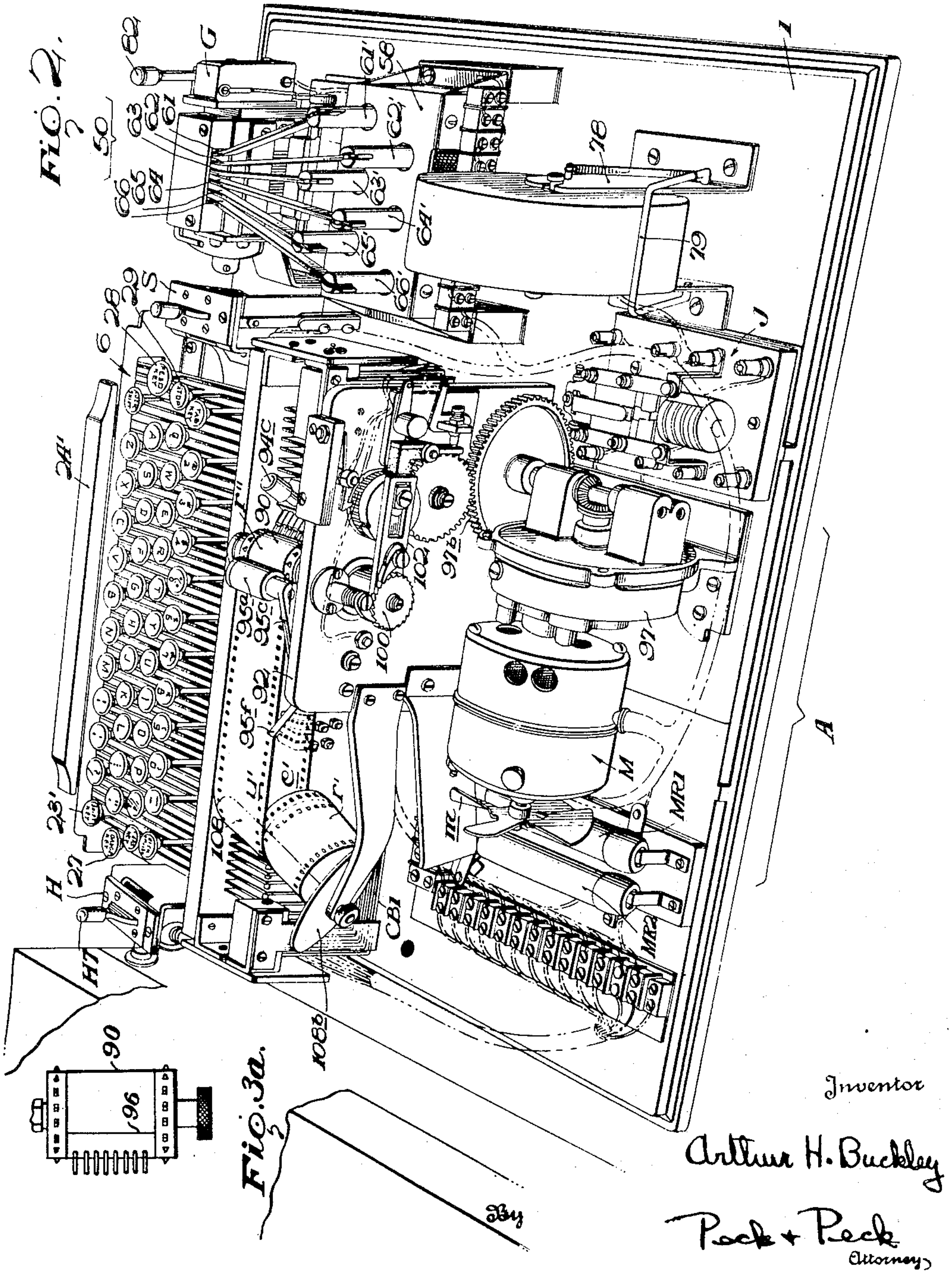
Fig. 3a is a top plan view of the feed roll of the translating mechanism showing particularly the starting or index line thereon.

The keyboard 6 of the apparatus is generally disclosed in Figs. 1 and 2 of the accompanying drawings, and is disclosed with particularity and in detail in Figs. 3, 5 and 8 of the drawings.

The keyboard 6 of the apparatus, as will be clear by reference to Figs. 3 and 8 of the drawings in particular, consists of a series of horizontally disposed key bars 30 each carrying and mounting the usual type of cap 30*a* thereon by which the key bars may be manually depressed by the fingers of the operator in the customary manner with each key bar cap 30*a* carrying an identifying symbol or character thereon in a manner familiar in this art. The keys formed by the key bars 30 with their caps 30*a*, which constitute and make up this keyboard 6, include at least keys in complete duplication of the keys, respectively, of the keyboard of the typewriter 10, hereinbefore described, including the following keys duplicating keys 21 to 25, inclusive, of the typewriter keyboard, such duplicating keys of the keyboard of the apparatus being identified on Figs. 1, 2 and 3 of the drawings as follows; namely, a "Back Spacer" key 21'; a "Carriage Return" key 22'; a "Shift Release Key" 23'; a "Space" key or bar 24'; a "Shift Lock" key 25'; and a "Tabulator" key 26'. This keyboard of the apparatus, however, includes in addition to the keys duplicating the typewriter keyboard keys, certain additional keys for effecting certain functional operations of the apparatus of the invention in preparing and forming a perforated tape record; namely, a "Gauge" key 27; a "Feed" key 28; and a "Stop" key 29.

Attention is directed to the fact that, in accordance with a feature of my invention to be hereinafter more fully explained, the "Shift" key levers 11 of the keyboard of the typewriter 10 are actuated to shift the type basket to upper case position by energization of a solenoid N47 (see Figs. 4 and 13). The armature 110 of solenoid N47 actuates a lever 120 which is connected with one of the pair of "Shift" key levers 11, through the medium of a flexible cord 112. Energization of solenoid N47 will result in depressing levers 11 to raise the key basket to upper case position. The solenoid N47 is energized by the closing of its energizing circuit, either by manually depressing the "Shift Lock" key 25' of the keyboard 6, or automatically under the control of a perforated record tape *r'* being translated in the translating mechanism (see Fig. 2). The actuation of the "Shift" key levers 11 of typewriter 10 by solenoid N47 to shift to upper case position automatically causes the functioning of a locking member 121 (see Fig. 4) of the invention to lock the "Shift" key levers 11 in the upper case position. It is to be particularly noted that the "Shift Lock" key 25 with its associated mechanism, of the typewriter 10, is not utilized in the operation of the typewriter 10 by the apparatus of my invention, either manually under the control of the separate keyboard 6, or automatically under the control of a record tape being translated in the translating mechanism. The shift lock release function, which is performed in the conventional operation of the typewriter 10 from its keyboard, by depressing either "Shift Key" 23 when that key is locked in upper case position, is effected in the apparatus of my invention, by the locking member 121 (see Fig. 4). This locking member 121 is actuated to unlock and release lever 120 by energization of the solenoid N1 (see Figs. 4 and 13) through the closing of its energizing circuit by either manual actuation of the "Shift Release" key 23' of the keyboard 6 or by the closing of its energizing circuit under the control of a perforated record tape *r'* (see Fig. 2) being translated in the translating mechanism. Energization of the solenoid N1 actuates the locking member 121 to position releasing lever 120 so as to permit return of the "Shift" key levers 11 to lower case position.

The keyboard 6 of the apparatus is located and positioned, in this instance, at the forward, right hand side of the base 1 of the group A, and is mounted on the base 1 by a suitable frame structure which includes the spaced corner posts or columns 31 supporting a horizontally disposed base plate 31*a* in elevated position on the base 1. This frame structure includes substantially parallel, vertical extensions in the form of plate members, or the like, 31*b* on the outer sides of the rear corner posts or columns 31 in position disposed generally transversely of the frame structure to provide substantially parallel, opposite side members or plates extending upwardly above the base plate 31. A fulcrum rod or shaft 32 is secured at its opposite ends in these side plates 31*b* and extends horizontally across and between such plates in position extending across and spaced above the rear portion of the base plate 31*a* of the keyboard frame structure.

The key bars 30 are pivotally mounted or fulcrumed at their rear ends on this rod or shaft 32, being spaced apart longitudinally therealong in parallel relation thereon and extending forwardly from the rod 32 across and spaced above the base plate 31a, to the forward side thereof, as will be clear by reference to Figs. 3 and 8. Thus, the key bars 30 are mounted for selective, independent vertical rocking or swinging on the fulcrum rod or shaft 32. The key bars 30 are assembled and mounted on the rod 32 with their respective cap members 30a extending upwardly therefrom and arranged in rows at progressively higher levels from the forward side of the keyboard to the rear side thereof in the more or less usual manner familiar in this art.

The frame structure for the keyboard 6 also includes a vertical wall or plate structure 31c extended upwardly from and along the forward edge portion of the base plate 31a, and this vertical forward wall structure is provided with a series of vertically disposed parallel slots 31d therein spaced apart longitudinally of the wall structure to receive and through which the forward free ends of the key bars 30, respectively, extend (see Fig. 8). The slots 31d are closed at their upper ends to provide stop structure to limit vertical upward movements or rocking of the key bars. The forward ends of the key bars 30 are thus confined and guided in the slots 31d for limited vertical swinging as the key bars are vertically rocked on and about the fulcrum rod 32 as an axis. The foregoing arrangement of the slotted forward vertical wall structure 31c provides, in effect, a comb plate for maintaining the required alignment and spacing of the key bars 30 as these key bars are vertically rocked within the limits as defined by the slots 31d.

The key bars 30 are maintained in their normal elevated, and horizontally disposed positions by a series of spring units 33, respectively. These spring units 33 are mounted on and depend from an angle plate or angle strip member 34 which is secured at its opposite ends to the forward portions, respectively, of the vertical side plates 31b of the frame structure, and which strip member 34 extends horizontally therebetween above and across the key bars 30 spaced a distance forwardly of the fulcrum rod 32. The spring unit mounting, angle strip 34 has the horizontally disposed flange 34a thereof extended forwardly, and such flange is provided with a series of parallel slots spaced apart longitudinally thereof and vertically aligned with the key bars 30, respectively, therebelow. The vertically disposed flange 34b of this angle strip 34 is provided with a series of vertical slots therein spaced apart longitudinally therealong which receive and through which the key bars 30 extend, so that, this vertical flange 34b of angle strip 34 thus provides, in effect, a comb plate for the key bars 30. The spring units 33 are mounted in the slots in the forwardly extended horizontal flange 34a of the angle strip 34 with the springs thereof depending downwardly therefrom and attached at their lower ends to the series of key bars 30, respectively. The springs of the units 33 are, in this instance, of the contractile type and function in the more or less usual manner to maintain the key bars in normal raised position, and to return the key bars to their normal raised positions upon the release of the key bar depressing forces which are applied in the manual operation of the key bars, the springs of the units 33 being expanded when the key bars are depressed. Preferably, the spring units 33 are so constructed and so mounted as to provide for individual adjustment of the tension of the spring of each unit, so as to adjust the force required to depress a key bar. In this manner the "touch" required for the operation of the key bars can be adjusted, as desired.

Each key bar 30 is provided with a vertically disposed arm 35 which depends from the rear end of the key bar for horizontal rocking about the rod 32 as an axis, as the key bar 30 is vertically rocked. The lower end of each key bar arm 35 rocks generally horizontally through an arcuate path, being rocked rearwardly when its key bar is depressed and rocking forwardly to return to its normal vertical position as its key bar is raised and returned to normal horizontal position under the action of the spring unit 33 connected with such key bar. In this particular example, each key bar arm 35 is disposed in fixed relation at substantially a right angle or perpendicular to the longitudinal axis of the key bar 30 of which it forms a part, and the arm 35 of each key bar depends downwardly therefrom with its lower end in proximity to but spaced above the base 1 so as to give the arm complete operating clearance with base 1. In order to further assist in maintaining proper spacing between and operating alignment for the type bar arms 35, the rear edge portion of the base plate 31a of the keyboard frame structure is formed with slots 31e therethrough for receiving and guiding the key bar arms 35, respectively. In addition, a comb plate 36 may be provided extending across and between the rear corner posts or columns 31 of the keyboard frame structure, with this comb plate 36 in position spaced a slight distance above the lower ends of the key bar arms 35. The comb plate 36 is provided with slots 36a which receive and guide the key bar arms 35, respectively, to maintain the proper spacing between and operative alignment of, the lower ends of these arms, as the arms are horizontally rocked by vertical rocking or swinging of the key bars 30, respectively, (see Fig. 8), in the manual operation of the keyboard.

With the keyboard 6 of the apparatus as above described, it is to be noted that usual typewriter keyboard practice has been followed with respect to the space bar 24', in that such space bar is located at and extends across the forward side of the keyboard, being mounted on and actuating a spaced pair of the key bars 30. In this particular instance, it so happens that the key bar 30 of the pair of key bars actuated by space bar 24', that is located at the right hand side of the keyboard 6, is the key bar 30 next to the key bar which is actuated by the gauge key 27, while the other key bar 30 of the pair of key bars, that is located at the left hand side of the keyboard, is the key bar 30 between the key bar 30 for the shift lock key 25' and the key bar 30 for the character key "Q."

*The coding mechanism*

A suitable coding mechanism is associated with the keyboard 6 of the apparatus, for selective control and operation by the manual actuation of the key bars 30 of the keyboard, to cause the record tape punching or perforating mechanism to punch the groups of perforations in the record tape in accordance with a predetermined code, and/or to cause automatic typing operation of the typewriter 10 in accordance with the manual operation of the key bars 30 of the keyboard 6 of the apparatus. In the particular example of an apparatus of the invention here disclosed, such coding mechanism includes a series of seven (7) code bars CB, which, referrring now particularly to Fig. 6 of the drawings, are individually identified as code bars CB1, CB2, CB3, CB4, CB5, CB6 and CB7.

Each of the code bars CB is of generally similar design and construction and consists of a flat strip or bar of material, preferably, although not necessary, of metal, provided at its opposite ends with upwardly extended, substantially parallel mounting and supporting arms 37, respectively, which are disposed substantially perpendicular to the plane or flat surface of the body of the code bar, which code bar body in mounted, operative position of the code bar is disposed in a horizontal plane. Each code bar CB is adapted to be suspended for vertical horizontal swinging by and from the upper ends of its opposite end vertically disposed supporting arms 37. These code bars CB are thus each of generally U-shape and are adapted to be assembled and grouped in nested relation positioned one above the other, being spaced apart sufficient distances to afford operating clearance to permit of horizontal swinging of each code bar of the group without contact with or interference from the code bar or code bars next adjacent thereto, respectively. The seven (7) code bars CB are assembled together with code bar CB1 in the lowermost or bottom position and with code bar CB7 in the top or uppermost position, the code bars CB2, CB3, CB4, CB5 and CB6, being grouped together in positions one above the other in the foregoing order between the lowermost bar CB1 and the top or uppermost bar CB7, as clearly shown in Fig. 6 of the drawings. In order to carry out the nesting assembly of the code bars CB positioned one above the other, and to permit mounting of such code bars suspended by the arms 37 thereof from and for rocking about a common axis at the upper ends of the supporting arms 37, the code bars CB are of progressively decreased lengths, respectively, from the lowermost code bar CB1 which has the greatest length, to the uppermost top code bar CB7 which is the shortest in length, of the group of code bars, so that the code bars CB are grouped in parallel relationship one above the other for suspension from the upper ends of the opposite end arms 37 and for selective horizontal swinging about a common axis at the upper ends of the arms 37.

The code bars CB1 to CB7, inclusive, assembled in nested but spaced relation as above described, are mounted in horizontally disposed position at the rear of and extending transversely across the rear edges of the lower end portions of the spaced, parallel, vertically disposed arms 35 of the key bars 30 of the separate keyboard of the apparatus, as illustrated particularly by Fig. 8 of the drawings. In such mounted position of the code bars CB, with the key bars 30 in normal, raised, inactive position, the key bar arms 35 are, in this particular example, disposed in positions substantially perpendicular to the horizontal, and the rear vertical edges of these arms lie in the same vertical plane in which the forward horizontal edges of the code bars CB lie. Thus, in inactive position of the key bar arms 35, the rear vertical edges of the arms 35 are preferably, although not essentially, in engagement or contact with the forward edges of the code bars CB, but without displacement of the code bars from their normal inactive, suspended positions.

The mounting of the code bars CB in such position relative to the key bar arms 35, is carried out in the present example, by pivotally or swingably mounting the upper ends of the opposite end arms 37 of the code bars CB, from opposite axially aligned pintle pins or rods 38 which are mounted extended inwardly from the opposite members 31b of the keyboard frame structure. The upper ends of the code bar suspending or mounting arms 37 are formed with suitable bores therethrough in axial alignment, and the opposite pintle pins 38 extend through the aligned bores of the arms 37 at opposite ends, respectively, of the code bars, so that the code bars are mounted on and from pins 38 for swinging or rocking movements horizontally through an arcuate path about the aligned axes of the pintle pins 38.

A comb block 39 provided with suitably spaced parallel vertical slots extending upwardly thereinto from the lower or under side thereof is mounted and secured on each pintle pin 38 in fixed position relative to and with the pintle pin extending across and through the slots therein, with the upper ends of the arms 37 on the pintle pin received in the comb block slots, respectively, so that the proper alignment and spacing of the code bars is maintained.

In the example hereof, the code bars CB are restrained against horizontal swinging by a suitable flat spring 37a (see Fig. 3) which is mounted in position extending across and adapted to be engaged by the adjacent edges of the code bar arms 37 with which said spring is mounted for cooperation. Thus, the spring 37a is engaged by the adjacent edges of the code bar arms 37 by horizontal rocking or swinging of the code bars in a rearward direction, so that the spring 37a is placed under tension and will continuously exert a force acting in a direction to return the code bars to their normal inactive positions upon the release of forces which have been applied thereto by key bar arms 35, respectively, to rock or swing the code bars CB rearwardly. While in this example I have shown a flat spring 37a in association with the arms 37 at each end, respectively, of the code bars, a single spring only may be utilized for cooperation with the arms 37 at one end of the code bars, or various other arrangements may be resorted to for similarly applying forces to the code bars when in rearwardly swung positions, acting to return the bars to normal inactive position.

Thus, with the code bars CB so mounted, the depression of a key bar 30 of the keyboard 6, by pressure applied manually to its cap 30a, will rock the arm 35 of such key bar rearwardly about the rod 32 as an axis, and thereby rock or swing those of the code bars CB which are engaged by such particular key bar arm 35, rearwardly against the resisting force exerted by the spring 37a, a distance corresponding to the distance of rearward swinging of the key bar arm 35. Upon the release of the force or pressure depressing such key bar, the spring unit 33 of the key bar will raise and return the key bar to its normal elevated, inactive position, and those particular code bars CB which have been engaged with and swung or rocked rearwardly by the rearward movement of the key bar arm 35, will, under the action of the force exerted by the spring 37a, which has been placed under tension by the rearward swinging of the code bars, be forced to simultaneously follow the forward movement of the arm 35 without any appreciable lag or delay, and thus swing forwardly and return to normal positions suspended from the pintle pins 38 by the arms 37.

*The code*

I have devised and formulated a code for use in encoding messages on a record tape with an apparatus of my present invention, and the apparatus of the example herein disclosed is designed and arranged primarily for use with such code. It is here pointed out, however, that my invention is not limited or restricted to apparatus designed for use with this particular code, but that my invention contemplates and includes the use of any desired variations of the basic code pattern or formula of the code of this example, or the use of other or basically different codes, and also contemplates and includes whatever changes in design and construction detail, as well as whatever substitutions of broadly equivalent units or mechanisms for the units or mechanisms of the apparatus of the present example, may be required to provide an apparatus embodying the present invention for operation and use with any such variations of the code of this example, or with any other or different code.

The code of this example is based upon the selective use of six (6) predetermined and unchanging perforation receiving locations spaced apart transversely across the record tape, from which locations a certain combination or permutation thereof is selected for perforation, respectively, to form a transverse row of perforations as a code group of perforations for a particular typewriter printing character or typewriter function or action. Thus, an encoded message in a tape consists of a series of such groups of transverse perforations spaced apart longitudinally along the tape, with each group consisting of the combination or permutation of perforations in locations in the tape selected from the six (6) perforation locations across the tape, in accordance with the code combination for the typewriter printing character or function encoded by such group.

The record tape is, in effect, divided into six (6) longitudinal and parallel perforation receiving columns or areas for the length of the record tape, and these six (6) columns on the tape are arbitrarily considered as numbered and identified successively across the tape as columns "1," "2," "3," "4," "5," and "6," respectively, from a predetermined side edge of the tape, say for instance, as in the example hereof, from the left hand edge of the tape when facing the perforating mechanism from the front of the apparatus illustrated in Fig. 1 of the drawings. However, the record tape need not be actually provided with lines or markings, such as division lines disposed longitudinally of the tape to divide the surface thereof into and visually indicate the six (6) longitudinal columns or areas, and the ordinals "1" to "6," inclusive, identifying the columns by number, respectively, need not be applied or provided on the tape, as all such column defining and identifying markings are unnecessary in the operation and use of the record tape. Hence, such markings have been applied in Fig. 6 of the drawings, and have been used in the foregoing description primarily to assist in explaining the pattern or formula upon which the code is based.

In order to fully disclose the code and explain the expression thereof as groups of perforations in transverse rows across the record tape, I have illustrated a length of record tape in Fig. 6 of the accompanying drawings, with the code combination or permutation of perforations *p* formed in the tape for every printing character and action or function of the typewriter, as well as for certain functions of the apparatus in forming a perforated tape and in translating such perforated tape. Referring now to Fig. 6 of the drawings, I have identified the six (6) code perforation locations transversely across the tape, that is the six (6) longitudinal perforation receiving columns on the tape, by the numbers "1," "2," "3," "4," "5" and "6," respectively, placed adjacent the left hand end of the length of tape shown in Fig. 6. Along and adjacent the upper edge of the length of tape as shown in Fig. 6 (the right hand edge of the tape when facing the forward tape discharge side of either the perforating mechanism or of the translating mechanism, as shown in Fig. 3), I have indicated the particular printing character and action or function of the typewriter and of the apparatus, opposite and in line with the combination or permutation of perforations in the length of tape, constituting the code group for such printing character or action or function, respectively. Thus, for example, the first combination or permutation of perforations *p* at the left hand end of the length of record tape of Fig. 6, is the code group or designation for the "Stop" function of the apparatus of the invention, and it consists of perforations *p* in perforation locations "1," "2," "3," "4" and "6," respectively, on the record tape. Each printing character and each typewriter and apparatus function thus has a code designation or group of perforations which consists of a combination or permutation of perforations *p*, selected from the six (6) perforation locations across the tape. As a further example, selected from the code groups for the printing characters of the typewriter, by referring to Fig. 6, it will be seen that the code group for the letter "H" consists of the combination or permutation of perforations *p* in perforation locations "2," "3," and "4," transversely across the tape. It is not here deemed necessary to specifically refer to and recite the permutation of perforations constituting the code group for each typewriter printing character and each typewriter and apparatus function in accordance with the code of this example, as, with the explanation above as a guide, the code group for each character will be clear from and may be readily deciphered by reference to Fig. 6 of the drawings.

The record tape *r* for the apparatus of my invention of the present example, as hereinbefore referred to, is preferably, although not essentially, formed of standard or stock 35 mm. motion picture film provided with the opposite rows of sprocket holes *h* along and adjacent its opposite longitudinal edges, respectively, in accordance with standard motion picture film practice, with such sprocket holes *h* being of standard size and standard spacing longitudinally of the tape. The sprocket holes *h* in this standard motion picture film as used in this example, are so spaced that there are ninety-two (92) sprocket holes per linear yard of film. Thus, the groups or permutations of code perforations formed transversely across the tape and spaced apart longitudinally therealong, must be confined to the space between the opposite longitudinal rows of sprocket holes *h*, and the code perforations *p* in the number "1" perforation location and the perforations *p* in the number "6" perforation location, that is, the locations adjacent and next to the opposite rows of sprocket holes *h*, respectively, must also be spaced inwardly a sufficient distance from the adjacent line of sprocket holes *h* to preserve sufficient tape material between the code perforations *p* and the sprocket holes *h* to prevent tearing, breaking or structural failure of the film in operation and use. By the six (6) perforation code herein disclosed, it is possible to obtain the necessary number of combinations or permutations selected from six (6) perforations to provide a different combination or permutation for each printing character and typewriter and apparatus function, that is, in this instance, a total of fifty-one (51) combinations or permutations of perforations. The use of a code based upon only six (6) perforations makes it possible to locate and position the code groups consisting of the selected perforation combinations or permutations arranged in transverse rows, respectively, across the record tape *r* within the limited space or narrow width available between the sprocket holes *h* of standard 35 mm. motion picture film, or an equivalent dimensioned tape, and the practical and efficient positioning and location of such combinations or permutations within such a limited space is also materially aided by the design and arrangement of the punches and the mounting thereof by which a very close grouping of the punches of the perforating mechanism of my invention is made possible, as will be hereinafter described.

*The code bars of the coding mechanism*

The code bars CB1, CB2, CB3, CB4, CB5, CB6 and CB7 are, as hereinbefore described, so assembled and mounted that in their normal inactive positions the forwardly projected portions of the forward edges thereof contact, or are located substantially in the vertical plane that passes through the rear edges of the key bar arms 35 when such arms are in their normal positions with the key bars 30 in raised, inactive positions. The forward edges of the code bars CB1 to CB6, inclusive, are formed and constructed for selective permutative engagement with and rearward swinging by the arms 35, respectively, of the key bars 30 of the keyboard 6, so that a combination or permutation of the code bars CB1 to CB6, inclusive, is automatically selected and rearwardly swung by the depression of each key bar 30, in accordance with the combination or permutation of record tape perforations *p* which constitutes the code designation for the printing character or for the typewriter or apparatus function, represented by and assigned to that key bar 30 of the keyboard 6 which has been depressed. The code bars CB1 to CB6, inclusive, are assembled in position nested together with code bar CB1 lowermost, and the code bar CB6 uppermost, CB6 being positioned directly below code bar CB7. The code bar CB7, as will be hereinafter explained, is not a true code bar in the sense of code bars CB1 to CB6, as it is engaged and operated with every selected code permutation or combination of the code bars CB1 to CB6, inclusive.

The code bars CB1 to CB6, inclusive, so arranged and relatively positioned, in effect correspond to and may be said to represent the longitudinal columns, or the perforation locations transversely across the record tape *r*, identified as columns for perforation positions "1," "2," "3," "4," "5" and "6," respectively, on the record tape. Thus, if the code designation or code group of perforations consists of a combination of permutation of perforations in locations "1," "2" and "4" on the record tape, such combination being the code designation for the letter "A," as will be clear by reference to Fig. 6 of the drawings, then the combination or permutation of code bars corresponding to such code group of perforations will consist of the code bars CB1, CB2 and CB4. So the combination or permutation of code bars CB1 to CB6 to be selected and swung rearwardly by the rearward swinging of the key bar arm 35 by the depression of the key bar 30 which represents or corresponds to character or function of the typewriter or of the apparatus hereof, will consist of those code bars identified by the numbers corresponding to the perforation locations of the combination or permutation of perforations constituting the code designation or code group for the character or function represented by the key bar 30 that has been depressed.

Each of the code bars CB1, CB2, CB3, CB4, CB5 and CB6 has the forward edge portion thereof formed and constructed to provide a series of abutments 40 spaced apart longitudinally therealong and separated by slots or recesses 41. The abutments or projections 40 of each of the code bars CB1 to CB6, inclusive, are positioned on the code bar in alignment with and for engagement by rearward swinging of certain of the key bar arms 35, while the slots or recesses formed in the code bar are aligned with or face the remainder of the key bar arms 35. The depth of the slots or recesses 41 on each code bar is such that the key bar arms 35 which are aligned with or face such recesses, may be swung rearwardly through their range of rearward swinging without engaging the code bar. In this manner, by properly accurately positioning and locating the abutments 40 and the slots or recesses 41 on each code bar relative to each other and to the key bar arms 35, each key bar arm 35 can be caused upon rearward swinging thereof by depression of its key bar 30, to engage the abutments 40, respectively, aligned therewith and thus swing a desired combination or permutation of the code bars rearwardly while freely swinging into the slots or recesses aligned therewith, of those code bars which are not to be included in the particular combination or permutation desired, so that such code bars are not engaged by the rearwardly swinging key bar arm 35 and thus remain in their normal inactive position.

In order to illustrate the arrangement of the abutments 40 and slots or recesses 41 on the code bars CB1 to CB6, inclusive, by which a selected combination or permutation of such code bars is engaged and swung rearwardly by rearward rocking of each key bar arm 35, reference is made to Fig. 6 of the drawings, and to the arrangement of the abutments 40 and slots or recesses 41 in alignment with the key bar arm 35 of the key 30 representing the letter "R." The code designation or group of code perforations for the letter "R" consists of perforations in tape locations "1," "4," "5," and "6," as will be clear by reference to the length of record tape "*r*" and the code perforations therein as shown in Fig. 6. Hence, it is required that a combination consisting of code bars CB1, CB4, CB5, and CB6 be engaged and swung rearwardly by arm 35 of the key bar 30 representing the letter "R," when such key bar is depressed, and that code bars CB2 and CB3 be not engaged by arm 35, but remain in their normal at rest and inactive position. In order to effect the actuation of the desired combination or permutation of code bars CB1, CB4, CB5, and CB6, each of such code bars is provided with an abutment 40 in accurate alignment with and for engagement by the arm 35 of key bar 30 for the letter "R," while the code bars CB2 and CB3 are each formed to provide a recess 41 therein which is aligned with and which faces the arm 35 of the "R" key bar 30, as will be clear by reference to Fig. 6 of the drawings. Thus, when the operator depresses the letter "R" key bar 30 of the keyboard 6, the arm 35 of that key bar is rocked or swung rearwardly and engages the abutments 40 on the code bars CB1, CB4, CB5, and CB6, respectively, to simultaneously rock or swing such code bars rearwardly, but due to the recesses 41 in the code bars CB2 and CB3, with which the arm 35 of the "R" key bar 30 is aligned, the arm 35 will swing rearwardly into these recesses without engaging code bars CB2 and CB3, so that these latter code bars are not actuated and remain in their normal inactive position.

From the foregoing example of the arrangement of the abutments 40 and recesses 41, it will be apparent that in order to obtain the selective permutative actuation of the combination of code bars corresponding to the code designation or group of code perforations representing the character "R," those portions of the forward edges of the code bars CB1 to CB6, inclusive, which face and are in alignment with the rear edge of each key bar arm 35, must present an abutment 40 in alignment with each arm 35 on those code bars of the combination or permutation of code bars designated by numbers in this description which correspond to the designating numbers for the perforation locations, respectively, on the record tape which make up and constitute the combination or permutation of record tape perforations for the code designation or code group of perforations for the character or function represented by the key bar 30 with which each key bar arm 35 is connected and associated. In this manner the perforation code is translated or interpreted on the code bars CB1 to CB6, as abutments 40 on those code bars which are to be actuated by rearward swinging of a key bar arm 35, while unperforated perforation locations on the record tape are represented on the code bars by recesses or spaces 41. The arrangement of abutments 40 and recesses 41 on the code bars CB1 to CB6 in alignment with each key bar arm 35 corresponding to the code perforations constituting the code group for the character or function represented by the key bar 30 of each arm 35, is clearly illustrated in Fig. 6 of the drawings, and it is not believed necessary to specifically describe each arrangement herein.

Attention is directed to the fact that the bar CB7 is not formed or provided with any slots or recesses 41 therein, but has its forward edge 40a (see Figs. 3 and 6) completely unbroken, so that such forward edge provides a straight unbroken surface from end to end thereof, which surface is disposed in the vertical plane which passes through the forward edge surfaces of the abutments 40 on the code bars CB1 to CB6, inclusive. The bar CB7 is thus engaged and rearwardly swung by rearward movement of every one of the key bar arms 35, so that this bar CB7 is actuated with and as a part or element of every combination or permutation of the code bars CB1 to CB6, inclusive, for purposes and in order to carry out functions which will be described and explained in detail hereinafter.

*The electrical switches and electrical relays automatically controlled by and from the code bars*

The code bars CB1 to CB7, inclusive, which are selectively permutably controlled and actuated from the keyboard 6 of the apparatus, as above described and explained, are arranged to control and selectviely permutably actuate a group of eight (8) electrical switches identified as switches K1, K2, K3, K4, K5, K6, K7, and K8, respectively. The switches K1 to K8, inclusive, are grouped together in vertically disposed, side by side positions and are mounted immediately to the rear of the code bars CB1 to CB7, inclusive, being preferably located as a group, centrally or intermediate the longitudinal lengths of the code bars for actuation by rearward swinging of the code bars.

The arrangement of the switches K1 to K8, inclusive, is such that switch K1 is controlled by code bar CB1; switch K2 is controlled by code bar CB2; switch K3 is controlled by code bar CB3; switch K4 is controlled by code bar CB4; switch K5 is controlled by code bar CB5; switch K6 is controlled by code bar CB6; and both switches K7 and K8 are controlled by the code bar CB7. Thus, any permutation or combination of code bars actuated by the depression of a key bar 30 of the keyboard 6, will cause such code bars to actuate or control, in this example to close, a corresponding combination or permutation of the "K" switches. For example, if key bar 30 representing the letter "N" of the keyboard 6 is depressed, then as the code designation or group of code perforations for the letter "N" consists of perforations in tape locations "2," "3," and "5," code bars CB2, CB3, and CB5 will be rocked rearwardly, together with bar CB7, and a combination or permutation consisting of switches K2, K3, and K5, together with switches K7 and K8, will be actuated, that is in this instance will be closed. It will thus be apparent that for any combination or permutation of code bars actuated by a key bar 30 of the keyboard 6, there will result an actuation of a combination or permutation of the switches K1 to K6, inclusive, corresponding to each permutation of the code bars CB1 to CB6, inclusive, to close such switches, together with an actuation to close switches K7 and K8, by the bar CB7.

The "K" switches are each of similar design and construction and each consists of a base 42a to which are secured and mounted, suitably insulated from each other, the upper ends of a pair of depending switch arms 42 of electrical conducting, spring material. The switch arms 42 of each "K" switch are arranged so that in normal inactive position the lower ends of the arms which carry suitable switch contacts are spaced apart with the contacts out of engagement. The switch contacts carried by the lower ends of the switch arms 42 are brought into electrical engagement to close an electrical circuit through the conducting arms 42, by applying a force to one of the arms 42 in a direction to bend or flex such arm inwardly toward the other arm. When the flexing force applied to one of the spring material arms 42 is removed, such arm will spring back to its normal position disengaging switch contacts and thereby opening the electrical circuit through the switch arms 42.

A suitable vertically disposed mounting plate or switch panel 43 is secured to the bed or base 1 of the unit A, by a suitable mounting flange or flanges 43a (see Fig. 8). The switches K1 to K8, inclusive, are mounted on the forward side of the panel 43 in parallel, side by side, relation with the spring arms 42 of each switch depending downwardly in vertically disposed position transversely across but spaced from the rear edges of the code bars. In the instant example of a possible grouping and mounting of these K switches, the base 42a of each switch is secured to the forward side of the panel 43 in position vertically on the panel such as to locate the lower ends of its arms 42 in line with or at the vertical level of a horizontal plane passing through that particular code bar of the code bars CB1 to CB7, inclusive, which is to actuate and control such switch. Thus, it so happens that in this particular example, the "K" switches, being of similar design and construction, are mounted at different positions vertically on the panel 43, so that there results a grouping of the switches in a vertically stepped relationship, in which the switch K1 to be actuated by the code bar CB1 is mounted in the lowest vertical position, while the switches K7 and K8 which are to be actuated by the code bar CB7, are mounted in the highest vertical position or level on the panel 43, with the intermediate switches K2 to K6, inclusive, being mounted between switches K1 and K7 at progressively higher positions, respectively, between switches K1 to K7.

The relative locations of the switches K7 and K8 is not critical, the only mounting requirement for these switches being that the lower end of the switch arms 42 thereof be located in a vertical position or level for engagement by rearward swinging of the bar CB7. In the arrangement of these switches of the present example, switch K1 is located at the left hand end of the row of switches K1 to K7, inclusive, when facing the forward side of the keyboard 6, with the switch K7 located at the right hand end of this row, while the switch K8 is located to the left of switch K1, at, of course, the same height or level on panel 43 as that at which the switch K7 is mounted so that rearward swinging of bar CB7 will engage the lower end of the forward switch arm 42 of each of these switches K7 and K8, respectively.

The arms 42 of each "K" switch are formed of flat, spring material and each switch is mounted so that the forwardly positioned arm 42 thereof is engaged by a code bar, and, in this instance, a forwardly extending abutment member 42b, referring now particularly to Fig. 8 of the drawings, is secured on the forward arm 42 of each switch, in position aligned and engaged with the rear edge of that code bar which is adapted to actuate such switch. The opposed or facing inner sides of the lower ends of the arm 42 of each "K" switch are preferably provided with inwardly extending electrical contacts which are engaged by rearward flexing of the forwardly located arm 42 of the switch. In the group of "K" switches of this example, the forward, code bar flexed, arms 42 are provided on the rear (inner) sides thereof with contacts K1, K2, K3, K4, K5, K6, K7 and K8, respectively, while the rear or opposing arms 42 of these switches are provided on their forward (inner) sides with contacts K1', K2', K3', K4', K5', K6', K7' and K8', respectively, which are respectively aligned with the contacts K1 to K8, inclusive. The contacts of these "K" switches, as above described and identified, are schematically shown in their respective electrical circuits, in Fig. 13 of the accompanying drawings. Thus, the forward arm 42 of each of the "K" switches is adapted to be forced or flexed rearwardly by rearward swinging of that code bar which is aligned and in engagement with the electrical insulating material abutment 42b of the switch arm, to engage the switch contact of such forward arm with the switch contact on the rear switch arm 42 of the switch, so as to close the circuits through the switch arms 42. Upon release of the force which has swung or rocked a code bar rearwardly, the code bar swings forwardly and returns to its normal inactive position under the action of the flat spring 37a associated with the code bars, and the rearwardly flexed, forward switch arm 42 simultaneously springs forwardly to its normal inactive position to disengage the switch contacts and thus open the circuit in which the switch arms are connected and of which they form a part.

A series or group of electrical relays R1, R2, R3, R4, R5—R5a, and R6—R6a, are permutably controlled (energized) by and from the series of switches K1, K2, K3, K4, K5, and K6, respectively, such switches being connected in and adapted to close and open electrical circuits to, and to thereby energize and deenergize, the above identified relays which are controlled by said switches, respectively. The group of relays R1 to R6—R6a, inclusive, are, in the example of an embodiment of apparatus of the invention here disclosed, assembled with and form a part of group B, of the two major groups of mechanisms as hereinbefore identified and described, and such relays are mounted assembled adjacent to the group of solenoids forming part of the typewriter actuating mechanism of group B, as will be described and explained in detail hereinafter. These "R" relays are disclosed in front elevation in Fig. 5 of the accompanying drawings, and are schematically disclosed, together with their armature actuated contacts and the various operating circuits controlled thereby, in Fig. 13 of the drawings. The details of design and construction and the operation and functioning of the relays R and the various circuits for controlling, and the various circuits controlled by, these relays will be fully described and explained hereinafter.

The circuits through the magnets or solenoids of the "R" relays, respectively, are controlled by the "K" switches, and these relays are normally de-energized and inactive with the "K" switches in the respective circuits to these relays in their circuit opening and inactive positions. The relays "R" are energized and rendered active by and in accordance with the combination or permutation of the "K" switches closed by rearward swinging of a combination or permutation of the code bars CB1 to CB7, inclusive. That is to say, there is an "R" relay electrically connected with and controlled by each of the switches K1, K2, K3, K4, K5 and K6, so that any combination or permutation of "K" switches which has been closed by a combination of code bars will result in the energization of the corresponding combination or permutation of the relays "R." Taking the example hereinbefore referred to in connection with the actuation or control of the "K" switches by the code bars when the key bar 30 representing the letter "N" is actuated, it will be noted that in accordance with the code, a permutation consisting of code bars CB2, CB3, and CB5, is selected and actuated, which results in an actuation of a permutation of "K" switches consisting of switches K2, K3, and K5, together with an actuation of the switch K7 by the bar CB7 which, as hereinbefore pointed out, is always actuated with every combination or permutation of the code bars. Now, in accordance with the arrangement of an apparatus of the present invention, the closing of the "K" switches K2, K3, and K5, will, through the medium of electrical circuits to the relays in which these switches are connected, result in the energization of a combination or permutation of the relays R2, R3, and R5—R5a. In this manner, there is an activation or energization of a combination or permutation of "R" relays in accordance with and corresponding to the actuation or closing of the combination or permutation of "K" switches which are respectively connected with such "R" relays, so that every combination or permutation of the code bars CB1 to CB7, inclusive, is channeled through the "K" switches to result in the energizing of a corresponding combination or permutation of "R" relays.

The group of relays R1 to R6—R6a, inclusive, basically control all of the operations of the record tape perforating mechanism, the record tape translating mechanism, and the typewriter actuating mechanism, in that all of the electrical circuits which control the operations of such mechanisms are controlled by and through the medium of selective permutable energization of these relays. These "R" relays control the operation of the perforating mechanism when that mechanism is being operated to encode a record tape by manual actuation of the keyboard 6, and also control the operation of the record tape perforating mechanism when the latter is being automatically operated by and from automatic operation of the translating mechanism, in order to cause the perforating mechanism to form a record tape duplicating the tape being translated by the translating mechanism. Such "R" relays control the automatic operation of the typewriter 10, when such typewriter is being automatically actuated by and from the operation of the translating mechanism to translate a record tape, as well as the actuation of the typewriter when the latter is being operated by manual actuation of the keyboard 6 of the apparatus, with or without simultaneous operation of the perforating mechanism. Similarly, these "R" relays function to control and cause simultaneous operation of both the record tape perforating mechanism and the typewriter 10 by manual actuation of the keyboard 6, to cause the perforating mechanism to encode a message on the record tape and the typewriter to simultaneously type or print the message being so encoded.

*The record tape perforating mechanism*

The mechanism for perforating the coded groups of perforations in the form of transverse rows across a record tape *r*, with such rows of perforations spaced longitudinally along the length of the tape, is in this example included in the major group A, of mechanism of the apparatus, and is generally identified by the reference character 50 on the accompanying drawings. This perforating mechanism 50 is mounted on the base plate 1 of group A in position located on the left hand end or side of base plate 1 adjacent the left hand end of the keyboard 6 of the apparatus, as will be clear by reference to Figs. 2 and 3 of the drawings in particular.

The perforating mechanism 50 includes a main punch frame structure, referring now to Figs. 2, 3, 7, 7a, 7b, of the drawings, having the spaced, vertical side members or plates 44 secured on the base 1 adjacent the left hand end of the keyboard 6. Vertically spaced upper and lower plates 45 and 46 are provided in parallel horizontally disposed positions extending transversely across and between the frame side members 44, intermediate the upper and lower ends of said side members, to form record tape guide plates providing a space therebetween open at the forward and rear sides of the frame structure, for receiving and through which the record tape *r* is adapted to be fed, step by step, during the tape punching or perforating operations.

The perforating mechanism includes a series of six (6) punches 51, 52, 53, 54, 55, and 56, respectively, which punches are mounted in parallel relation in a side by side grouping thereof in vertically disposed position to form the punches in a straight row between the frame side members 44 above the guide plates 45 and 46 in position disposed transversely of and across the tape receiving space between these plates. In this example, vertically spaced, horizontally disposed webs or plates 47 and 48 are provided in position extending transversely across and between the side members 44 of the frame structure, above the upper guide plate 45 and intermediate such guide plate and the upper ends of the side members 44. The punches 51 to 56, inclusive, are reciprocally mounted in vertically disposed position extending slidably through vertically aligned bores, respectively, in the webs, with the lower, punching ends of the punches received in bores in the upper plate 45 aligned with the punches 51, 52, 53, 54, 55, and 56, respectively. Thus, each of the punches 51 to 56, inclusive, is mounted for vertical reciprocation in the webs 47 and 48 with the lower punching end of each punch guided in a bore in the upper plate 45, so that each punch can be forced downwardly through its bore in the plate 45 to traverse the tape receiving space between plates 45 and 46 to carry out a punching and tape perforating stroke.

The lower plate 46 provides a die or punch plate and is provided with a transverse row of bores or perforating openings 46a therethrough, axially aligned with the punches 51 to 56, respectively, for receiving the punching ends of the punches and to present cutting edges surrounding the upper sides of the bores for cooperation with the punching ends of the punches to form clean, accurate perforations through a record tape resting on the upper surface of the lower die plate 46. These bores 46a extend completely through plate 46 in order that the cuttings from the record tape may be discharged downwardly therethrough at the underside of plate 46. If desired, a suitable removable receptacle 49 having its upper side open, may be provided for location between the frame side members 44, beneath the die or punch plate 46, for receiving and collecting the perforation cuttings discharged through bores 46a, from the perforating operations of the punches. Such a receptacle 49 is disclosed in cutting receiving position in Fig. 7 of the drawings.

The punches 51 to 56, inclusive, are individually, selectively, vertically reciprocal and are adapted to be operated on their punching strokes in permutations or combinations thereof selected by and in accordance with the combinations or permutations of "R" relays, which are energized by manual operation of the keyboard 6, or by automatic operation of the translating mechanism of the apparatus in translating a perforated record tape. The punches 51 to 56, inclusive, are positively actuated on their punching strokes by forces applied thereto by the energization of solenoid magnets of a group of such magnets forming a part of the perforating mechanism, but, in this example, the punches are returned to raised inactive positions upon the completion of the punching strokes of any of the punches and the removal of the forces positively applied thereto for effecting the punching strokes, by the action of spring units which have been placed under tension by the downward reciprocation of the punches on the punching strokes. Each of the punches 51 to 56, inclusive, is provided with a separate, individual spring unit for effecting the return of the punch to normal raised and inactive position, upon the completion of a punching stroke. In the design and mounting of such spring units of the present example, each spring unit is formed by a coiled expansion spring 57 which is mounted on and around a punch concentric therewith, either between the spaced webs 48 and 47 of the frame structure or between the web 47 and the plate 45 spaced below web 47, in such a manner that the spring 57 is compressed and placed under tension by the downward, punching stroke of the punch, so that, upon completion of the punching stroke, the spring will expand and raise the punch to its normal inactive position with its lower end removed from the tape receiving space between plates 45 and 46.

Each punch returning spring 57 is, in this example, mounted on and attached to its punch, referring now to Figs. 7*a* and 7*b* of the drawings, by extending the upper free end 57*a* of the spring through a transverse bore in the punch, and then making one or more tight turns or coils of the spring wire around the punch at and adjacent the spring receiving bore. In this manner a spring 57 is attached to its punch with the lower end of the spring seated and supported upon the upper surface of either a web 45 or a web 47, so that the punch is supported and maintained in its normal raised inactive position by the spring 57. Downwardly acting forces are applied to the upper end of each punch for effecting the downward punching stroke thereof, and due to the attachment of the upper end of the spring 57 to the punch, the spring is compressed by the downward movement or stroke of the punch, between its attached upper end and the supporting surface on which it is seated at its lower end, so that, the punch return spring is placed under tension and will expand and raise the punch to normal inactive position upon removal from the punch of the downwardly acting punching forces applied thereto.

The record tape *r* which is received in the space between plates 45 and 46 and which is fed, step by step, forwardly therethrough under the row of punches 51 to 56, inclusive, as will be hereinafter described, is, in this particular example, formed of standard 35 mm. motion picture film, or is a tape of equivalent dimensions, and as hereinbefore pointed out, such tape offers a limited width or transverse space between the opposite longitudinal edge rows of sprocket holes *h*, within which to form a transverse row of perforations *p* and to accurately locate such perforations within the six perforation locations across the tape. Thus, the punches 51 to 56, inclusive, must, of necessity, be grouped closely together, with preferably the minimum of spacing therebetween which will permit of efficient mounting and operating clearance for the punches.

In order to permit of minimum spacing between the punches 51 to 56, inclusive, while permitting the use of sufficiently heavy punch returning springs 57 to generate forces of a magnitude to raise the punches and the weight of the associated actuating mechanism for effecting the punching strokes of the punches, I have devised a mounting arrangement for the springs 57 which will permit of the use of springs of the required size to generate the necessary punch returning forces while obtaining a minimum spacing between the row of six (6) punches 51 to 56, inclusive. In this arrangement, referring now to Figs. 7*a* and 7*b* of the drawings, each spring 57 is of a length when expanded with its punch in raised inactive position, to be located and confined either below web 47 between the plate 45 and such web, or above the web 47 between the web 48 and such web 47. The springs 57 are then arranged and mounted on adjacent punches of the row of punches 51 to 56, inclusive, alternately above and below the web 47, so that in effect the punch returning springs 57 are alternately vertically staggered across the row of punches. In the example shown, referring now particularly to Fig. 7*a* of the drawings, the punch 51 is located at the left hand end of the row of punches when facing the perforating mechanism from the front of the apparatus, and the punch 56 is located at the right hand end of the row, with punches 52, 53, 54 and 55 positioned therebetween in that order from punch 51 to punch 56. The punch returning spring 57 for punch 51 is positioned on that punch between the webs 47 and 48 in elevated position above web 47, while the spring 57 on the next adjacent punch 52 of the row of punches is positioned below web 47, between the plate 45 and the web 47, in position spaced below the spring 57 on punch 51. The spring 57 on punch 53 is located in elevated position above web 47 between such web and web 48, and thus the springs 57 for the succeeding punches 54, 55, and 56, respectively, of the row of punches are alternately mounted in positions above and below web 47, with the spring 57 for punch 56 at the right hand end of the row of punches located in position above web 47 between plate 45 and the web 47. By thus alternating the positions of the springs 57 on the punches to positions above and below the web 47, the punches may be placed close together with a minimum of spacing therebetween without interference between adjacent punch returning springs 57, while utilizing sufficiently heavy springs to generate the required punch return forces.

The tape perforating punches 51 to 56, inclusive, are selectively permutably operated to effect the punching or tape perforating strokes thereof, by a group of six (6) solenoid magnets PM1, PM2, PM3, PM4, PM5, and PM6. The punch actuating solenoid magnets PM1 to PM6, inclusive, are mounted grouped in a compact assembly spaced to the rear of the main punch frame on a suitably elevated supporting structure or platform 58, as disclosed particularly by Figs. 3 and 7 of the drawings. These punch actuating solenoid magnets are mounted with the coils thereof vertically disposed on the support structure 58, and are arranged in two (2) rows of three (3) magnets each with magnets PM1, PM3, and PM5 in the forward row when facing the apparatus, and with magnets PM2, PM4 and M6 in the back or rear row and staggered relative to the magnets of the forward row. This staggered arrangement of these punch actuating solenoid magnets will be clear by reference to Fig. 3 of the drawings. The solenoid magnets PM1, PM2, PM3, PM4, PM5, and PM6 are provided with vertically disposed armatures 61', 62', 63', 64', 65', and 66', respectively, which are adapted to freely vertically reciprocate within the magnet coils, and in normal inactive and deenergized condition of the solenoid magnets, the armatures 61' to 66' thereof are in elevated position projecting vertically upwardly from the solenoid magnets, so that upon energization of the magnets the armatures are drawn vertically downwardly into the magnet cores.

The armatures 61', 62', 63', 64', 65' and 66' are coupled and connected with the rear ends of a series of punch actuating levers 61, 62, 63, 64, 65 and 66, respectively, which levers are pivoted or fulcrumed at their forward ends for vertical rocking in operative association with the upper ends of the punches 51, 52, 53, 54, 55 and 56, respectively, for effecting the punching strokes of the punches under the selective control of the solenoid magnets PM1 to PM6, inclusive.

The punch actuating levers 61 to 66, inclusive, are pivotally mounted at their forward ends on a horizontally disposed fulcrum rod 59 which is mounted and positioned extending transversely across and above the forward side of the horizontal web 48 of the main punch frame structure, with the opposite ends of said rod 59 secured and fixed in the opposite side members 44 of the frame structure. A cap plate 59*a* is secured in horizontal position extending across and between the upper ends of the side members 44 of the frame structure over and across the punch actuating levers 61 to 66, inclusive, and the rear underside of this cap plate 59 provides a stop structure which limits upward swinging or rocking of the punch actuating levers.

The forward ends of the punch actuating levers 61 to 66, inclusive, which are pivotally mounted on the rod 59, are suitably spaced apart on the rod 59 so as to extend rearwardly over and across and in alignment with the upper ends of the punches 51 to 56, inclusive, with the upper ends of the punches engaging the under or lower edge surfaces of the punch actuating levers, respectively. Any suitable spacing elements may be provided on the rod 59 to maintain the proper spacing between the punch actuating levers and to prevent lateral displacement of the levers from such spacing with resultant misalignment of the levers with the punches, such for example, as vertical webs or flanges depending from the under side of plate 59*a* and disposed between and separating the punching actuating levers, with the rod 59 extending transversely through and across and between such flanges or webs.

The punch actuating levers 61, 62, 63, 64, 65 and 66 extend rearwardly from the fulcrum rod 59 to the upper ends of the solenoid magnet armatures 61', 62', 63', 64', 65' and 66', respectively, and are coupled to their rear ends to these armatures. As will be clear by reference to Fig. 3 of the drawings, the punch actuating levers diverge or spread laterally outwardly to the respective armatures of the solenoid magnets PM1 to PM6, inclusive. The solenoid magnet armatures are hung or suspended from the rear ends of the punch actuating levers to form a relatively loose coupling with the levers, and in this example, such coupling arrangement is carried out by providing a vertical slot 67 in the upper end of each of the armatures 61' to 66', inclusive, which slot opens through the upper end of its armature. A pin 67*a* is fixed extending transversely through the armature across and bridging the upper end of each of the slots 67 in the armatures. The rear free end of each of the punch actuating levers 61 to 66, inclusive, is extended rearwardly through the slot 67 in the armature with which it is coupled, with the pin 67*a* at the upper end of the slot engaging and supported upon the upper edge of the actuating lever, so that the armature is in effect suspended from the actuating lever in position with its lower end portion within a solenoid magnet, in position for the armature to be drawn downwardly to rock the actuating lever connected therewith downwardly upon energization of the solenoid magnet. Downward movement of the armature will thus rock the punch actuating lever connected therewith downward to force and effect a perforating stroke of that punch which is engaged by such punch actuating lever. By this mounting and coupling of an armature of a solenoid magnet to a punch actuating lever, the necessary relative rocking or pivotal movement therebetween is obtained.

A series of stop screws 68 are provided threaded into vertically disposed bores in a block member 68*a* at and across the rear side of the main frame structure, with these screws projecting upwardly a distance above the upper surface of the block 68*a* in alignment with and for engagement by the underside edges of the punch actuating levers 61, 62, 63, 64, 65 and 66, respectively, to provide adjustable stops limiting the downward swinging or rocking movement of the punch actuating levers. Thus, by adjusting a stop screw 68, the length or extent of the punching stroke of the punch actuated by the lever aligned with a stop screw 68, can be adjusted and determined.

In the present example of perforating apparatus designed for use with record tape, such as standard 35 mm. motion picture film, I have formed the punches 51 to 56, inclusive, from rods of cylindrical cross section to form the code perforations *p* in the tape as of circular shape. In actual operations of the perforating mechanism of this example, I have found #50 drill rod efficient and of a satisfactory diameter for such punches, as the perforations formed thereby in the tape are of a diameter to enable efficient spacing between perforations. Obviously, however, my invention is not limited to the use of #50 drill rod for the punches, or to punches of the exact diameter or cross sectional shape of #50 drill rod.

With the foregoing design and arrangement of punching or perforating mechanism, when the solenoid magnets PM1, PM2, PM3, PM4, PM5 and PM6 are de-energized, the punch springs 57 are in expanded position supporting and holding the punch actuating levers 61 to 66, inclusive, in their upwardly swung or rocked, inactive positions with their upper edges engaged against the cap plate 59*a* of the main frame structure, and with the solenoid magnet armatures 61' to 66', inclusive, suspended and supported on the free ends of the punch actuating levers, respectively, in raised and inactive positions in and relative to the solenoid magnets. In such position of the punches, the lower punching or cutting ends thereof are positioned in the guide plate 45 above and removed from the tape receiving space below such plate, and the punch cutting levers are spaced a distance above and out of engagement with the series of adjustable stop screws 68, respectively, as will be clear by reference to Fig. 7 of the drawings.

When any one of the solenoid magnets PM1 to PM6, inclusive, is energized, its armature is drawn downwardly and the punch actuating lever connected with that armature is rocked downwardly about the rod 60 at the forward end of the lever as an axis, and the perforating punch engaged by such lever is forced downwardly on its perforating stroke against the force exerted by the punch return spring 57 on that punch, until the end edge of the actuating lever engages the stop screw 68 aligned with that lever. At this point, the end of the perforation stroke has been reached and the punch will have traversed the space between the guide plates 45 and 46 and will have pierced or traversed the record tape in such space and punched a perforation therein. Immediately upon the de-energization of the energized solenoid and the removal of the downwardly acting forces applied to the rear end of the actuating lever associated with such solenoid, the punch return spring 57 on the punch which has completed its perforating stroke, will exert forces of a magnitude to rock the actuating lever upwardly until the lever engages the cap plate 59. With the actuating lever in such raised position against the stop provided by cap 59a, the punch will have been raised to inactive position removed from the tape receiving space below plate 45, and the solenoid magnet armature coupled to the rear end of such lever will have been lifted and raised to normal inactive position ready for downward withdrawal when its solenoid magnet is next energized.

*The tape feed of the perforating mechanism*

The record tape *r* is fed, step by step, through the perforating mechanism between the guide plates 45 and 46 and beneath the row of punches 51 to 56, inclusive. Such a tape feed may, as in the embodiment of the present example, include a sprocketed tape feed roller 70 mounted in horizontally disposed position on the shaft 70*a* which is rotatably journalled at its opposite ends in spaced arms 70*b*, respectively, extending generally horizontally forwardly, in this instance from the opposite side plates 44 of the main frame of the perforating mechanism. The feed roller 70 is thus mounted for rotation about the horizontal axis provided by the shaft 70*a*, and is horizontally positioned spaced a distance forwardly from the forward side of the main frame structure, and is positioned vertically with the record tape engaging peripheral surfaces of the feed roller disposed substantially in a forward projection of the horizontal plane which passes through the upper, tape engaging surface of the punch plate 46.

The tape feed roller 70 is provided with the opposite tape engaging sprocket wheels 71 at opposite ends, respectively, of the roller, concentric with the roller shaft 70*a*, the peripheral tape engaging surfaces of said sprocket wheels 71 all being of the same external diameter. Each sprocket wheel 71 is formed with a flat peripheral surface or rim 71*a* therearound concentric with the axis of the feed roller, and a series of radially projecting sprocket teeth 72 are provided spaced around such peripheral surface or rim of each wheel for engaging the sprocket holes *h* of one of the rows of such holes along the longitudinal edge of the record tape *r*. The sprocket teeth 72 are positioned circumferentially around and centrally of the peripheral surface or rim 71*a* of a sprocket wheel 71, and like the opposite sprocket wheel 71, are relatively positioned and spaced apart longitudinally of the feed roller 70, so that the distance of spacing between the centers of the sprocket teeth 72 on these wheels is the same as the distance or spacing between the centers of the opposite longitudinal edge rows of sprocket holes *h* on the record tape *r*, so that the record tape *r* may be extended forwardly from and between the guide plates 45 and 46 over and partially around the upper forward side of the feed roller 70 with the opposite rows of sprocket holes *h* on the record tape accurately engaged by the sprocket teeth 72 on the opposite sprocket wheels, respectively, of the feed roller.

The record tape *r* is shown in Fig. 7 of the drawings in position being fed through the perforating mechanism between the plates 45 and 46, slidably resting upon the upper surface of the die or punch plate 46 beneath the transverse row of punches 51 to 56, inclusive, and extending forwardly from the perforating mechanism over and around the upper side of the feed roller 70 with the sprocket teeth 72 of the feed roller engaged in the opposite rows, respectively, of sprocket holes *h*, so that forward rotation of the feed roller 70 will draw the record tape *r* forwardly through the perforating mechanism beneath the row of punches 51 to 56.

In order to maintain the record tape in operative engagement on and over the feed roller 70, a suitable presser roll 73 may be provided mounted in horizontally disposed position across and between a spaced pair of arms 73*a* which are suitably pivotally mounted at their upper ends at 73*b* to the main frame structure. The pressure roll is preferably spring loaded in a manner such that it is pressed in operative position against the feed roller and the tape thereon by spring tension. In operative position maintaining the record tape *r* on the feed roller 70, the presser roll 73 engages the record tape at opposite sides of the sprocket teeth 72 of the opposite sprocket wheels 71, respectively, and maintains the record tape pressed against the peripheral surface of the sprocket wheels. The presser roll 70 is vertically swingable to raised position, such as shown in dotted lines in Fig. 7, removed from the feed roller to permit mounting a record tape on or removing the same from the feed roller.

The record tape feed roller 70 is automatically actuated during operation of the perforating mechanism, to feed the record tape, step by step, beneath the punches 51 to 56, and in this particular example, each feeding step of the record tape moves that tape ⅛", so that there results a spacing between the transverse rows of cut perforations formed in the record tape by the punches of a distance of ⅛" between a transverse line drawn through the centers of perforations of adjacent rows of perforations which are in alignment longitudinally on the tape. Each feed of the tape through a ⅛" step is accomplished, in this instance, by a rotation of the feed roller 70 through 1/24 of a complete revolution, that is, one revolution of the feed roller 70 feeds the record tape *r* through twenty-four (24) one-eighth inch (⅛") steps.

The step by step rotation of the tape feed roller 70 through partial revolutions to feed the tape step by step through the punching mechanism, is carried out, in this example, through the medium of a ratchet 74 mounted on the tape feed roller shaft 70*a*, for rotation with the shaft. In this instance the ratchet wheel 74 is mounted on shaft 70*a* at the right hand end of such shaft when facing the perforating mechanism. A ratchet actuating lever 75 is mounted on an extension of the shaft 70*a*, in vertically disposed position for forward and rearward rocking or swinging movement independently of the shaft, the lever 75 being mounted on the shaft 70*a* intermediate the ends of the lever. A pawl 74*a* is rockably mounted on a stud shaft 74*b* extending transversely of and outwardly from the inner side of the lever 75 in position below the ratchet 75 for operative engagement with the ratchet teeth on rearward strokes of lever arm 75. The pawl 74*a* is spring loaded and normally constantly maintained in engagement with the teeth of the pawl 75, so that, upon forward rocking of that portion or arm of the lever 75 below ratchet 74, the pawl 74*a* rides over the teeth of the ratchet, while rearward rocking of the lever 75 engages the pawl with an adjacent tooth of the ratchet and results in rotation of the ratchet and of the feed roller 70 in a direction to cause the side of the roller 70 that is uppermost to move or rotate in a direction outwardly away from the punching mechanism.

The pawl-carrying lever arm 75 is actuated on its forward non-feeding stroke by the energization of a solenoid magnet 76, and is actuated upon its feeding stroke after engaging pawl 74*a* with ratchet 74, by a spring 77 which is placed under tension by the actuation of the lever arm 75 by the magnet 76 on the non-feeding stroke of the lever arm 75. In such an arrangement as here disclosed by way of example, the solenoid magnet 76 is mounted in horizontally disposed position on the base 1 of unit or group A, to the rear of the lower end of the pawl-carrying lever arm 75, and such magnet includes an armature 76*a* which is positioned projecting or extending outwardly a distance from the rear end of the magnet 76. The feed stroke actuating spring 77 is attached at its rear end to a post 77*a* fixed in position on base 1 spaced to the rear of magnet 76, and the forward end of the spring 77 is attached to the rear end of the armature 76*a* of the magnet 76. The forward end of the armature 76*a* of the solenoid magnet 76 is connected to an extension or link 75*a*, which link extends forwardly to and is pivotally coupled with the lower end of the lever arm 75, so that horizontal reciprocation of the link 75*a* will result in horizontal rocking of the lever arm 75 about the axis of the feed roller shaft 70*a*. This link 75*a* is of non-magnetic material so as to be unattracted by the field established by the energization of the solenoid magnet 76.

When the solenoid magnet 76 is de-energized, the armature 76*a* and the link 75*a* are in their position of maximum rearward movement, with the spring 77 in its normal contracted condition, and with the lever arm 75 in its maximum rearwardly swung position for the completion of a feeding stroke. When the solenoid magnet 76 is energized, the core 76*a* is drawn forwardly expanding the spring 77 and placing the spring under tension, and the lever arm 75 is swung forwardly to position for the start of the next feeding stroke thereof with the pawl 74*a* engaged with a tooth of the ratchet 74. Upon de-energization of the solenoid magnet 76, the spring 77, having been expanded and placed under tension by the forward non-feeding stroke, applies forces to the armature 76*a* acting rearwardly thereon to draw the armature rearwardly and thus, through link 75*a*, rock the lever arm 75 rearwardly, so that the pawl 74*a* being engaged with a tooth of the ratchet wheel 74, will rotate the ratchet and the feed roller 70 through the partial revolution constituting one feed step of the roller.

The arrangement of the tape feed mechanism, including the feed roller 70, and its synchronization with the punching operations, are such that when the punches are operated to form a line of code perforations transversely of the tape, the tape is at rest, and the solenoid magnet 76 is energized to actuate the pawl-carrying lever 75 on its return, non-feed stroke. Upon the completion of the perforating operation by the punches, the solenoid magnet 76 is de-energized, and the spring 77 then causes actuation of the lever arm 75 and the pawl 74*a* carried thereby, to engage the ratchet 74 and rotate the feed roller 70 through a partial revolution to feed the tape forwardly through the perforating mechanism to position the next portion of the tape to be perforated beneath the row of punches 51 to 56, inclusive.

The record tape *r* may be supplied in the conventional manner in a tightly wound roll, and a suitable holder identified generally by the reference numeral 78 on the drawings, is provided in position mounted on the base 1 of the unit or group A, spaced to the rear of the perforating mechanism (see Fig. 3) for receiving a roll of the tape *r*, with the roll mounted in vertically disposed position therein aligned with the passage between the plates 45 and 46 of the perforating mechanism. The roll of tape *r* in the holder 78 is mounted for rotation about a horizontally disposed axis provided by a suitable shaft 78*a* removably mounted in the holder 78, and the tape *r* is adapted to be unwound from the lower or under side of the roll and to be extended forwardly therefrom beneath the supporting stand or base 58 for the punch actuating magnets PM1 to PM6, inclusive. The tape *r* from the roll on the holder 78, referring now to Figs. 3 and 7, is then extended upwardly to and forwardly through and between plates 45 and 46 beneath the row of punches 51 to 56, inclusive, and outwardly and forwardly from the plates 45 and 46 over and forwardly around the feed roller 70, with the opposite longitudinal edge sprocket holes *h*, respectively, of the tape *r*, fitting over and engaged with the sprocket teeth 72 of the sprocket wheels 71, respectively, of the feed roller 70. A suitable friction brake member 79 is pivotally mounted on the holder 78, and is adapted to frictionally engage the rear side of the roll of tape *r* in the holder 78, to prevent overrunning of the roll as the tape is drawn forwardly therefrom by the step by step feed thereof through the perforating mechanism. The brake member 79 may be suitably spring loaded, as will be readily understood.

If desired or found expedient, as shown in the example hereof, referring now particularly to Fig. 7 of the drawings, spaced upper and lower wiper members 45′ and 46′, which may be covered on their inner faces with felt or some other suitable material, are provided in horizontally disposed position across the rear sides of the guide plates 45 and 46, respectively, for receiving and between which the length of record tape *r* from the roll in holder 78 extends before passing forwardly to and between the guide plates 45 and 46. These wiper plates 45' and 46' are so spaced vertically as to lightly frictionally engage the upper and lower surfaces, respectively, of the record tape as the same is drawn forwardly therethrough by the step by step feed of the tape by the feed roller 70.

A toothed wheel 85, of the character of a star wheel, is mounted and fixed on the shaft 70a of the feed roller 70, being positioned on that shaft spaced from the inner side of the cam disk 83, and a spring loaded dog or detent 85a is provided in constant engagement with the toothed periphery of such wheel, with the wheel so positioned on the shaft 70a that on the completion of each feed step of the feed roller 70, the toothed wheel 85 is positioned so that the detent or dog 85a is aligned with and spring pressed into a notch between adjacent teeth on the wheel. By the operation of this toothed wheel 85 and its associated spring loaded dog or detent, any possible overrun of the tape feeding roller 70 is prevented and accurate, step by step, feed of the tape is insured (see Fig. 12).

*The semi-automatic gauging switch of the tape perforating mechanism*

A semi-automatic gauging switch is associated with the tape perforating mechanism and the tape feed thereof for selective control by the operator to cause actuation of the perforating mechanism to punch properly located reference perforations in the tape for use in making up an endless tape and in correctly mounting the prepared endless tape in proper starting position relative to an index line on the feed roller of the translating mechanism, as will be hereinafter fully described and explained. In the expression hereof of a possible embodiment of such a semi-automatic gauging switch, referring now to Figs. 3 and 12 of the drawings, a standard or conventional type of micro-switch G is provided which, in this instance, is mounted in generally vertically disposed position along the left hand side of the frame member of the main frame of the punching mechanism. This micro-switch, as is customary, includes a switch actuating pin 80 (see Fig. 12) which projects horizontally forwardly from the switch G and is exposed at the exterior of the forward side of the switch. The micro-switch G includes the contacts G4 and G5 which are opened and closed by actuation of the pin 80; these contacts of the switch G being schematically shown in the circuit diagram of Fig. 13 of the drawings, but not being shown in Fig. 3 or 12. A spring arm 81 is secured at its upper end at the forward side of switch G and depends downwardly across and is in engagement with the forward end of the switch actuating pin 80. This arm 81 is adapted to be horizontally flexed, forwardly and rearwardly, to actuate the pin 80 to open and to close the contacts G4 and G5 of the switch G. A manually operable switch lever 82 is pivotally mounted at the forward side of micro-switch G in front of the spring arm 81 for horizontally rocking about a horizontal pivot pin 82a disposed transversely across and spaced forwardly from the arm 81 a distance below the switch actuating pin 80, as will be clear by reference to Fig. 12 of the drawings. The manually operable lever 82 is provided at its lower end with the inwardly projecting camming lip 82b disposed transversely across and in engagement with the forward side of the spring arm 81 a distance below the switch actuating pin 80. By this arrangement, with the manual switch lever 82 in its rearwardly swung position, as shown in Fig. 12 of the drawings, the camming lip 82b is swung forwardly to a position permitting the arm 81 to swing forwardly and thus release the switch actuating pin 80 to permit the pin to move forwardly to position to open the switch contacts G4 and G5 (see Fig. 13). By swinging the lever 82 forwardly, the camming lip 82b thereof forces the spring arm 81 rearwardly against the switch actuating pin 80 to force that pin inwardly to a position closing the contacts G4 and G5 of the switch G. In such forwardly rocked position closing contacts G4 and G5 of switch G, the manual switch lever 82 is locked in such position by the action of the camming lip 82b relative to the axis 82a of the lever 82, so that the forces exerted by the switch actuating pin 80 and the spring arm 81 are ineffective to alone rock or swing the lever 82 from its switch closing position.

A cam disk 83 is mounted on the left hand end of the shaft 70a of the feed roller 70, being fixed to that shaft for rotation therewith. The periphery 83a of the cam 83 is concentric with the axis of the shaft 70a except for an arcuate recess 83b therein. The lower end of the spring arm 81 for operating the switch actuating pin 80 is provided at its lower end with a roller 84 mounted for rotation on a horizontal pin 84a disposed transversely across the forward side of arm 81 with the roller 84 positioned to engage and have rolling contact with the periphery 83a of the cam disk 83, as will be clear by reference to Fig. 12 of the drawings. The diameter of the cam disk 83 and the positioning of the roller 84 on and relative to the frame 81 and to the periphery of the cam disk 83 is such that, when the periphery 83a of the cam disk is in engagement with the roller 84, the arm 81 is swung rearwardly to and maintained in position with the switch actuating pin 80 forced inwardly to maintain the contacts G4 and G5 of the switch G in circuit closing position. When, however, the cam disk 83 has been rotated to a position in which the recess 83b in the periphery 83a thereof is opposite and aligned with the roller 84, the roller 84 snaps or drops into the recess under the action of the spring arm 81, so that such arm is permitted to move forwardly to a position in which the switch actuating pin 80 moves forwardly to a position in which the contacts G4 and G5 of the switch G are disengaged and the circuit through such contacts is thereby opened.

Thus, it will be apparent that with the manual switch control lever 82 swung rearwardly to rock the camming lip 82b thereof to a position moved forwardly to release the spring arm 81, when the roller 84 on this spring arm is in engagement with the periphery 83a of the cam disk 83, the arm 81 will still be maintained pressed rearwardly in position forcing the switch actuating pin 80 to maintain the switch contacts G4 and G5 in engaged circuit closing position. If, then, the cam disk 83 is rotated with the tape feed roller 80 on the shaft 70a, until the roller 84 on the arm 81 is opposite or aligned with the recess 83b in the periphery of the cam disk 83, the roller will, under the action of the spring arm 81, snap forwardly into the recess 83b to thus permit the arm 81 to move forwardly and release the pin 80 to open or disengage the switch contacts G4 and G5 and thus open the electrical circuit through such contacts.

The purpose of the semi-automatic gauging switch organization G is to enable the operator to punch reference or gauge perforations at the start and at the end of a perforated, coded portion of the tape, in order to mark off thereon the exact length of the endless record tape which is to be formed from such perforated, coded portion. The sprocketed feed roller 71 of the perforating mechanism and the sprocketed feed roller 90 of the translating mechanism (see Figs. 2, 3 and 8) have the same diameters. The transverse row of perforations on the record tape are, in this example, spaced apart longitudinally of the tape with one-eighth inch (⅛") between perforation centers, while the standard sprocket holes of the 35 mm. motion picture film, used as the record tape in this example, are spaced longitudinally of the tape. The endless record tape when mounted in the translating mechanism is fed by the sprocketed feed roller 90 in steps of one-eighth inch (⅛"). Hence, the transverse rows of perforations in the endless record tape would get out of alignment with the brushes U1 to U6, inclusive (see Figs. 3 and 8), after one rotation of its length unless the length of the record tape is a whole multiple of the diameter of the sprocketed feed roller 90 of the record tape translating mechanism. In order to automatically make the perforated record tape a length that is equal to a whole multiple of the circumference of the feed roller, the operator in starting, swings the lever 82 of the semi-automatic gauging switch organization G into the position as shown in Fig. 12 in which the contacts G4 and G5 of switch 80 are open (see Fig. 13). The operator then actuates the feed key 28 (see Figs. 3 and 13) to cause rotation of cam disc 83 until the cam follower 84 snaps into the recess 83b in the periphery of the cam disc and thus opens the contacts G4 and G5 in the circuit to the feed magnet P (see Fig. 7). Further movement of the record tape is thus prevented until the manually operable switch lever 82 is swung forwardly by the operator into position in which the camming lip 82b thereof forces arm 81 to close contacts G4 and G5 of switch 80. Just before the lever 82 is moved to close contacts G4 and G5, the operator then depresses the gauge key 27 once, which will cause the perforating mechanism to operate punch PM5 and punch a single perforation in the No. "5" column of the tape. The operator may then proceed to operate the perforating mechanism to encode a message as permutations of perforations in a length of the tape.

When the perforated record is completed, the operator swings the switch lever 82 rearwardly to the position shown in Fig. 12, and then repeatedly depresses the feed key 28 to cause rotation of the feed roller 71 and the cam disc 83 until the cam follower 84 snaps into the recess 83b of the cam disc and thus again renders the feed ineffective. Just before the switch lever 82 is swung forwardly by the operator to close switch 80, after the gauge key 27 is depressed once to cause the perforating mechanism to actuate punch PM5 to punch a reference perforation in the No. "5" column of the tape.

The completed perforated length of tape is then severed from the tape supply and formed into an endless record tape by joining the ends thereof together, with the reference perforations in the No. "5" column of the tape, at the start and at the end of the length of tape, as above explained, in alignment. In this manner the endless tape is formed of a length that is a whole multiple of the length of the circumference of the feed roller 90 of the translating mechanism. The endless record tape thus formed as a whole multiple of the sprocketed feed roller 90 of the translating mechanism, will always register the transverse rows of perforations with the row of brushes of the translating mechanism, once the endless record tape has been mounted on the translating mechanism feed roller 90 with the brushes aligned with a row of tape perforations. As will be hereinafter explained, such an endless record tape is mounted on the feed roller 90 of the translating mechanism by positioning feed roller 90 to locate the index line 96 (see Fig. 3 and Fig. 3a) at the upper side of the roller, and then placing the endless tape on the roller with the aligned tape length determining gauge perforations over and aligned with the index line 96.

*The record tape translating mechanism*

The strip or length of record tape *r* on which a message has been encoded in the form of perforations therein by the tape perforating mechanism, is severed from the tape supply and is formed into an endless tape, in a manner to be hereinafter described, which endless tape is then mounted in operative position on a translating mechanism by which the encoded message is translated into automatic typing or printing and functional operations of the typewriter 10.

A form of such a translating mechanism embodying the principles of my invention is disclosed in the drawings as forming a part of the major unit or group of mechanisms A hereof, and, referring now to Figs. 2, 3 and 8 of the drawings in particular, this translating mechanism includes a sprocketed translating feed roller 90 which is positioned directly to the rear of the keyboard 6 of group A. This translating feed roller 90 is mounted on a horizontally disposed shaft 91 which is journaled at its rear end in a suitable anti-friction bearing 91*a* mounted on a vertically disposed plate or panel 92. This plate or panel structure is supported from the base or bed 1 of group A, in position generally parallel with the group of code bars CB1 to CB7, inclusive. The shaft 91 mounted in bearing 91*a*, extends forwardly from mounting plate 92 with the axis of the shaft disposed generally transversely to the group of code bars CB.

The translating feed roller 90 is generally similar to the tape feed roller 80 of the tape perforating mechanism, in that it is provided with opposite end sprocket wheels 90*a* thereon having sprocket teeth 90*b* therearound spaced as hereinbefore described with respect to feed roller 70. The spacing between the sprocket teeth 90*b* of the opposite end sprocket wheels 90*a*, respectively, longitudinally or axially of the feed roller, is such that a record tape *r* may be placed on and over the feed roller with the opposite end sprocket teeth 90*b* accurately received in sprocket holes *h* of the opposite longitudinal edge rows of such holes on the record tape. As the spacing between the centers of adjacent rows of perforations in the tape is ⅛", the translating feed roller 90 is rotated, step by step, through partial revolutions to move a tape thereon through ⅛" steps, and as with the feed roller 70 of the perforating mechanism, the translating feed roller 90 is rotated through 24 partial revolutions for each complete revolution of the roller.

In accordance with a feature of my invention, the translating feed roller 90 is so constructed and designed as to provide an electrical conducting path to form a part of certain of the electrical circuits which will be later described herein, and in this instance, the roller 90 is formed and provided with an electrical conducting material sleeve 93 concentric with the axis of the roller and extending between the opposite end sprocket wheels 90a to thus present a peripheral electrical conducting surface around the roller between the sprocket wheels thereof. This conducting material sleeve 93 is suitably insulated, as at 93a, from the opposite end sprocket wheels 90a and the remainder of the structure of the feed roller, as for example, by providing insulating material mounting members, or the like, for the sleeve on the roller between the opposite end sprocket wheels 90a.

An electrical contact or brush holder 94 is mounted in a bracket structure 94a which is supported extending forwardly from the forward side of the mounting plate or panel structure 92. The brush holder 94 is disposed parallel to the shaft 91 of the roller 90, and embodies a contact or brush-carrying block 94b mounted on the bracket structure 94a for rotation about a horizontally disposed axis parallel with the axis of roller 90. A suitable handle or knob 94c is provided extending from the upper side of the block 94b in position inclined outwardly in a direction away from feed roller 90, for manually rotating block 94b. In this instance, the block 94b of the brush holder 94 mounts and carries a series of six (6) flexible, multi-strand, electrical contacts or brushes U1, U2, U3, U4, U5 and U6, with their longitudinal centers spaced ⅛" apart, and with these brushes being positioned in a row across the rotatable block 94b and extending inclined upwardly and forwardly from the block toward the translating feed roller 90 with the outer free ends of these contacts or brushes adapted to be frictionally engaged with the electrical conducting surface provided by the sleeve 93 of the feed roller. The arrangement of these brushes U1 to U6, inclusive, is such that, when the block 94b is rocked by manual swinging of the handle 94c toward the translating feed roller, the outer ends of the brushes may be brought into contact with the peripheral surface of the conducting sleeve in positions spaced apart across the translating feed roller for alignment with perforations p in the tape in the six (6) perforation locations on and transversely of the tape, as hereinbefore explained. By swinging or rocking the handle 94c in the direction away from the feed roller 90, the block 94b is rotated to raise the brushes U1 to U6, inclusive, from operative engagement positions with the translating feed roller 90, to position spaced therefrom to permit of readily mounting or removing a record tape on or from the feed roller. The brushes U1 to U6, inclusive, are mounted in the brush holder 94b insulated from each other and from the structure of the holder, and are connected with suitable circuit wires, respectively, which lead from the brush holder, as will be described hereinafter.

An electrical contact or brush U7 is provided for completing a circuit through the conducting sleeve 93 of the translating feed roller 90, and any of the brushes U1 to U7 which may be in electrical contact with the sleeve 93. This brush U7 may be of generally similar character to the brushes U1 to U6, inclusive, and is mounted so as to be normally in continuous engagement and electrical contact with the sleeve 93 of the roller 90. In this instance, brush U7 is mounted upon and disposed transversely of the outer end of a rod 95 which extends horizontally forwardly from the mounting plate 92 and which is rotatably mounted in that plate at the opposite side of the roller 90 from the side thereof at which the brushes U1 to U7 are mounted. The rod 95 is positioned below and to one side of the rollor 90, so that the brush U7 extends in position inclined upwardly from the rod 95 to the conducting sleeve 93 with its outer end in contact with the sleeve 93. By this arrangement, the rod 95 may be rotated to adjust and set brush U7 relative to the conducting surface provided by the sleeve 93 of the feed roller. The translating feed roller 90 is, in this example, rotated, step by step, in a clockwise direction when facing the group A, so that both the brushes U1 to U6 and the brush U7 are inclined in the direction of rotation, as will be apparent by reference to Fig. 3 of the drawings.

The translating feed roller 90 is provided with a readily visible index or starting line 96 formed on the peripheral surface of the conducting sleeve 93 and disposed axially or longitudinally of the feed roller. This index or starting line 96 is positioned circumferentially of the sleeve relative to the locations of the sprocket teeth 90b, so that, by aligning a properly positioned gauge perforation formed in the record tape with the index line, a perforated record tape can be accurately mounted in proper starting position on the translating feed roller. The shaft 91 of the translating feed roller is provided with a kurled knob 91b on the forward end thereof in position readily accessible to the operator, so that the feed roller can be rotated by the operator to position the index or starting line 96 in the required position at the upper side of the feed roller preparatory to mounting a record tape on the roller.

Upper and lower presser rolls 95a and 95b are provided located at the upper and lower sides, respectively, of the feed roller 90 for engaging the upper and lower sides, respectively, of an endless perforated tape mounted on the feed roller. These upper and lower presser rolls are carried by arms 95c and 95b, respectively, which are pivotally mounted on a stub shaft 95e extending from the mounting plate structure 92 spaced a distance from the feed roller 90. These arms are spring loaded by a spring member 95s so as to be constantly urged inwardly toward each other into engagement with the tape on the feed roller, and a suitably manually operable camming lever 95f is provided by which the operator may simultaneously move the arms 95c and 95d away from each other to position the presser rolls spaced outwardly from the feed roller 90 to permit of the mounting or removal of an endless perforating tape on or from the feed roller.

The translating feed roller 90 is driven from a motor M, which in the example hereof may be considered as of the fractional horsepower type. This motor M is mounted on the base 1 of group A to the rear of the mounting panel structure 92 of the translating mechanism, and is coupled into and drives a suitable speed reduction gearing generally identified in the drawings by the reference character 97. In an actual apparatus of my invention here given as an example, the motor M is of the series wound type and is controlled by suitable electrical resistance units MR1 and MR2 (see Fig. 3), so that the motor M runs at approximately 5000 R. P. M. when resistance unit MR1 is in circuit therewith, and runs at approximately 2500 R. P. M. when resistance units MR1 and MR2 are in circuit therewith.

The translating feed roller 90 is intermittently rotated, step by step, by the motor M from a cam shaft 98, referring now to Fig. 8 of the drawings, which is rotatably journaled in horiontal disposed position parallel to the shaft 91 of the feed roller 90, in suitable anti-friction bearings 98*a* mounted in a hollow boss formed on and extending forwardly from the forward side of the mounting plate structure 92 of the translating mechanism. The cam shaft 98 is mounted in position in the upper portion of the mounting structure 92 with the axis of shaft 98 disposed in the same horizontal plane which passes through the axis of the shaft 91. The speed reduction gearing unit 97 is provided with a power take-off shaft 97*a* extending forwardly therefrom in horizontally disposed position below and parallel with the cam shaft 98 and a driving gear 97*b* is fixed to said shaft for rotation thereby. The cam shaft 98 extends rearwardly through the mounting structure 92 and is provided with a gear 99 fixed thereon at the rear side of the mounting structure 92. An intermediate or idler gear 97*c* is rotatably mounted on a fixed stud shaft or pin 97*d*, and is engaged and in mesh with gear 97*b* and with the cam shaft driving gear 99, so that the cam shaft 98 is driven and rotated from the shaft 97*a* of the reduction gear unit 97 through the train of gears 97*b*, 97*c* and 99.

In the present example of apparatus of my invention here disclosed and described, I have employed a fixed step-down gear ratio of 15:1, between the shaft of the motor M and the cam shaft 98, so that, when the motor M is operated at its high speed of approximately 5,000 R. P. M., the cam shaft 98 will be rotated at approximately the order of 450 R. P. M., and when the motor M is operated at its low speed of approximately 2500 R. P. M., the cam shaft 98 will be rotated at approximately the order of 225 R. P. M. While I have given the above example from an actual apparatus of my invention in which a step-down gear ratio of 15:1 is employed between the shaft of the motor M and the cam shaft 98, with the approximate relative speeds of operation as recited, it is to be understood that the invention is not limited or restricted to this particular step-down ratio or to such relative speeds of rotation of the motor shaft and of the cam shaft.

The shaft 91 on which the translating feed roller 90 is mounted is, in this example, extended from the rear side of the mounting panel structure 92, and a ratchet wheel 100 is attached on the outer or rear end of the shaft 91 for rotating the shaft 91 and the translating feed roller 90 on such shaft at the opposite or forward side of panel 92. The ratchet wheel 100 is provided with a series of ratchet teeth 100*a*, which teeth are, in accordance with the usual arrangement of ratchet teeth on a pawl actuated ratchet, inclined in a direction opposite the direction of the rotation of the ratchet wheel. In this instance, the translating feed roller 90 and the shaft 91 are rotated in a clockwise direction, when facing the apparatus from the feed side thereof, so that the ratchet wheel 100 is rotated in an anti-clockwise direction when facing the apparatus from the rear side thereof, as illustrated by Figure 9 of the drawings, in which the arrow on the ratchet wheel 100 indicates its direction of rotation. The cam 101 is mounted on the outer or rear end of the cam shaft 98 for rotation by such shaft, and is positioned on the shaft disposed in a vertical plane parallel with the vertical plane passing through the ratchet wheel 100, but spaced a distance inwardly from the ratchet wheel 100, toward the mounting panel structure 92 (see Figs. 3, 8 and 9). The cam 101 is provided with a crank pin 101*a* eccentrically mounted thereon relative to the axis of shaft 98 and extended outwardly a distance from the rear side of the cam. A slide block 101*b* is rotatably mounted and confined on the crank pin 101*a*, and a slotted link or cross head 102 is reciprocally mounted on and receives the slide block 101*b*. The slotted link or cross head 102 is positioned in a vertical plane intermediate or located between the outer or rear side of the cam 101 and the inner or forward side of the ratchet wheel 100. A pawl 103 is pivotally mounted on the outer side of the slotted link 102 in operative relation and engagement with the ratchet wheel 100 for engaging the teeth 100*a* of the ratchet wheel, as the slotted link 102 is reciprocated and vertically rocked by rotation of the cam 101. The pawl 103 is suitably spring loaded in the usual manner to maintain the pawl pressed forwardly and downwardly into continuous engagement with the teeth 100*a* of the ratchet 100, while permitting the pawl to swing or rock vertically to ride up over the ratchet teeth on the non-feeding, return strokes of the pawl. A stop dog or detent 104 is pivotally mounted for vertical rocking on the outer end of a pin or stub shaft 104*a* which is mounted on the panel 92 in position extending horizontally from the rear side thereof above the ratchet wheel 100. The detent 104*a* is maintained constantly pressed or forced into engagement with the teeth of the ratchet wheel 100, in the usual manner, by means of a spring 104*b* on the stub shaft 104*a*, but is rockable upwardly against the tension of spring 104*b* to permit the pawl to ride over the ratchet teeth as the ratchet is rotated step by step through partial revolutions by link 102 and pawl 103. Detent 104*a* thus prevents rotation of the ratchet in a direction opposite the direction of feed rotation during return strokes of pawl 103, as well as preventing any reverse rotation of the ratchet 100 and translating feed roller 90 indeoendently of the actuating pawl 103 and slotted link 102.

Thus, as the cam 101 is rotated in an anti-clockwise direction, when facing the apparatus from the rear side thereof (see Fig. 9), by the cam shaft 98, the slotted link 102 is rocked vertically and reciprocated generally horizontally through compound motions toward and from the ratchet wheel 100, so that, during each complete revolution of the cam 101, the slotted link 102 will have been moved toward the ratchet 100 into engagement with one of the ratchet teeth 100*a* to thereby rotate the ratchet with shaft 91 and the translating feed roller through a partial revolution corresponding to the spacing between adjacent teeth of the ratchet wheel, and upon completion of such feeding stroke will have been moved in a direction away from the ratchet 100 to cause the pawl 103 to ride down over the adjacent tooth 100*a* and return to a position in engagement with such adjacent tooth for rotating the ratchet by the next feeding stroke of the pawl during the next revolution of the cam 101.

In operation of the translating mechanism, the cam shaft 98 and the cam 101 are continuously rotated from the motor M, through the medium of the slotted link 102, pawl 103, and ratchet 100, to actuate the feed roller 90 in intermittent steps through accurately determined and precisely measured partial revolutions. The relative arrangement of the feed roller 90 and the cam 101, slotted link 102, and ratchet wheel 100, is such that the feed roller 90 is rotated in intermittent steps through partial revolutions to accurately successively position the transverse rows, respectively, of code perforations in a record tape *r*, into operative alignment with the brushes or contacts U1 to U6, inclusive, as the tape is fed step by step under said brushes. That is to say, when a perforated record tape *r* is properly mounted on and aligned with the translating feed roller 90, the slotted link 102 and the pawl 103 carried thereby, will be actuated during each revolution of the cam 101, to rotate the ratchet wheel 100 through a partial revolution to rotate the feed roller 90 a distance to feed or move the record tape *r* the precise distance necessary to accurately align the next transverse row of code perforations *p* in the record tape with the brushes U1 to U6, so that such brushes engage and make contact through the row of perforations, with the conducting sleeve 93 of the feed roller 90. The feeding stroke of pawl 103 is completed and the roller 90 is rotated to position a row of perforations in tape *r* in alignment with brushes U1 to U6, during a portion of the complete revolution of cam 101, while during the remainder of the revolution the feed roller is held at rest while the pawl 103 is moved through its non-feeding, return stroke, so that, upon completion of the cam revolution, the pawl is in position engaging the next ratchet tooth of ratchet 100, preparatory to the next feeding stroke.

It is to be particularly noted that with the above described mechanism for actuating the translating feed roller 90 in intermittent steps through partial revolutions, the shaft 91 with the feed roller 90 and ratchet wheel 100 may be readily rotated in the normal direction of feed, independently of the motor driven actuating mechanism as hereinabove described, by manually rotating the shaft 91 by means of the knurled knob 91*b* fixed on the forward end of the shaft 91, as clearly shown by Figure 3 of the drawings in particular.

Attention is also directed to the fact that, with the arrangement of the ratchet wheel 100 and the slotted link 102 with its ratchet actuating pawl 103, irrespective of the direction in which the cam shaft 98 and the cam 101 may be rotated, that is, whether rotated clockwise or anti-clockwise, the ratchet wheel 100 with shaft 91 and the translating feed roller 90 will always be rotated in the same direction, namely, clockwise when facing the feed roller from the front of the apparatus. Hence, the operator may manually rotate the shaft of motor M when the motor is at rest, in order to rotate the translating feed roller 90 in its normal direction of tape feed, by, for example, grasping the motor cooling fan *m*, shown particularly in Figs. 2 and 3 of the drawings, and then revolving this fan in either of its directions of rotation. The operator may thus rotate the feed roller 90 in its normal direction of rotation by manually rotating the shaft of the motor M, as by revolving fan *m*, or the operator may freely manually rotate the feed roller 90 in the normal direction of tape feed rotation, by manually rotating the shaft 91 independently of the motor driven feeding mechanism, through the medium of the knob 91*b*. By the foregoing manual manipulations, an operator may rotate the feed roller 90 to adjust and position the feed roller, and a record tape *r* mounted thereon, to any desired position.

The cam 101 on the cam shaft 98 operates and controls an electrical switch F for opening and closing the electrical circuits through the brushes U1 to U6 inclusive, the sleeve 93 of the translating feed roller 90, and the brush U7. This switch F, referring now to Figs. 9 and 11 of the drawings in connection with the Figure 13, includes an arm 105 mounted in vertically disposed position on a horizontally disposed pivot pin 105*a* which is positioned on a base plate 105*b* of non-conducting material secured at the rear side of the mounting panel structure 92 at that side of the cam 101 opposite the side at which the ratchet wheel 100 is mounted. The switch arm 105, in this example, is formed of electrical conductor material and is provided with a contact F2 at the lower end of the arm in electrical contact with the arm. The upper end of the arm above the shaft 105*a* is provided with a cam follower 105*c* formed of non-conducting material and projecting laterally from the arm and adapted to engage the peripheral cam surface of the cam 101. The switch base 105*b* is provided with an adjustable contact F1 secured in position thereon in line with the movable contact F2 on the switch arm 105, so that rocking of the switch arm by the engagement of the cam follower 105*c* thereof with the peripheral cam surface of the cam 101, will engage and disengage contact F2 with and from contact F1.

An expansion spring member 105*d* formed of electrical conducting material is positioned under compression between a terminal member 105*e* on the switch base 105*b* and the upper end of the arm 105 above the shaft 105*a*, in position continuously exerting forces on the arm 105, to force and maintain the cam follower 105*c* of the switch arm, in engagement with the peripheral cam surface of the cam 101. Thus, the electrical circuit through the switch F is by way of contact F1, contact F2, arm 105, spring 105*d*, and terminal 105*e*, such circuit being closed when the contacts F1 and F2 are in engagement and being opened when these contacts are disengaged and out of electrical contact.

The cam 101 which actuates the arm 105 of the switch F, is formed with a peripheral cam surface which is engaged by the cam follower 105c, and, in this instance, such peripheral cam surface is formed with a high side 101H and a low side 101L, as clearly shown by Figure 11 of the drawings. The high side 101H of cam 101 when engaged by the cam follower 105*c* of switch arm 105, rocks said arm against the forces exerted thereon by spring 105*d*, to move contact F2 out of engagement with the fixed contact F1, while the low side 101L of the cam when facing and engaged by cam follower 105*c*, permits the spring 105*d* to expand and rock arm 105 in a direction to move the contact F2 into engagement with the fixed contact F1, and thus close a circuit through the switch F. In the apparatus of the present example, the high side 101H of cam 101 extends approximately 168° around the cam, and the low side 101L extends for the remaining approximately 192° around the peripheral cam surface of the cam.

The cam 101 is mounted on the cam shaft 98 in position thereon relative to the position of the slotted link 102 and the ratchet actuating pawl 103 carried thereby, so that the high side 101H of the cam surface is in position engaging the cam follower 105c of the switch F for approximately 168° of the 360° cycle of the cam, during which 168° of travel the feeding stroke of pawl 103 and the resulting rotation of the translating feed roller 90 by the ratchet 100 are completed, and the switch arm 105 is maintained in position disengaging the switch contacts F—1 and F—2 so as to maintain the circuit through the switch F to the brush contact U107 open during all movements of the feed roller 90. With such mounting of the cam 101, the low side 101L of the cam surface is engaged by the cam follower 105c of the switch arm 105 throughout approximately 192° of the 360° cycle of the cam. During the period when the cam follower is engaged with the low side of cam 101 and the switch contacts F1 and F2 are engaged, the ratchet 100 and the feed roller 90 are at rest, the pawl 103 is being actuated through its non-feeding return stroke, and a transverse row of code perforations in a record tape *r* is aligned with the brushes U1 to U6 inclusive, so that the circuit is closed through brush U7, the conducting sleeve 93 of the feed roller 90, and any of the brushes U1 to U6 inclusive which are in contact with sleeve 93 through code perforations in the record tape on the feed roller.

The mounting of the cam 101 on cam shaft 98 relative to the intermittent, step by step, drive mechanism for the feed roller 90, is such that the high side 101H of the cam surface maintains the switch contacts F1 and F2 disengaged and the circuits to brush U7 open, through approximately 168° of rotation of the cam 101, while the low side 101L of the cam surface causes the switch contacts F—1 and F—2 to be engaged and to close the circuit through the brush U7 during the remaining approximately 192° of rotation of the cam 101 to complete a 360° cycle or one complete revolution of the cam. The switch arm 105 is rocked from position with contacts F—1 and F—2 engaged, to position in which the switch contacts are disengaged, by the cam follower 105c riding up from the low side 101L onto the high side 101H of the cam surface, on the inclined surface or step of the cam which connects the end of the low side 101L and the adjacent advancing end of the high side 101H, of the cam surface. The switch arm 105 is rocked from position with the switch contacts F1 and F2 disengaged by the engagement of the cam follower 105c with the high side 101H of the cam, by the cam follower riding down from the high side 101H onto the low side 101L of the cam surface on the inclined surface or step of the cam surface connecting the end of the high side 101H with the adjacent advancing end of the low side 101L of the cam surface.

As the pawl 103 completes its feeding stroke and has rotated the feed roller 90 to position a row of transverse code perforations on a record tape *r* in alignment with the brushes U1 to U6, the cam follower 105c will have ridden down from the end of the high side 101H onto the advancing adjacent end of the low side 101L of such surface and the switch arm 105 will be actuated by spring 105*d* to engage contacts F1 and F2 and thus close the electrical circuits through the brush U7. This closing and opening of the switch F and the circuits through the brushes of the translating mechanism, takes place after any of the brushes U1 to U6 have made contact with the conducting sleeve 93 of feed roller 90 through perforations in the record tape, and with the feed roller 90 at rest, so that any arcing at the points of contact of the brushes U1 to U6 with the sleeve 93 of feed roller 90 is avoided.

As the cam 101 completes its revolution and the pawl 103 has completed its non-feeding, return, stroke, and cam follower 105c will have ridden up over the inclined surface or step between the low side 101L and the advancing adjacent end of the high side 101H of the cam surface, and the switch contacts F1 and F2 will be disengaged and the circuits through brush U7 will have been opened, just before the pawl 103 starts its feeding stroke to again rotate ratchet 100 and the feed roller 90 through a partial revolution to move the next adjacent row of transverse code perforations in a record tape on roller 90, into alignment with the brushes U1 to U6. Thus, the circuits through the brushes U1 to U6 and brush U7 will always be closed by the switch F after any permutation of the brushes U1 to U6 has been placed in electrical contact with sleeve 93 of roller 90, and such circuits are opened before the start of the rotation of the feed roller 90 to move such roller and a record tape mounted thereon, to positions removing any of the brushes U1 to U6 from electrical contact with the sleeve 93 of the feed roller. In this manner arcing at the brushes is prevented as the brushes break contact with the sleeve 93 of feed roller 90.

In connection with the operation of the switch F by cam 101, as above described, it is to be noted that the feed roller 90 and a record tape *r* being fed thereby, can be in motion during the travel of the cam when the cam follower 105c is in engagement with and is traveling up over the sloping surface or step connecting the end of the low side 101L with the adjacent advancing end of the high side 101H of the cam surface. This is so because the perforations in the record tape through which the brushes U1 to U6 are making contact with sleeve 93 of roll 90, will have moved such a relatively short distance that contact between any of the brushes U1 to U6 and sleeve 93, will not be broken before the switch contacts F1 and F2 are opened. The arrangement is such that when the feed roller 90 comes to rest the brushes U1 to U6 are lined up centrally across and relative to any tape perforations of a transverse line of perforations which may have been fed to position and are then in electrical contact with the sleeve 93 of roller 90 through such perforations, respectively, but the switch contacts F1 and F2 are not closed until or after the brushes are in such position and the feed roller is at rest. This delayed or retarded closing of contacts F1 and F2 is due to the fact that during the completion of the feeding stroke of the pawl 103 and the rotation of feed roller 90 through a partial revolution, the cam follower 105c of switch F has been in engagement with and has ridden down over the sloping surface or step connecting the high side 101H with the adjacent advancing low side 101L of the cam surface, and the switch contacts F1 and F2 have become engaged to close the circuits through brushes U1 and U6 when these brushes reach the centers of the record tape perforations which have been moved into alignment therewith.

A cam actuated and controlled electrical switch E is connected into the electrical circuits which are controlled by and through the contacts that are selectively actuated by the permutable energization of the series of relays R1 to R6*a*, as described and explained hereinafter. This switch E is adapted to open the relay contact controlled circuits to render such circuits ineffective or to close such circuits to render them effective upon selective closing of the relay contacts controlling such circuits.

The switch E, referring to Figs. 9 and 10 of the drawings, is mounted on the panel structure 92 of the translating mechanism and, in this instance, embodies a horizontally disposed, vertically rockable contact arm 106 pivotally mounted intermediate its ends on a horizontally disposed pivot pin 106a which is secured in position extending outwardly from the rear side of panel 92, above but parallel with the shaft 98. The outer end of contact arm 106, relative to shaft 98, is provided with a contact E2 on the upper side thereof. The arm 106 is formed of electrical conducting material and is in electrical engagement with the contact E2, and also is in electrical contact with a terminal lug 106b located at the pivot pin 106a. The opposite end of arm 106 is provided with a cam follower 106c which depends downwardly therefrom above the cam shaft 98 for engagement with the peripheral cam surface of a cam 107 (see Fig. 10) which is mounted on shaft 98. This cam follower 106c is formed of non-conducting material and is suitably fixed or secured to the arm 106.

A non-conducting material plate or base block 106d is mounted in horizontally disposed position extending rearwardly from the upper portion of the panel structure 92, in position above the switch contact arm 106. This base block 106d mounts and carries an electrical contact E1 which depends in vertically disposed position from the under side of block 106d in vertical alignment with the contact E2 mounted on the rockable switch contact arm 106. An expansion spring 106e is interposed under compression between the under side of the base block 106d and the portion of the arm 106 which carries the cam follower 106c, so that such spring 106e continuously exerts forces acting downwardly to engage the contact E2 with the contact E1. Thus, the arm 106 is vertically rockable about the pivot pin 106a as an axis, to raise and lower contact E2 to and from engagement with the fixed contact E1 mounted in the base block 106d.

The cam 107, referring now particularly to Fig. 10 in connection with Figs. 3 and 8 of the drawings, is mounted and fixed on the cam shaft 98 for rotation therewith. The cam 107 is mounted on the shaft at the inner side of the gear 99 and between that gear and the rear side of the panel structure 92 (see Figs. 3 and 8) in a vertical plane passing through the cam follower 106c which is positioned above the cam, and with this cam follower in sliding engagement with the peripheral cam surface of the cam 107.

The peripheral cam surface of the cam 107 is formed with a high side 107H and with a low side 107L, the opposite adjacent ends of the high side and the low side being joined and connected by gradients or inclined surfaces, in a manner generally similar to that hereinbefore described in connection with the cam 101 for actuating and controlling the switch F. Thus, when the cam follower 106c of the switch arm 106 is in engagement with the low side 107L of cam 107, being forced into such engagement by spring 106e, the switch arm is rocked to raise contact E2 into engagement with contact E1, so that the electrical circuit through the switch E is closed. During the engagement of the low side 107L of the cam with the cam follower 106c, the spring 106e will maintain the arm in position with the contact E2 engaged with contact E1. When the cam 107 is rotated to engage the high side 107H thereof with the cam follower 106c, the arm 106 is rocked to lower and disengage the contact E2 carried thereby from engagement with the fixed contact E1 on the base block 106d, to thus break and open the electrical circuit through the switch E.

In the arrangement and mounting of the cam 107 on the cam shaft 98 relative to the cam 101 which controls the switch F, the low side 107L of cam 107 is engaged by the cam follower 106c when the low side 101L of cam 101 is engaged by the cam follower 105c of switch F, so that the contacts E1 and E2 of the switch E are closed when the contacts F1 and F2 of switch F are closed. When the high side 107H of cam 107 is engaged by the cam follower of switch E, the high side 101H of cam 101 is engaged by the cam follower of switch F, so that the switch E is open while the switch F is open. However, it will be noted that the low side 107L of cam 107 extends for a greater distance or number of degrees around cam 107, than does the low side 101L of cam 101, with the result that switch E is closed before or in advance of the closing of switch F and switch E is opened later than or after the opening of switch F. With such relative timing and synchronization of the cams 101 and 107 and of the opening and closing of the switches E and F, in the operation of the translating mechanism, the switch F is closed to close and complete the circuits through the brushes U1 to U6 and the brush U7 after a transverse row of code perforations have been aligned with the brushes U1 to U6, so that such brushes or some of them are in contact with sleeve 93 of the feed roller 90 to thereby complete the energization of the selected permutation of relays R1 to R6a. During this operation the switch E is maintained open to maintain the electrical circuits controlled by the relay actuated contacts ineffective until a selective actuation of such contacts to circuit closing positions has been effected by the energization of the selected relays resulting from the closing of the switch F. But after the completion of the operations controlled by the closing of the switch F, then cam 107 will have been rotated to position engaged by the cam follower 106c so as to close the switch E and thus close and complete the circuits through the engaged relay contacts.

When the non-feeding or return stroke of the feed roller actuating pawl 103 has been completed, the high side 101H of cam 101 will engage the cam follower of switch F before the next feeding stroke of the pawl and feed rotation of roller 90 takes place, so that the circuit through switch F will be opened. However, during this operation the low side 107L of the cam 107 will still be engaged by the cam follower of the switch E, and the high side 107H of cam 107 will not engage the cam follower of switch E to open the circuit through that switch until after the circuit has been opened through the switch E.

By the foregoing operation of the switch E, not only is arcing at the relay actuated contacts avoided, but the possibilities of false operations or functioning are reduced to a minimum because the circuits through the relay actuated contacts are not closed by the switch E until an ample interval of time has elapsed after the closing of the relay circuits by switch F, within which to enable the selected relays to be energized and to mechanically actuate the contacts controlled thereby into engaged positions completely conditioned for electrical functioning upon the delayed or retarded closing of the switch E.

*The endless record tape holder of the translating mechanism*

The coded perforated tape or record which has been prepared on the hereinbefore described perforating mechanism, or on any other suitable perforating mechanism, is cut or severed from the length of tape being supplied to the perforating mechanism from the tape slide roll to form the perforated record tape *r*. The severed length of the perforated record tape *r* is then rolled into a coil and the end of the tape length at the inner side of the coil is drawn out laterally or axially from the coil and is spliced or otherwise fastened to that end of the tape which is at the outer side of the coil of the tape. In this manner there is formed, referring now to Fig. 2 of the drawings, an endless tape in the form of a roll *r'* comprising a series of coils or convolutions connected by a length of tape made up of a bight *r''*, an upper ply *u'* extending from the upper and outer side of roll *r'* and a lower ply *l'* extending from the inner side or core of the roll *r'*, to the upper and lower sides, respectively, of the bight. The perforation and formation of such a coiled or rolled endless record tape will be more fully and particularly described hereinafter in connection with the detailed description of the operation and the functioning of the translating mechanism to translate such a perforated record tape.

In accordance with my present invention I have provided a structurally simple and functionally efficient holder arrangement for receiving and mounting the roll *r'* of the endless perforated tape *r*, and for mounting the bight *r''* of such endless tape on and around the translating feed roller 90, with the upper ply *u'* and the lower ply *l'* which connect the bight with the roll *r'*, extending between the translating feed roller and the roll on the holder, in such a manner that the translating feed roller will automatically draw the endless tape from the inner side or core of the roll *r'*, feed the tape up over the roller under the brushes U1 to U6, and return the tape back into the roll *r'* at the outer and upper side of the roll.

Referring now to Figs. 2 and 3 of the drawings, such an endless tape holder of my invention may embody, as in the example hereof, a rod or spindle 108 for receiving the roll *r'* of an endless perforated tape *r* in position loosely mounting thereon with such tape roll freely rotatable about the rod or spindle as an axis. The tape roll receiving rod 108 is mounted and supported upon the outer end of a bracket arm **108*a* which is secured at its inner end to the right-hand side (when facing the translating mechanism from the front of the apparatus) of the panel structure 92. The rod or spindle 108 is mounted and secured in the outer end of this bracket arm 108*a* in position disposed generally transversely thereof and extending forwardly therefrom across but spaced a distance to the right of the translating feed roller 90**, as will be clear by reference to Fig. 3 of the drawings in particular.

A guard plate or disk **108*b* is mounted and secured at the inner end of the rod or spindle 108** disposed in a plane perpendicular to the axis of the rod, to form a base for receiving and against which the inner side or end of the roll *r'* of an endless perforated tape *r* seats and is supported when such roll is mounted in position on the rod.

Following the principles of this feature of my invention, the rod 108 is mounted on the bracket arm **108*a* in position angularly disposed both vertically and horizontally relative to the horizontal axis of the translating feed roller 90, and, in the particular example here illustrated, the rod 108 may be set or positioned inclined upwardly from the horizontal at an angle within the range of angles of approximately the order of 10° to 20°, and may be inclined forwardly toward the translating feed roller 90 at an angle in the range of angles of approximately the order of 5° to 10°. I have determined, that with the apparatus here illustrated, when the rod 108 is set at the angles within the above recited ranges, the translating feed roller 90** can be operated at any desired rate of speed through its step by step partial revolutions to draw the tape from the interior or core of a roll *r'* mounted on the rod 108, and feed the tape back over the roller 90 and return the tape back into the roll *r'* at the upper outer side thereof, continuously and smoothly without displacement of the roll *r'* from the rod 108.

As in the illustrated example, the outer end length of the bracket arm **108*a* is preferably bent or curved rearwardly at a distance from the inner end of the rod 108, to an intermediate portion of the bracket arm, in order to provide for mounting and positioning the guard plate or disc 108*b* in a plane substantially perpendicular to the axis of rod 108 without the necessity of deflecting or deforming the disc or plate 108*b*. In this manner a suitable flat plane surface is presented by the guard plate or disc 108*b*** for receiving and against which the inner side or end of a roll *r'* of an endless perforated tape, may rest and seat in sliding engagement with the disc but without any camming or wedging action by the disc tending to displace the roll *r'* from the proper operative position on the rod, in view of the angles of inclination of the rod 108 relative to the feed roller 90 and the direction of the paths of movement of the tape between the roller 90 and the rod 108.

*The actuating mechanism for the key bars of the typewriter*

The major group B of the apparatus of the invention, as hereinbefore referred to, includes electro-mechanical mechanisms for selectively actuating or operating the key bars 11 of the typewriter 10, either under the control of the automatically operated perforated tape translating mechanism or under the control of manual operation of the keyboard 6 of the apparatus. This major group B is formed and mounted as a compact unit in position on a suitable supporting structure 5 located below the typewriter 10 and to the rear of the typewriter keyboard, being in this instance carried by the desk or stand upon which the typewriter 10 is mounted and located to the rear of the knee-hole space **3*a*** so that this knee-hole space is unobstructed thereby.

The supporting structure for group B is generally indicated by the reference character 5, and consists, in this instance, of a box-like structure which includes the vertical, opposite end or side walls **5*a* and the bottom wall or base 5*b***, with the forward side of the structure open, in the present example, as will be clear by reference to Figs. 4 and 5 of the drawings.

The electro-mechanical mechanisms for selectively actuating the key bars 11 of the typewriter 10, primarily embody a group of forty-eight (48) solenoid magnets N1 to N48, inclusive, each of which consists of a coil forming an electro-magnet 109 of tubular form, and an armature 110 mounted axially of and extending into the coil for reciprocation therein, in the usual manner familiar with this type of solenoid magnet. Each of the solenoid magnets N1 to N48, inclusive, is adapted to be operatively connected with one of the key bars 11 of the typewriter 10 for actuating the key bar with which it is attached, independently of the others of the solenoid magnets and of the key bars with which such other magnets are respectively attached.

These solenoid magnets N1 to N48, inclusive, are mounted in vertically disposed positions in a horizontal mounting base which consists of vertically spaced, parallel plates 111 secured in fixed position extending across and between the upper end portions of the vertical, opposite end walls 5a of the supporting structure 5 for group B.

The upper plate 111 of the solenoid mounting base is provided, in this particular instance, referring to Fig. 14 of the drawings, with four (4) parallel rows of circular apertures or openings 111a therethrough, with these rows disposed longitudinally of the plate, and with the openings of each row spaced apart and disposed in staggered relation relative to the openings, respectively, of an adjacent row or rows. In this example, there are twelve (12) openings in the forward row; eleven (11) openings in the next row; thirteen (13) openings in the next row; and twelve (12) openings in the rearmost row. The solenoid magnets N1 to N48, inclusive, are mounted in vertically disposed positions supported at their lower ends on the lower plate 111 in axial alignment with the openings 111a, respectively, in the upper plate 111, and with the upper ends of the solenoid magnets received and confined in such upper plate openings, as clearly shown by Fig. 4 of the drawings. The armature 110 of each of the "N" solenoid magnets is located and positioned in the upper end of the axial bore or core of the tubular magnet 109 for vertical reciprocation therein.

Each armature 110 of each of the solenoid magnets N1 to N48, is operatively coupled and connected by suitable flexible linkages, such as by a flexible cord, wire, line or the like, with one of the key bars 11 of the typewriter 10 for actuating the key bar with which it is connected by energization of the solenoid magnet to draw its armature 110 downwardly, the armature being released upon de-energization of the solenoid magnet and returned to its normal elevated, inactive position by the action of the return spring of the key bar 11 of the typewriter 10, with which such solenoid magnet is connected.

In accordance with this feature of my present invention, I have provided a compact and efficient arrangement of flexible linkages for operatively connecting the armatures 110 of the solenoid magnets with the key bars 11, respectively, of the typewriter 10; and this arrangement in the example hereof, basically embodies the use of a flexible linkage in the form of a cord, line, wire, or the like element 112, connected between the armature 110 of each of the solenoid magnets N1 to N48, and that key bar 11 of the typewriter 10 that is to be actuated by such magnet. Each of the flexible cords 112 is detachably coupled at its upper end to that key bar 11 which is to be actuated by the cord, and is connected at its opposite or lower end with the armature 110 of that one of the solenoid magnets N1 to N48, inclusive, which is to actuate the key bar through the flexible cord. Each of these flexible cords or linkages 112 is so arranged as to extend as nearly directly upwardly in a straight path with as small a deviation from the perpendicular as possible (see Fig. 5), from the solenoid with which it is connected, along the rear side of the knee-hole space 3a of the desk or stand on which the typewriter 10 is mounted, to the upper portion of such space. From such location each cord is then arranged to extend forwardly and generally horizontally in a straight line to a position below the keyboard of the typewriter 10, at which point the cord is arranged to extend directly upwardly to that key 11 of the keyboard which such cord is to actuate. The arrangement and positioning of the solenoid magnets N1 to N48, inclusive, on the mounting base plates 111 relative to the positions of the keys 11 in the keyboard of the typewriter 10, is such that the armature 110 of each of these "N" solenoids has its vertical axis disposed in a vertical plane parallel with and as close to the vertical plane passing through the key bar 11, which such solenoid is to actuate, as is possible, in order that the flexible cord 112 from the armature 110 may extend in straight line paths in or as close to the vertical plane passing through the key bar to be actuated as the structural and space limitations will permit.

An arrangement of anti-friction roller guides is provided for carrying and guiding the cords or flexible linkages 112 upwardly across the rear side to, and forwardly across the upper side of the knee-hole space 3a, and then upwardly to the key bars 11, which arrangement is such as to define and maintain the straight line paths or positions for the cords. In the present instance, I have disclosed such an arrangement of anti-friction guide rollers, which embodies a set or series of twenty-three (23) grooved rollers 114 mounted in vertically disposed position, in parallel relation, on a rod 114a which is mounted in horizontal position extending between opposite end, depending bracket plates 114b secured at the under side of the top 3 of the table or stand on which the typewriter 10 is mounted. The rod 114a mounting guide rollers 114 is positioned extending horizontally across and spaced above the forward row of "N" solenoids, with the guide rolls freely rotatably mounted thereon and positioned for receiving the flexible cords 112 from the forward row of solenoids on alternate rolls, being those rolls most nearly directly above such solenoids, respectively, and for receiving the cords 112 from the next adjacent row of solenoids on the rolls which alternate with the rolls occupied by the cords from the forward row of solenoids, the solenoids of such next adjacent row being positioned in staggered relation with the solenoids of said forward row.

A series of twenty-four (24) grooved rolls 115, similar to the rolls 114, are mounted in vertically disposed position, in parallel relation, on a rod 115a which is mounted in horizontally disposed position extending between the opposite end depending bracket plates 114b. The rod 115a on which the guide rolls 115 are mounted is positioned parallel with but spaced to the rear and a distance above the forwardly located rod 114a, so that this rod 115a with its rolls 115 is located spaced directly above the rearmost row of the "N" solenoids and the next adjacent forward row of such solenoids, as will be clear by reference to Fig. 4 of the drawings. The flexible actuating cords 112 from the rearmost row of solenoids on the mounting base plates 111, are extended directly upwardly to and are received over those of the rolls 115 which are most nearly directly above the solenoids, respectively, to which such cords are connected, so that in this instance these particular cords are received on and over alternate rolls. The flexible cords 112 connected with the forward row of solenoids "N" next adjacent to the rearmost row of such solenoids, are extended upwardly to and received on and over the rolls 115 located between the rolls occupied by the cords 112 from the rearmost row of the "N" solenoids, the solenoids of these two adjacent rows being staggered relative to each other.

A series of forty-seven (47) grooved guide rolls 116 are each freely rotatably mounted in parallel, vertically disposed positions on a rod 116a which is mounted in horizontally disposed position below and substantially intermediate of the width of the keyboard of the typewriter 10, at the underside of the top 3 of the table or stand on which the typewriter is mounted, so that this series of rolls is located at the forward side of the knee-hole space 3a, but above and without obstructing such space. The table top 3 is formed with a slot or opening 117b therethrough above and across the series of rolls 116a. The flexible linkages or cords 112 which are connected with the "N" solenoids, respectively, of the forward and next adjacent rows of solenoids, extend upwardly over and forwardly across the rolls 114, to those of the rolls 116 which are most nearly directly forwardly aligned therewith, respectively, in view of the positions of the key levers to which such cords are to be attached. Such cords then extend across the under side of and upwardly around such rolls 116 to key bars 11 of the typewriter 10, which are to be respectively actuated by such cords.

The flexible linkages or cords 112 which are connected with the "N" solenoids, respectively, of the rear and next adjacent forward rows of solenoids extend upwardly over and forwardly across the rolls 115, to those of the remaining rolls 116 not occupied by the cords from rolls 114, which are most nearly directly forwardly aligned therewith in view of the positions of the key levers 11 to which such cords are to be actuated. Such cords then extend across the under side of and upwardly around such rolls 116 to the key bars 11 which are to be actuated by such cords.

It will be noted that in the arrangement of this example, forty-eight (48) "N" solenoids are provided but only forty-seven (47) cords are required. This is due to the fact that the "N" solenoid (N1) for the "Shift Release" does not require a cord 112 as it is connected directly to the latch member 121 of the "Shift Lock."

In the particular form of apparatus of my invention which I have disclosed and described herein by way of example, referring now to the schematic electrical circuit diagram of Fig. 13 of the drawings, each armature 110 of a solenoid of the series of magnets N1 to N48, is connected by a cord 112, with a character printing, or a typewriter function actuating key bar or lever 11 of the typewriter 10, and I have applied along the lefthand side of Fig. 13 two vertical columns, one of which consists of designations of the typewriter functions and printing characters and the other of which consists of designations of the perforation code for each such typewriter function or printing character by numbers representing the perforation locations in a record tape in terms of the longitudinal perforation receiving columns on the tape, as hereinbefore explained. I have also arranged these two columns so that the typewriter function or printing character identified therein is opposite and in line with that "N" solenoid of the series of solenoids N1 to N48, the armature of which is connected with the typewriter key bar or lever for effecting the designated typewriter function or for typing the designated character. In such an arrangement of the "N" solenoids, as schematically illustrated by Fig. 13 of the drawings, it is to be noted by reference to Fig. 13, that the forty-eight (48) solenoids are respectively connected with the designated typewriter function and character printing key bars or levers 11 of the typewriter 10, as follows:

| | | | |
|---|---|---|---|
| N1 | Shift Rel. | N25 | Y |
| N2 | Back Space | N26 | B |
| N3 | Carr. Ret. | N27 | 6 |
| N4 | ' | N28 | G |
| N5 | ½ | N29 | T |
| N6 | / | N30 | V |
| N7 | - | N31 | 5 |
| N8 | ; | N32 | F |
| N9 | P | N33 | R |
| N10 | . | N34 | C |
| N11 | O | N35 | 4 |
| N12 | L | N36 | D |
| N13 | o | N37 | E |
| N14 | , | N38 | X |
| N15 | 9 | N39 | 3 |
| N16 | K | N40 | S |
| N17 | I | N41 | W |
| N18 | M | N42 | Z |
| N19 | 8 | N43 | 2 |
| N20 | J | N44 | A |
| N21 | U | N45 | Q |
| N22 | N | N46 | Space |
| N23 | 7 | N47 | Shift Lock |
| N24 | H | N48 | Tab. |

The solenoids N1 to N48 are thus grouped and mounted into a very compact assembly which can be practically mounted and positioned to the rear of and removed from the knee-hole space 3a, while the arrangement of the flexible linkages or cords 112 and the anti-friction guide rolls 114, 115 and 116, is such that these cords may be efficiently compactly positioned and carried over and around the knee-hole space 3a so as to in no way interfere with or obstruct that space, while efficiently transmitting actuating forces with a minimum of friction and of time lag, from the "N" solenoids to the key bars or levers 11 of the typewriter 10.

The cords 112 which operate the key bars 11 of the typewriter 10 by the selective actuation of the solenoids N1 to N48, are, in accordance with my invention, detachably coupled to the key bars 11, respectively, by a structurally simple form of spring clip or hook 117 (see Fig. 4), which is generally U-shaped, and which slides down over and onto the upper side of the key bar in frictional engagement therewith. It is thus possible to connect the cords 112 to the key bars 11 and to readily disconnect such cords from the key bars in relatively short periods of time without requiring any reconstruction or changes of any kind in the typewriter 10, in order to adapt the typewriter for receiving such cords.

The "N" solenoids for operating the actuating levers of the typewriter 10 are arranged in the compact unit for mounting spaced below the typewriter as described hereinbefore, in relative positions corresponding to the relative positions, respectively, of the keys making up the keyboard of the typewriter 10, as will be clear by reference to Fig. 14 of the drawings. And the spacing between the "N" solenoids approximates that of the spacing between the caps of the typewriter keyboard to enable running the cords 112 in as direct lines as possible to the key levers of the typewriter keyboard. The general layout plan for the cords 112 from the solenoids "N" to the key bars is purely schematically disclosed in Fig. 14, in order to show the possible paths of the cords 112 over the sets of guides 114, 115 and 116.

Each of the flexible cords 112 is, as in the example hereof, preferably provided with a cord length adjustment member 118 thereon, which may be located on the cord intermediate the point of connection of the cord with an "N" solenoid and the roll 114 on which the cord is received. It so happens that, in this instance such cord length adjusters 118 each also has the lower end of the cord 112 attached thereto in order to form a loop or eye in the cord by which it is attached to a solenoid magnet 110, or other element. In this manner, the length of the cord 112 can be properly initially adjusted or can be adjusted from time to time as may be required during operation of the apparatus, in order to position the armature 110 to which the cord is attached in proper relation with the magnet 109 for such armature. The armatures 110 of the "N" solenoids are thus supported and carried by the lower ends of the records 112 in suspended relation therewith, respectively, and a cord is drawn downwardly by the armature 110, or other element, to which it is attached, by energizing coil 109 associated with such armature. Upon de-energizing the magnet coil 109 of any of the "N" solenoids, the armature 110 of that solenoid is raised and returned to inactive position by the cord 112 attached thereto, as a result of the raising of the key bar 11 to which the cord is attached by the action of the key bar return spring of the keyboard.

In connection with the return of a key bar 11 to its normal raised, inactive position after actuation by the "N" solenoid with which the key bar is connected, it is to be noted that the armatures 110 of the solenoid magnets are each formed of relatively small dimensions and of low weight, so that the normal return spring for a typewriter key bar 11 develops a force of sufficient magnitude to raise the weight of the armature 110, the cord 112 and the attaching clip or hook 117, without interfering with the speed of action of the key bar.

As a result of the foregoing arrangement of flexible linkages in the form of the cords 112, for automatically selectively actuating the key bars 11 from the solenoids N1 to N48, inclusive, it is to be noted that, when the cords 112 are in operative position attached and connected to the key bars by the clips or hooks 117, the conventional, normal manual actuation of the key bars 11 of typewriter 10 is in no way interfered with, so that, even with typewriter 10 connected with the actuating solenoids N1 to N48 of the apparatus of my invention, the typewriter 10 may be manually operated without disconnecting cords 112 from the key bars.

*The automatic actuating mechanism for the typewriter "Shift Lock" and "Shift Release" functioning*

The shift lock and the shift release functions of the typewriter 10 are actuated in this instance by the solenoid magnets N47 and N1, respectively, through the medium of a lever and latch mechanism which is mounted and carried on the upper plate 111 of the mounting base structure for the "N" solenoids. In this example, such lever and latch mechanism is mounted at the left hand end of the upper plate 111 of the mounting base for the solenoids, in position above and operatively associated with the solenoid magnets N47 and N1, as will be clear by reference to Fig. 4 of the drawings.

This lever and latch mechanism includes a lever or arm 120 disposed generally transversely of the upper plate 111 in position thereabove, and mounted at its opposite ends in vertically disposed plates 120a and 120b for vertical movement relative to said plates, toward and from the solenoid N47 therebelow, in suitable vertically disposed slots (not shown) in the upper ends, respectively, of said plates 120a and 120b. The rear end of the lever 120 extends outwardly a distance beyond the bracket plate 120b, and a contractile spring 120c is connected between the extended rear end of lever 120 and a fixed position on plate 120b, a distance below lever 120. This spring 120c so mounted, continuously exerts downwardly acting forces on the extended rear end of lever 120 tending to fulcrum or rock such lever vertically about the fulcrum operated by plate 120b, to thus tend to swing or vertically displace the forward end of the arm upwardly.

The forward end length of the lever arm 120 is connected to the key bar 11 of the typewriter 10 which actuates the shift lock mechanism of the typewriter, by a flexible linkage, such as the cord 112, as shown by Fig. 4 of the drawings, so that downward displacement or depression of the lever 120 will through cord 112, depress the shift lock key bar 11 of the typewriter to operate the typewriter shift lock mechanism. The armature 110 of the solenoid N47 is connected with and suspended in operative position from the lever 120 at a point adjacent to but spaced sligthly to the rear of the point of connection of cord 112 with lever 120, by a contractile spring 120d. Thus, when solenoid magnet N47 is energized, the armature 110 thereof is drawn downwardly and, through cord 112, the shift lock key 11 of the typewriter is actuated to perform its function, the spring 120d being stiff enough to sufficiently resist expansion under the depressing forces or loads applied thereto in downwardly displacing lever 120 to actuate the typewriter shift lock key bar. A latch member 121 is mounted on the upper plate 111 adjacent the armature 110 of the solenoid magnet N47, disposed generally transversely of upper plate 111 and parallel with lever 120. This latch member 121 is pivotally mounted at its lower end for rocking about a horizontal pivot pin 121a in a vertical plane parallel with the vertical plane passing through lever 120, for engaging over and disengaging a locking pin 122, which extends in a horizontally disposed position transversely of and outwardly from the side of lever 120 adjacent to latch member 121. The upper end of latch member is provided with a downwardly and forwardly inclined slot 121b which opens through the forward side of the latch member and is adapted to fit over and receive the locking pin 122.

The latch member 121 is provided with a horizontally disposed arm 121c extending rearwardly from the upper end portion of the latch member but spaced below the locking pin receiving slot 121b. This latch member arm 121c extends rearwardly to terminate spaced above the solenoid magnet N1, and the armature 110 of that magnet is connected with and suspended from the rear end of the arm 121c by a contractile spring 121d. The latch member 121 is spring loaded or biased forwardly by a contractile spring 121e which is mounted under expansion between the forward side of the latch member 121 and the forward bracket member or plate 120a, so that this spring continuously exerts forces on the latch member acting to rock such member forwardly to the position in which the slot 121b fits over and receives the locking pin 122. Thus, when the arm 120 is drawn downwardly the locking pin 122 engages the forwardly sloping or inclined camming upper edge surface of the latch member 121 and forces that member to rock rearwardly, so that the locking pin slides downwardly into alignment with the slot 121b, whereupon spring 121e rocks and snaps the latch member forwardly with locking pin 122 received at the inner end of slot 121b into position with the latch member then locking and holding arm 120 in its depressed position.

The lever 120 in its position disengaged from and unlocked by latch member 121, with the typewriter key bar 11 for the typewriter shift lock function in its normal raised inactive position, has its forward end length raised or elevated with the locking pin 122 positioned over and above the upper end of the latch member 121. When the solenoid magnet N47 is energized its armature 110 is drawn downwardly and the arm 120 is depressed. Depressing arm 120 causes the locking pin 122 to be received in the slot 121b of the latch member, so that such member then locks and holds arm 120 in its depressed position, as hereinbefore described. The release of armature 110 of solenoid magnet N47 by de-energizing that magnet will leave arm 120 and the typewriter shift key bar in depressed position with the type basket of the typewriter 10 locked in its raised, upper case position, as well understood in this art. This condition will prevail until the shift release function arm 120 is released and unlocked by the latch member 122, through the energization of the solenoid N1. When solenoid magnet N1 is energized its armature 110 is drawn downwardly and the latch member 121 is rocked rearwardly against the forces of the spring 121e, to position disengaging pin 122 and releasing arm 120 for upward swinging under the combined action of the spring 120c and the return spring of that key bar 11 for operating the shift release function of the typewriter.

*The electrical relays for selectively controlling the "N" solenoid magnets*

The electrical relays R1, R2, R3, R4, R5, R5a, R6, and R6a, are in effect master relays, in that, through the energization of these relays in various permutation or combinations, that particular solenoid magnet of the solenoid magnets N1 to N48, inclusive, and the magnet N49, which latter magnet and its function will be referred to hereinafter, is selectively energized either through the manual operation of the keyboard 6 of the apparatus of the invention, or through the automatic operation of the translating mechanism of the apparatus to translate a perforated record tape *r*.

These "R" relays are of the electromagnetic, fast operating, multiple contact type which is well known and familiar in the art, and which embodies and is typified by an arrangement of fixed contacts and of movable contacts actuated and controlled by the armature of the relay for selective engagement and disengagement.

These "R" relays are, in this example, mounted side by side in a horizontal row in parallel relation with the electromagnets thereof disposed horizontally and with the fixed and movable contacts thereof, positioned in vertical "stacks" or groups below the magnets. Such mounting of the "R" relays is disclosed particularly in Figs. 4 and 5 of the drawings, and is carried out in this example, by securing the relays at the rear ends thereof to a vertically disposed plate 111b formed by a vertical flange depending from and along the rear longitudinal edge portion of the lower plate 111 of the base or mounting structure for the "N" solenoids. The "R" relays are mounted on the plate 111b with the groups of fixed and movable contacts thereof disposed below plate 111b, and located at the forward side of the arm members of the relays on which these contacts are mounted. The armatures of the "R" relays are also located at the forward ends of the relays, while the terminal ends of the contact carrying arms of the relays, for connection with the circuit wires respectively, of the circuits controlled by the relays, are located, in this instance, at the rear side of the relays. The "R" relays are secured in position on the plate 111b, with relay R1 at the lefthand end and relay R6a at the righthand end, of the row of relays, and with the relays R2, R3, R4, R5, R5a and R6 mounted therebetween in that order, from left to right when facing the apparatus, as clearly shown by Fig. 5 of the drawings.

The armature and contact end of each of the relays R1 to R6a, inclusive, is disclosed in front elevation in Fig. 5 of the drawings, while the relay R1 is disclosed in side elevation with portions thereof shown in vertical section, in Fig. 4 of the drawings. The general construction and arrangement of the relay R1 as disclosed in Fig. 4, is typical of the remainder of these "R" relays. In Fig. 13 of the drawings, which is a schematic diagram of the complete electrical circuits of the apparatus of the invention, the relays R1 to R6a are purely schematically illustrated with the contacts of the relays represented as connected with the various electrical circuits controlled thereby, and with the armature of each relay represented by a broken "dash" line from each relay magnet to and as in operative connection with the movable contacts of that relay.

The relay R1 includes an armature RA1 and contacts D1—D1' and C1—C2—C3. The contacts D1 and C2 are movable contacts actuated by the armature RA1. When the relay R1 is deenergized and inactive the contacts D1—D1' are disengaged, and contact C2 is engaged with contact C1 and is disengaged from contact C3. When the relay R1 is energized the armature RA1 is actuated and contact D1 is engaged with contact D1', and C2 is engaged with contact C3 and disengaged from C1. The movable contact D1 is electrically connected with one side of punch magnet PM1 by the line Y11, and the fixed contact D1' is connected into line Y4. Movable contact C2 is connected with line X1; contact C1 is connected with line X2; and contact C2 is connected with line X3.

The relay R2 includes an armature RA2 and contacts D2—D2'; contacts C4—C5—C6; and contacts C7—C8—C9. The contacts D2, C5 and C8 are movable contacts actuated by the armature RA2. When the relay R2 is de-energized and inactive the contacts D2—D2' are disengaged;

contact C5 is engaged with contact C4 and is disengaged from contact C6; and contact C8 is engaged with contact C7 and disengaged from the contact C9. When the relay R2 is energized the armature RA2 is actuated and contact D2 is engaged with contact D2'; contact C5 is engaged with contact C6 and disengaged from contact C4; and contact C8 is engaged with contact C9 and disengaged from contact C7. Movable contact D2 is electrically connected with one side of punch magnet PM2 by the line Y12, and the fixed contact D2' is connected into line Y4; movable contact C5 is connected with line X2; contact C4 is connected with line X4; contact C6 is connected with line X5; and movable contact C8 is connected with line X3; contact C7 is connected with line X6 and contact C9 is connected with line X7.

The relay R3 includes an armature RA3 and contacts D3—D3'; contacts C10—C11—C12; contacts C13—C14—C15; contacts C16—C17—C18; and contacts C19—C20—C21. The contacts D3, C11, C14, C17 and C20 are movable contacts actuated by the armature RA3. When the relay R3 is de-energized the contacts D3—D3' are disengaged; contact C11 is engaged with contact C10 and disengaged from contact C12; contact C14 is engaged with contact C13 and disengaged from contact C15; contact C17 is engaged with contact C16 and disengaged from contact C18, and contact C20 is engaged with contact C19 and disengaged from contact C21. When the relay R3 is energized the armature RA3 is actuated and contact D3 is engaged with contact D3'; contact C11 is engaged with contact C12 and disengaged from contact C10; contact C14 is engaged with contact C15 and disengaged from contact C13; contact C17 is engaged with contact C18 and disengaged from contact C16; and contact C20 is engaged with contact C21 and disengaged from contact C19. Movable contact D3 is connected electrically with one side of punch magnet PM3 by the line Y13 and the fixed contact D3' is connected into line Y4; movable contact C11 is connected with line X4; contact C10 is connected with line X8; and contact C12 is connected with line X9. The movable contact C14 is connected with line X5; contact C13 is connected with line X10; and contact C15 is connected with line X11. The movable contact C17 is connected with line X6; contact C16 is connected with line X12; and contact C18 is connected with line X13. The movable contact C20 is connected with line X7; contact C19 is connected with line X14; and contact C21 is connected with line X15.

The relay R4 includes an armature RA4 and contacts D4—D4'; contacts C22—C23—C24; contacts C25—C26—C27; contacts C28—C29—C30; contacts C31—C32—C33; contacts C34—C35—C36; contacts C37—C38—C39; contacts C40—C41—C42; and contacts C43—C44—C45. When the relay R4 is de-energized, the contacts D4—D4' are disengaged; movable contact C23 is engaged with contact C22 and disengaged from contact C24. Movable contact C26 is engaged with contact C25 and disengaged from contact C27. Movable contact C29 is engaged with contact C28 and disengaged from contact C30. Movable contact C32 is engaged with contact C31 and disengaged from contact C33. Movable contact C35 is engaged with contact C34 and disengaged from contact C36. Movable contact C38 is engaged with contact C37 and disengaged from contact C39. Movable contact C41 is engaged with contact C40 and disengaged from contact C42. Movable contact C44 is engaged with contact C43 and disengaged from contact C45. When the relay R4 is energized the armature RA4 is actuated and contacts D4—D4' are engaged; and the movable contacts C23, C26, C29, C32, C35, C38, C41 and C44 are engaged with contacts C24, C27, C30, C33, C36, C39, C42 and C45 respectively, and are disengaged from contacts C22, C25, C28, C31, C34, C37, C40 and C43 respectively. Movable contact D4 is electrically connected with one side of punch magnet PM4 by the line Y14 and the fixed contact D4' is connected into line Y4.

Movable contact C23 is connected with line X8; contact C22 is connected with line X16 and contact C24 is connected with line X17. Movable contact C26 is connected with line X9; contact C25 is connected with line X18 and contact C27 is connected with line X19. Movable contact C29 is connected with line X10, contact C28 is connected with line X20, and contact C30 is connected with line X21. Movable contact C32 is connected with line X11, contact C31 is connected with line X22 and contact C33 is connected with line X23. Contact C35 is connected with line X12, contact C34 is connected with line X24 and contact C36 is connected with line X25. Movable contact C38 is connected with line X13, contact C37 is connected with line X26 and contact C39 is connected with line X27. Movable contact C41 is connected with line X14, contact C40 is connected with line X28, and contact C42 is connected with line X29. Movable contact C44 is connected with line X15, contact C43 is connected with line X30, and contact C45 is connected with line X31.

It is to be here noted that certain of the fixed contacts of relay R4 are not connected to contacts of the next relay R5, but are connected directly with one side of certain of the "N" solenoid magnets as follows: Line X19 is connected with one side of the solenoid magnets N10 and N11; line X23 is connected with N24 and N25; line X27 is connected with N38 and N39; line X29 is connected with N44 and N45; line X30 is connected with N46 and N47; and line X31 is connected with N48.

The relay R5 includes an armature RA5 and contacts C46—C47; contacts C48—C49—C50; contacts C51—C52—C53; contacts C54—C55—C56; contacts C57—C58—C59; contacts C60—C61—C62; contacts C63—C64—C65; contacts C66—C67—C68; contacts C69—C70—C71; and contacts C72—C73—C74. The contacts C46, C49, C52, C55, C58, C61, C64, C67, C70 and C73 are movable contacts. When the relay R5 is de-energized the contacts C46 and C47 are disengaged; contact C49 is engaged with contact C48 and disengaged from C50; contact C52 is engaged with contact C51 and disengaged from contact C53; contact C55 is engaged with contact C54 and disengaged from contact C56; contact C58 is engaged with contact C57 and disengaged from contact C59; contact C61 is engaged with C60 and disengaged from contact C62; contact C64 is engaged with contact C63 and disengaged from contact C65; contact C67 is engaged with contact C66 and disengaged from contact C68; contact C70 is engaged with contact C69 and disengaged from contact C71; and contact C73 is engaged with contact C72 and disengaged from contact C74.

When the relay R5 is energized the armature RA5 is actuated and the movable contacts are actuated from the contact engaging positions above recited, so that contacts C46 and C47 are engaged; contact C49 engages contact C50; C52 engages contact C53; contact C55 engages contact C56; contact C58 engages contact C59; contact C61 engages contact C62; contact C64 engages contact C65; contact C67 engages contact C68; contact C70 engages contact C71 and contact C73 engages contact C74.

In the relay R5 the movable contacts are electrically connected with certain of the fixed contacts of relay R4 as follows: contact C46 is connected with line X16; contact C49 is connected with line X17; contact C52 is connected with line X18; contact C55 is connected with line X20; contact C58 is connected with line X21; contact C61 is connected with line X22; contact C64 is connected with line X24; contact C67 is connected with line X25; contact C70 is connected with line X26; and contact C73 is connected with line X28.

The fixed contacts of relay R5 are directly electrically connected with one side of certain of the "N" solenoid magnets as follows: Contact C47 is connected with N1; contact C48 is connected with N2 and N3; contact C50 is connected with N4 and N5; contact C51 is connected with N6 and N7; contact C53 is connected with N8 and N9; contact C54 is connected with N12 and N13; contact C56 is connected with N14 and N15; contact C57 is connected with N16 and N17; contact C59 is connected with N18 and N19; contact C60 is connected with N20 and N21; contact C62 is connected with N22 and N23; contact C63 is connected with N26 and N27; contact C65 is connected with N28 and N29; contact C66 is connected with N30 and N31; contact C68 is connected with N32 and N33; contact C69 is connected with N34 and N35; contact C71 is connected with N36 and N37; contact C72 is connected with N40 and N41; and contact C74 is connected with N42 and N43.

The relay R5*a* includes an armature RA5*a* and contacts D5—D5′, of which D5 is a movable contact actuated by the armature. When the relay R5*a* is de-energized the contacts D5 and D5′ are disengaged and when the relay is energized the contact D5 is engaged with D5′. Movable contact D5 is electrically connected with one side of the punch magnet PM5 by the line Y15 and the fixed contact D5′ is connected into line Y4.

The relay R6 includes an armature RA6 and contacts D6—D6′; contacts C105—C106—C107; contacts C108—C109—C110; and contacts C111—C112—C113. The contacts D6, C106, C109 and C112 are movable contacts actuated by the armature RA6. When the relay R6 is de-energized the contacts D6—D6′ are disengaged, and contact C106 is engaged with contact C105 and disengaged from contact C107; contact C109 is engaged with contact C108 and disengaged from C110; contact C112 is engaged with contact C111 and disengaged from contact C113. When the relay R6 is energized the armature RA6 is actuated and contacts D6 and D6′ are engaged while movable contacts C106, C109, C112 are engaged with contacts C107, C110 and C113, respectively, and disengaged from contacts C105, C108 and C111.

The fixed and movable contacts of relay R6 are connected in electrical circuits as follows: movable contact D6 is connected with one side of punch magnet PM6 by the line Y16 and the fixed contact D6′ is connected into line Y4; the movable contacts C106, C109 and C112 are each connected into line Y3.

The fixed contacts of relay R6 are connected to certain of the "N" solenoid magnets at the side thereof opposite that to which the contacts of relay R5 are connected as follows: contact C105 is connected with N40 and N42; contact C107 is connected with N43; contact C108 is connected with N44 and N46; contact C110 is connected with N45 and N47; contact C111 is connected with N48 and contact C113 is connected with line Y2 which leads to one side of solenoid magnet N49 of the relay J which will be hereinafter described.

The relay R6*a* includes an armature RA6*a* and contacts C75—C76—C77; contacts C78—C79—C80; contacts C81—C82—C83; contacts C84—C85—C86; contacts C87—C88—C89; contacts C90—C91—C92; contacts C93—C94—C95; contacts C96—C97—C98; contacts C99—C100—C101; contacts C102—C103—C104. The contacts C76—C79, C82, C85, C88, C91, C94, C97, C100 and C103 are movable contacts actuated by the armature RA6*a*. When the relay R6 is energized the movable contacts are engaged with contacts C75, C78, C81, C84, C87, C90, C93, C99 and C102, respectively. When the relay R6*a* is energized the armature RA6*a* is actuated and the movable contacts are then engaged with the fixed contacts C77, C80, C83, C86, C89, C92, C95, C98, C101 and C104 respectively.

The movable contacts C76, C79, C82, C85, C88, C91, C94, C97, C100 and C103 are each electrically connected into line Y3, as are the movable contacts C106, C109 and C112 which are actuated by relay R6.

The fixed contacts actuated by relay R6*a* are directly electrically connected to certain of the "N" solenoid magnets at the side of such magnets opposite that to which the contacts of relay R5 are connected as follows: contact C75 is connected with N2; contact C77 is connected with N1 and N3; contact C78 is connected with N4 and N6; contact C80 is connected with N5 and N7; contact C81 is connected with N8 and N10; contact C83 is connected with N9 and N11; contact C84 is connected with N12 and N14; contact C86 is connected with N13 and N15; contact C87 is connected with N16 and N18; contact C89 is connected with N17 and N19; contact C90 is connected with N20 and N22; contact C92 is connected with N21 and N23; contact C93 is connected with N24 and N26; contact C95 is connected with N25 and N27; contact C96 is connected with N28 and N30; contact C98 is connected with N29 and N31; contact C99 is connected with N32 and N34; contact C101 is connected with N33 and N35; contact C102 is connected with N36 and N38; and contact C104 is connected with N37 and N39.

The relays R5 and R5*a* are electrically connected in parallel and are thus energized and de-energized simultaneously as a unit and function in effect as a single relay. Similarly, relays R6 and R6*a* are connected in parallel and are simultaneously energized and de-energized as a single relay or unit. This arrangement of relays R5 and R5*a*, and of relays R6 and R6*a*, is provided because each of these two relay units must operate a considerable number of contacts and in order to avoid increasing the power and size of a single solenoid magnet so as to provide a single magnet capable of operating the large number of contacts required, two (2) solenoid magnets are provided for operation simultaneously as a unit, and the contacts to be actuated are distributed between such two (2) magnets.

The solenoid magnets N1 to N48, inclusive, are thus arranged and connected into a plurality of groups with the solenoids of each group connected electrically in series in such a manner, that the number of relay controlled contacts necessary to set up the circuits to selectively energize any one of these "N" solenoids, is materially reduced. The solenoid N48 is not connected, in this example, into any of the groups into which the remaining solenoids N1 to N47, are formed, but is connected into a single circuit separate from the circuits for the groups of the solenoids N1 to N47.

In accordance with this feature of my invention the electrical circuit arrangement and grouping of the "N" solenoids, is such that the flow of electrical current through the groups of "N" solenoids is carried out through electrical circuits to one side of the solenoids of each group, which circuits are adapted to be selectively controlled by the relays R1 to R5, inclusive, through the operation of the series of movable contacts actuated by such relays. In the particular arrangement here given as an example, the solenoids N4 to N47, are formed into groups each consisting of four (4) solenoids electrically connected in series, while the solenoids N1, N2, and N3, are connected in series into a single group consisting of such three (3) solenoids.

The circuits controlled by the relays R1 to R5, inclusive, to the respective groups of "N" solenoids, embody two (2) circuits directly connected to each group of "N" solenoids, with one of said two (2) circuits directly connected to two (2) of the solenoids of each group of four (4) solenoids, and the other of said two (2) circuits directly connected to the other two (2) solenoids of the group, and, in the case of the group consisting of the solenoids N1, N2, and N3, one of the two (2) circuits to that group is directly connected to the solenoid N1, and the other circuit for the group directly connected to the solenoids N2 and N3.

The circuits at the sides of the "N" solenoids which are controlled by the relays R1 to R5, inclusive, are adapted to be placed in electrical connection with the terminal T14 of the main electrical power line of the apparatus by line X1 which is connected between movable contact C2 of relay R1, and line L9 which is connected to terminal T14. Thus, by permutable operation of the relays R1 to R5, a selected circuit can be set up directly between terminal T14 and any selected two (2) solenoids of one of the groups of the "N" solenoids. After the setting up of a circuit to the solenoid of one of the groups of "N" solenoids, the final selection of that "N" solenoid of the selected solenoids which is to be energized by the full line current voltage from the main power line of the apparatus, is determined by the relay R6–R6a which is operated (i. e. energized or maintained de-energized and inactive) to complete and render effective, the electrical circuit from that "N" solenoid which it is desired to energize. Thus, the energizing circuit through the selected "N" solenoid is closed and completed either through line Y3, contacts K8′—K8, lines O2—O1—Q1—L1 to terminal T13 of the power line, when the "N" solenoid circuits are being controlled by manual operation of the keyboard 6 of the apparatus; or by line Y3, line Y4, Y5, contacts E1—E2, line Y6, O7, O6, O1, Q1, L1 to terminal T13, when the "N" solenoids are being automatically controlled by the translation of a perforated record tape by the translating mechanism of the apparatus.

*The circuits for permutably energizing the relays controlling the "N" solenoid magnets*

Certain advantages have been attained by the arrangement of the controlling or energizing circuits for the "N" solenoids, and by the hereinbefore described grouping of these "N" solenoids into a plurality of groups electrically, in which the solenoids of each group are so connected that the closing of a direct energizing circuit through the selected solenoid of the group by the selective closing of the contacts controlled by the relays R5—5a and Ry—6a, will always leave the remaining solenoids of the group connected in series. Thus, the selected solenoid of a group will be energized by the full line current, while the combined impedances of the remaining series connected solenoids of the group will reduce the current passing therethrough to a value less than that of the full line current flowing through the selected solenoid. Hence, the series connected solenoids of the group will remain mechanically inoperative to perform the work of which the selected solenoid is capable when energized by the full line current. By reducing the current flowing through the solenoids by series connection, as aforesaid, instead of by disconnecting the circuits to such solenoids, I have been able to reduce the number of contacts otherwise required in the selective energization of one of a plurality of solenoids and in the operation of a plurality of circuits thereto, which would be otherwise required. For instance, in the present example of solenoids and their contact controlled energizing circuits, such feature of my invention has materially reduced the number of relays and the number of contacts and circuits necessary for connecting such relays and contacts, which would be required by the permutative operation of the various circuit controlling relays, to select out and electrically isolate any one of the forty-eight (48) "N" solenoids and energize the selected solenoid and pass current solely through the selected solenoid in order to energize the same, by closing a circuit through the selected solenoid only. By connecting the "N" solenoids of each group of solenoids in such manner, then when an energizing circuit is closed through the selected N solenoid of the group, full line current will flow through and energize the selected solenoid, but while current will also flow through the remaining solenoids of the group, such remaining solenoids will be mechanically ineffective due to the fact that these solenoids are connected in series. The effective energization with resulting typewriter function effecting operation, of any other N solenoid than the selected one, could result in functional failure and false operation. The flow of current through the plurality of N solenoids of a group, other than the selected solenoid, is a flow of current through an undesired and unwanted path, but in order to restrict such flow to the selected N solenoid and eliminate such undesired path of flow, it would be necessary to add a multiplicity of additional contacts and the necessary relays to actuate such additional contacts, as well as the multiplicity of circuit forming wiring for connecting such additional contacts and relays.

In accordance with the present invention, the simplification and reduction in number of contacts, relays, and connecting circuits, is carried out by permitting the current to flow in series through the unwanted paths furnished by the remaining N solenoids in a group in which one solenoid has been selected for energization, by connecting the N solenoids of the group in series, in such a manner, as to render the energization of the remaining series connected N solenoids of the group mechanically ineffective by a multiple use of certain of the contacts on the R6 and R6a relays. The arrangement of the circuits is such that by the selective use of the contacts on the R6 and R6a relays, the selected N solenoid has an energizing circuit directly connected therethrough, so that the flow of current has a direct path into the solenoid and direct return flow path therefrom directly to the line Y3, and while circuits have also been completed through the remaining N solenoids of the group due to the connection of these solenoids in series, yet, because all of these N solenoids possess similar electrical and mechanical characteristics and specifications, the current which flows through the remaining solenoids in series is limited or reduced by the impedance in the path offered by such series connected remaining solenoids, to an ineffective work energizing value compared to that required for accomplishing the mechanical tasks set for any N solenoid to perform when such solenoid is energized by the full line current voltage and is not limited by a series connection with other electrical impedance equal to its own.

One side of the solenoid magnets of each of the relays R1, R2, R3, R4 R5—R5a, and R6—R6a is connected into a common line O1 which is electrically connected with and leads from terminal T13 of the main power line, through lines L1 and Q1. The opposite sides of the solenoid magnets of the relays R1 through R6—R6a, are adapted to be connected electrically with the common line O3 by the lines L11, L12, L13, L14, L15, and L16, respectively, through the medium of electrical switches connected in such lines. In this instance, line L11 connects relay R1 with line O3, and includes a switch having normally open contacts K1—K1' therein; line L12 connects relay R2 with line O3, and includes a switch having normally open contacts K2—K2' therein; line L13 connects relay R3 with line O3, and includes a switch having normally open contacts K3—K3' therein; line L14 connects relay R4 with line O3, and contains a switch having normally open contacts K4—K4' therein; line L15 connects relay R5—R5a with line O3, and includes a switch having normally open contacts K5—K5' therein; and line L16 connects relay R6—R6a with line O3, and includes a switch having normally open contacts K6—K6' therein.

The common line O3 is connected with the terminal T14 of the main power line of the apparatus and is adapted to complete an energizing circuit through any one of the "R" relays, by lines O4, O5 and L9. A switch embodying the normally open contacts K7—K7', is interposed between and connects lines O3 and O4, and is adapted to close or open the circuit through such lines, by engaging or disengaging the contacts K7—K7'. Thus, by closing the normally open contacts K7—K7', and by closing the normally open contacts of the switch in any one of the lines L11, L12, L13, L14, L15 and L16, the circuit through the "R" relay with which such line is connected, will be closed and the relay will be energized. A switch embodying normally open contacts K8—K8', is also connected with the line O3 and is interposed between that line and the line Y3 which provides the common line for the circuits to that side of the "N" solenoids which are controlled by relay R6—R6a. As hereinbefore referred to, these "K" switches, K1 to K8, inclusive, are closed in various combinations or permutations thereof by operation of the key bars 30 of the keyboard 6 of the apparatus, in order to permutably energize the relays R1 to R6—R6a, respectively, in accordance with a code to selectively energize that one of the "N" solenoids which actuates the typewriter printing character or typewriter function corresponding to the key bar of the keyboard 6 that has been actuated. However, with the operation of every key bar of the keyboard 6, the switch contacts K7—K7', and K8—K8', which are connected into the common line O3, are actuated to contact closed positions by the code bar CB7, which code bar is actuated by the operation of every key bar of the keyboard 6, as hereinbefore described.

Switches K10, K11, K12, K13, K14, K15 and K16 are also connected into the lines L11, L12, L13, L14, L15 and L16, and line Y3, respectively, for opening and closing these lines, to open and close the energizing circuits to the "R" relays respectively connected with such lines. These switches are normally closed by the movable contacts K10', K11', K12', K13', K14', K15', and K16'; which movable contacts are mechanically connected with the armature RA7 of relay R7, in such manner that, when the solenoid magnet of relay R7 is energized, these movable contacts are simultaneously swung to circuit opening positions, and when the relay R7 is de-energized, such movable contacts are automatically returned to engaged position closing the lines L11 to L16, inclusive, and line Y3. maintaining such lines closed until relay R7 is again energized.

The relay R7 has the solenoid magnet thereof connected in circuit with and is supplied with current from the main power line connected to the terminals T13 and T14, by line L1 from terminal T13, lines Q1, O1, O6, contacts J2—J1 of the relay J, lines O7 and O8 to one side of the magnet of relay R7, line O9 from the other side of the magnet of R7, and from line O9 to lines O5 and L9 to the power circuit terminal T14. Thus, the energizing circuit through relay R7 is controlled by the contacts J1—J2 of relay J, so that when contacts J1—J2 are in engagement the circuit through the magnet of relay R7 is closed and the armature RA7 is operated to simultaneously open all of the switches K10 to K16, inclusive, and thus open all of the circuits to the relays R1 to R6—R6a, inclusive, from the line O3. When contacts J1—J2 are opened by relay J, relay R7 is de-energized and rendered inactive, and the series of switches K10 to K16, inclusive, are closed, so that circuits may be closed through the relays R1 to R6—R6a, from line O3 by manual operation of the key bars 30 of the keyboard 6 to selectively close combinations or permutations of the switches K1 to K8, inclusive.

As the contacts J1—J2 of relay J are always closed when the translating mechanism of the apparatus is operating to cause the typewriter 10 to print or type the message encoded on a perforated tape $r$ in the translating mechanism, the relay R7 is always energized to open the switches K10 to K16, inclusive, and thus prevent any of the "R" relays being energized by accidental displacement or depression of any of the key bars 30 of the keyboard 6, with resultant closing of any of the switches K1 to K8, inclusive, during automatic operation of the typewriter 10 by the operation of the translating mechanism. By the foregoing arrangement, false operations that might result from inadvertent energization of any of the relays R1 to R6—R6a, from keyboard 6, simultaneously with the operations of the translating mechanism and energization of such relays, is substantially eliminated.

When the relays R1 to R6—6a, inclusive, are to be permutably energized for automatically operating the typewriter 10 to type from a perforated record tape mounted on the translating feed roller 90 of the translating mechanism, the circuits for energizing these relays by manual operation of the keyboard 6 of the apparatus, are opened and rendered ineffective and inoperative by the relay R7, and a different set of energizing circuits are set up for permutably energizing relays R1 to R6—6a, inclusive, through the translating feed roller 90 and the series of brushes U1 to U6, inclusive, and brush U7.

The flexible contacts or brushes U1 to U6, inclusive, are electrically connected to the lines L11 to L16, inclusive, by the lines L11′, L12′, L13′, L14′, L15′ and L16′, respectively. Thus brushes U1 to U6, inclusive, are placed in electrical connection with one side of the relays R1 to R6—6a. The brush U7 is electrically connected with the terminal T14 of the main power circuit by a line L17, contacts F2 and F1 of the cam switch F, line L18, line L7, contacts J4—J3 of relay J, line L8, and line L9 to terminal T14.

When contacts J3—J4, of relay J are closed, and when any one of the brushes U1 to U6, inclusive, makes contact with the electrical conducting surface provided by the sleeve 93 of the translating feed roller 90, and the contacts F1—F2 of the cam switch F are closed, then an energizing circuit is completed through that relay with which the brush engaging surface 93 is connected. Current flows from terminal T13 by lines L1, Q1, and O1, to that particular relay, and from such relay by that one of the lines L11 to L16, and lines L11′ to L16′, which connects the relay to the brush and from the brush to sleeve 93, and then by brush U7, line L17, contacts F2—F1 of switch F, line L18, L17, contacts J4—J3 of relay J, and lines L8 and L9 to terminal T14.

*Punch magnet circuits of the tape perforating mechanism*

The tape perforating mechanism including the tape perforating punches 51 to 56, inclusive, and the punch actuating solenoid magnets PM1 to PM6, together with the tape feed mechanism operating magnet P, are adapted to be operated and controlled under two (2) basic conditions of operation, namely, (1) operation of the perforating mechanism to perforate a record tape by manual operation of the keyboard 6 of the apparatus, and (2) automatic operation of the perforating mechanism to perforate a duplicate tape from, and simultaneously with the automatic operation of the translating mechanism in translating, a perforated record tape *r*.

The punch magnets PM1 to PM6, inclusive, and the feed magnet P, each have one side thereof electrically connected into the common line Y17 which leads to and is connected with the terminal T14 of the power circuit, by line Y18, contacts G5—G4 of the gauging switch G, line Y19, contacts S1—S2 of the switch S, line Y20, and line L9 to terminal T14. Thus, with contacts S1—S2 of switch S closed, and contacts G4—G5 of switch G closed, the side of the circuit to power terminal T14 is maintained closed.

The opposite sides of punch magnets PM1 to PM6, inclusive, are connected with the common line Y4 by the lines Y11 to Y16, inclusive, through the switches embodying the sets of contacts, D1—D1′, D2—D2′, D3—D3′, D4—D4′, D5—D5′, and D6—D6′, respectively. The opposite side of the feed magnet P is connected with the common line Y4 by an unbroken and uninterrupted line Y10.

When the perforating mechanism is being operated by manual actuation of the key bars 30 of the keyboard 6 of the apparatus, the common line Y4 to one side of the punch magnet and the feed magnet, completes the circuits to power line terminal T13, by way of line Y3, contacts K8—K8′, line O2 and lines O1, Q1, and L1 to terminal T13. Hence with contacts S1—S2 of switch S and contacts G4—G5 of switch G, closed, the closing of any of the sets of contacts D1—D1′, D2—D2′, D3—D3′, D4—D4′, D5—D5′, and D6—D6′, will close and complete the circuit through the punch magnet, or punch magnets, respectively in connection with such closed "D" contacts and will energize such punch magnet or magnets and actuate its punch or punches, to make a perforation in the tape. On every punch magnet activation, the feed magnet P will be simultaneously energized by closing of the contacts K8—K8′. These latter contacts are closed simultaneously with the manual operation of every key bar 30 of the key bar 6, except the key bar of feed key 28, through the medium of the code bar CB7, as referred to hereinbefore. When a key bar 30 of the keyboard 6 is depressed, it will close, through the code bars CB1 to CB7, inclusive, a certain combination or permutation of switches from the switches K1 to K6, inclusive, which will cause the energization of the corresponding combination or permutation of relays from the relays R1 to R6a, inclusive, and through the actuation of the armatures of the energized combination or permutation of relays, the corresponding combination or permutation of "D" contacts will be closed to energize the punch magnets respectively connected therewith and cause the operation of a corresponding combination or permutation of punches from the punches 1 to 6, inclusive. And simultaneously with the foregoing operations the feed magnet P will be energized to condition the feed spring 77 of the tape feed mechanism, so that immediately following de-energization of feed magnet P such spring will effect a feeding step of the tape feed and the tape will be moved to the next position for the punching of another transverse row of code perforations therein.

When the perforating mechanism is to be automatically operated to simultaneously perforate a record tape in duplication of a record tape being automatically translated by the translating mechanism, the key bars 30 of the keyboard 6 of the apparatus are out of operation and rendered ineffective to control relays R1 to R6a, by the operation of the relay R7, as referred to hereinbefore. Thus, the circuits from the punch magnets PM1 to PM6, inclusive, to power line terminal T13 through the line Y3 are rendered inoperative. The operation of the translating mechanism is effected by the operation of motor M, the contacts J1—J2 of the relay J being closed, so that, the circuits from the punch magnets PM1 to PM6, inclusive, to terminal T13 are then set up by way of the common line Y4, line Y5, contacts E1—D2 of the automatic operating cam switch E, line Y6, line O7, closed contacts J1—J2 of relay J, lines O6, O1, Q1 and L1 to terminal T13. Under the conditions of automatic operating, the relays R1 to R6—6a, inclusive, are selectively controlled by and through the translating feed roller 90 of the translating mechanism, in the manner hereinbefore described. Hence, the circuits through the required combinations and permutations of the punch magnets are set up by the "R" relays through the selective closing of the "D" contacts to the punch magnets, with the cam switch E continuously operated from the motor M and timed and synchronized to close contacts E1—E2 after the selective punch magnet circuits have been set up, and to open such circuits by disengaging contacts E1—E2 before the "D" contacts are opened.

*Independent tape feed control for the perforating mechanism*

Following a further feature of my invention in connection with the tape perforating mechanism hereinbefore described, I have provided for the selective operation of the tape feed of the perforating mechanism independently of and without causing operation of the tape perforating punches 1 to 6, inclusive, so that an operator may feed the tape step by step to locate the desired portion of the tape beneath the perforating punches.

Referring now to Figs. 3 and 8 of the drawings, the feed key 28 actuates its key bar 30 to engage when depressed, a movable contact K9 (which is mounted on a resilient spring material arm 28a secured to the frame structure for the keyboard 6) and to move such contact K9′ into engagement with a fixed contact K9 positioned therebelow and supported from the frame of the keyboard, as will be clear by reference to Fig. 8 of the drawings.

The movable contact K9′, referring now to the circuit diagram of Fig. 13, is electrically connected to line Y3, and the fixed contact K9 is connected into line O2. Contacts K9′—K9 thus form a switch controlling a circuit between lines Y3 and O2 which is electrically connected in parallel with the contacts K8—K8′. By depressing feed key 28 and thereby closing contacts K9—K9′, a circuit is established from terminal T13 of the power line through lines L1, O1, Q1 and O2, through contacts K9—K9′, lines Y3, Y4 and Y10 to one side of the feed magnet P, and from the opposite side of the feed magnet P by lines Y18, contacts G5—G4, line Y19, contacts S1—S2, and lines Y20 and L9 to the terminal T14 of the main power circuit. Thus, the feed magnet P is energized to actuate its armature 76a to place spring 77 under tension. Upon the release of feed key 28 and disengagement of contacts K9—K9′, the circuit is broken through the punch magnet P and spring 77 operates to cause a tape feed step of the ratchet 74 and the tape feed roller 70. Such operation of the feed magnet P assumes that the circuits of the apparatus have been set for operation of the tape perforating mechanism, so that contacts S1—S2 are closed and the gauging switch G is set with contacts G4—G5 thereof also closed. In this manner the operator may operate the feed magnet P to cause step by step feed operation of feed roller 70, without causing operation of any of the punch magnets PM1 to PM6, inclusive, by actuating or depressing the feed key 28 of keyboard 6.

*The circuits for the motor of the translating mechanism*

The motor M which drives the cam shaft 98 from wihch the step by step feed of the translating feed roller 90 of the translating mechanism is effected, is primarily connected into a low speed circuit which is controlled by the motor starting and stopping switch H, referring now particularly to Fig. 13 of the drawings. This circuit includes the lines L1, L2, resistance unit MR2, and line L5, from terminal T13 of the power circuit to one side of the motor M and the resistance unit MR1, and from the opposite side of the motor by lines L6, L7, contacts J4—J3 of the relay J, and lines L8 and L9 to the other terminal T14 of the power circuit.

This low speed motor circuit, through the resistance unit MR2, reduces the full line voltage of the current delivered to the motor M from the main power circuit terminals T13—T14, and operates the motor at low or reduced speed. For instance, as in the example hereinbefore given of the motor M of this embodiment, this resistance unit in the low speed motor circuit will operate the motor M at a speed of approximately the order of 2500 R. P. M.

The circuit for the low speed operation of the motor M, which includes the resistance units MR1 and MR2 can be converted to a high speed circuit for the motor M by shunting out the resistance unit MR2.

The resistance unit MR2 is shunted from the motor circuit by a shunt circuit which includes the line L3, connected into the line L2 at one side of resistance unit MR2 and which extends to and is connected with a movable switch contact S3 of the switch S, and a line L4 which is connected into the line L5 at the opposite side of unit MR2 and which extends to and is connected with a contact S4 of the switch S. The contacts S3—S4 of switch S are normally open to render this shunt circuit ineffective but are closed by the manual selective operation of switch S to thereby shunt current in the motor circuit around unit MR2. With the switch contacts S3—S4 closed the circuit for the high speed operation of the motor M is set up and established, so that, upon the closing of the motor circuit, the motor will be operated at high speed, that is to say in the example hereof, at a speed of approximately the order of 5000 R. P. M.

*The control relay for starting and stopping the motor of the translating mechanism*

A relay J, referring now to Fig. 13 in connection with Figs. 2 and 3 of the drawings, is suitably mounted, in this example on the base 1 of the group A of the apparatus for controlling the operating circuits for the motor M, as well as certain other of the controlling circuits of the apparatus. This relay J is of the multiple magnet type, and includes a magnet RJ having a pivotally mounted armature 125 operatively associated therewith, such armture 125 being spring loaded by a spring unit 125a which normally maintains the armature in position spaced from magnet RJ, and which is rocked or swung against the force of spring 125a to position drawn by the magnetic field.

Relay J also includes a magnet N49 which is associated with a pivotally mounted armature 126 adapted to be drawn to magnet N49 by the field established when that magnet is energized, and to rock to position spaced away from that magnet when the magnet is de-energized.

The armature 125 of magnet RJ and the armature 126 of magnet N49 are so mounted and arranged relative to each other that the armature 126 is supported in its position spaced from magnet N49 when the latter is de-energized, by the armature 125 of magnet RJ when the latter is de-energized, and the armature 125 is maintained in position spaced from magnet RJ by the spring 125a (see Fig. 13). When magnet RJ is energized the armature 125 is drawn or rocked toward the manget RJ and is removed from position supporting armature 126, so that armature 126 drops or rocks away from magnet N49. Armature 126 carries or actuates the movable contact J3 and when released by armature 125, moves to position engaging contact J3 with contact J4. With the armature 126 in position engaging contacts J3 and J4, when the magnet N49 is energized the armature 126 is drawn toward magnet N49 and disengages contact J3 from contact J4 to thereby open the circuit through such contacts. And then if magnet RJ is de-energized, spring 125a will thereupon draw or rock armature 125 to position under and again supporting armature 126 when the latter is pernitted to fall or rock away from magnet N49 upon de-energization of the latter magnet.

A pivotally mounted arm 126a is connected with and rocked by movements of the armature 126 toward and from magnet N49. This arm 126a is connected with or engages a movable arm carrying the contact J1, so that, when armature 125 is in position supporting armature 126, contact J1 is held in position disengaged from contact J2, but when magnet RJ is energized to move armature 125 from position supporting armature 126, the latter armature moves away from magnet N49 and engages contact J3 with contact J4, and through arm 126a permits contact J1 to move into engagement with contact J2. Hence contacts J1—J2 are always engaged when contacts J3—J4 are engaged, and disengaged when contacts J3—J4 are disengaged.

The magnet RJ is connected in a circuit which is controlled by the contacts H1—H2 of the motor starting and stopping switch H. The circuit through magnet RJ is from the main power terminal T13, by lines L1, Q1, and Q2, to contacts H1—H2, then by lines Q3 and Q4, through magnet RJ, and by lines Q5 and L8 to line L9 and to the main power terminal T14.

Thus, to start the motor M it is only necessary to close contacts H1—H2 momentarily, whereupon magnet RJ is instantly energized and armature 125 of magnet N49 is released by armature of magnet RJ, and swings to position engaging contacts J3—J4 of the relay J to close the circuit through the motor M. The circuit closed by the closing of contacts H1—H2 and contacts J3—J4, will be either the low speed circuit or the high speed circuit dependent upon whether contacts S3—S4 of switch S are open or are closed. It is to be noted that contacts H1—H2 need only be momentarily closed in order to start the motor and can be immediately opened after closing without stopping the motor M because the armature 126 will maintain contacts J3—J4 closed until magnet N49 is energized to cause the disengagement of contact J3 from J4 to thus open the motor circuit and stop operation of the motor M. And when magnet N49 is energized and the armature 126 opens contacts J3—J4, the spring 125a immediately swings armature 125 to position to support and maintain armature 126 in its position opening the contacts J3—J4.

*The manual switch for starting and stopping the motor of the translating mechanism*

The motor M for driving the translating feed roller 90 of the translating mechanism is manually controlled by the operator through the switch H which is located, in this example, at the righthand side of the keyboard 6 of the apparatus, as will be clear by reference to Fig. 1 of the drawings.

This switch H is of the momentary contact type and includes a switch operating arm or lever H7; the contacts H1—H2 in the circuit for energizing the magnet RJ of relay J; and the contacts H3—H4 and H5—H6 in the circuit for energizing the magnet N49 of the relay J. In normal position of the switch lever H7 the contacts H1—H2, and the contacts H3—H4 and H5—H6, are open, so that the circuits therethrough to the magnets RJ and N49, respectively, are open and these magnets are de-energized.

By swinging switch lever H7 to close contacts H1—H2, the magnet RJ is energized and relay J is operated to close contacts J3—J4, and thus close the circuit to the motor M to start operation thereof to drive the translating mechanism. As the switch H is of the momentary contact type, the lever H7 thereof will always return to its normal, neutral position with all of the switch contacts open. In order to start the motor M it is only necessary to swing lever H7 to position momentarily closing the contacts H1—H2 to close the circuit to magnet RJ and thus energize such magnet to actuate the armature thereof to cause contacts J3—J4 to engage and close the circuit to motor M. After such momentary engagement of contacts H1—H2, the switch lever H7 can be released and will return to normal position, without stopping the motor M. In order to stop operation of the motor M the operator throws the lever H7 of switch H to position to momentarily close the contacts H3—H4 and H5—H6. The closing of these contacts closes the circuit through magnet N49 of relay J and energizes that magnet to actuate the armature 126 to position disengaging the contacts J3—J4 to open the circuit to the motor M and thus stop the operation of the motor.

*The switch controlling the operation of the perforating mechanism and selectively controlling the speed of operation of the translating mechanism*

The switch S, which is mounted in this instance at the lefthand side of the keyboard 6 of the apparatus, is of the manually operable type and includes the switch lever S5, as will be clear by reference to Fig. 1 in connection with the Fig. 13 of the drawings.

The switch S includes the contacts S1—S2 in the primary circuits to the punch magnets PM1 to PM6, inclusive, and to the feed magnet P, of the perforating mechanism. When contacts S1—S2 are closed such punch magnet and feed magnet circuits are conditioned for operation of the record tape perforating mechanism.

The switch S also includes the contacts S3—S4 which control the shunt circuit around the resistance unit MR2 of the operating circuit for the motor M of the translating mechanism. When contacts S3—S4 are closed, resistance unit MR2 is shunted out of the circuit, and motor M is operated at its high speed condition when the motor circuit is closed by the manual operation of switch H to close the switch contacts H1—H2.

The operating lever S5 of the switch S has three (3) operating positions, and is of the type of switch lever which will remain in any one of the positions to which it is swung by an operator, until it is swung from that position by the operator, to one of its other positions. In neutral or "off" position, of the lever S5 of switch S, the contacts S1—S2 are open, and the operating circuits of the perforating mechanism are thus rendered ineffective and inoperative. In this "off" position, as shown in Fig. 13 of the drawings, not only are the contacts S1—S2 open, but the contacts S3—S4 are also open, so that the resistance unit MR2 is included in the operating circuit to the motor M, and the low speed circuit for the motor is set up and conditioned for operating the motor M when the switch H is operated to close and complete such circuit. This low speed circuit is always set up and maintained by the switch S when the lever S5 thereof is in position closing the contacts S1—S2, and whenever the high speed circuit for motor M is set up by swinging lever S5 to close contacts S3 and S4 the contacts S1 and S2 are opened and the perforating mechanism cannot be operated. Thus, the translating mechanism can only be operated at low speed by the motor M whenever the perforating mechanism is being automatically operated by and simultaneously with the translating mechanism due to the fact that when contacts S1—S2 of switch S are closed by the switch lever S5, the contacts S3—S4 of the motor high speed circuit are always open and cannot be closed without operating contacts S1—S2. That is to say, whenever the switch lever S5 of switch S is thrown to position closing contacts S3—S4 for high speed operation of the translating mechanism by the motor M, the contacts S1—S2 are always opened to maintain the circuit to the perforating mechanism inoperative during high speed operation of the translating mechanism.

In this manner, whenever the perforating mechanism is operated simultaneously with the translating mechanism, for the purpose of perforating a duplicate record tape from the record tape being translated by the translating mechanism, the operation of the translating mechanism is restricted to its low or reduced operating speed for more efficient operation of the perforating mechanism, and the operation of the perforating mechanism by high speed of the translating mechanism is prevented.

*Making a perforated record tape*

In order to perforate a tape or film and form a record by encoding a message in the form of code perforations in the tape on manual operation of the keyboard 6, without regard to whether the typewriter 10 is automatically simultaneously operated by the "N" solenoids and their associated circuits to type the message being encoded, the operator first swings the lever S5 of switch S to position closing contacts S1—S2. Closing the contacts S1—S2 sets up and places the primary circuits to the punch magnets PM1 to PM6 and to the feed magnet P, in condition for operation through the selective closing of "D" contacts in the punch magnet circuits by the relays R1 to R6a, inclusive.

It is to be noted that all of the energizing circuits for the "N" solenoids for actuating the printing and typewriter function key bars 11 of the keyboard of the typewriter 10 are always under the control of the relays R1 to R6—R6a, inclusive, in the example hereof. This condition maintains, irrespective of whether the R relays are being controlled through manual operation of the keyboard 6, or are under the control of a perforated record tape being translated in the translating mechanism. Hence, when the R relays are selectively permutably actuated through manual operation of the keyboard 6, with switch lever S5 of switch S swung to position closing switch contacts S1—S2, for selectively permutably actuating the punch magnets PM1 to PM6, inclusive, to perforate a record tape, the "N" solenoids are selectively actuated and will simultaneously with the operation of the punching mechanism, also operate the typewriter key levers 11 to cause the typewriter 10 to type the message being encoded. If the typewriter 10 is rendered inactive by shutting off the power to the power roll 12 thereof in the conventional manner, during operation of the punching mechanism, the "R" relays will still control the "N" solenoids and these solenoids will be selectively permutably energized to pull upon the armatures thereof and the cords 112, respectively, attached thereto and to the key levers 11 of typewriter 10. However, the pull on the "dead" key levers 11 will, of course, be ineffective to cause any functioning of the typewriter.

In this connection, it should be further noted that, if the switch lever S5 is in its neutral position with both the sets of contacts S1—S2 and contacts S3—S4 open, the operator may activate the typewriter 10 by switching on the power to the power roll 12, and thereafter operate the typewriter from the keyboard 6 by manual operation of that keyboard, thus by-passing the keyboard of the typewriter 10.

With the switch S set in the foregoing position, the starting and stopping switch H remains in its normal or inactive position with the contacts H1—H2, H3—H4 and H5—H6 thereof in disengaged positions to maintain the circuits to the motor M open so that the relay R7, the circuit of which is controlled by contacts J1—J2 of relay J, will be de-energized and each of the switches K10 to K16, inclusive, in the lines L11 to L16, and Y3 respectively, to the relays R1 to R6—R6*a* will be closed by such switches. Circuits through lines L11 to L16 and Y3, however, are normally maintained opened by the switches K1 to K6 for selective permutative closing by the switches K1 to K6 through manual actuation of the keys of the keyboard 6 of the apparatus.

Preparatory to the tape or film perforating operations, the record tape from a supply roll of such tape which is mounted in the holder 78, is extended forwardly between the plates 45 and 46 and beneath the perforating punches 51 to 56, inclusive, with the tape extended forwardly from between the plates 45 and 46, to and over the feed roller 70, with the sprocket perforations *h* of tape *r* engaged over the sprocket teeth 72 of the sprocket wheels 71 of that roller, and with the pressure roll 73 in position maintaining the record tape in operative position on the feed roller.

The operator then moves the lever 82 of the switch G to swing the cam lip 82*b* thereof, to position which will permit the spring arm 81 of the switch to move forwardly and thereby open contacts G4—G5 of this switch, when the cam 83 has been rotated to position the recess 83*b* in the cam surface 83*a*, opposite roller 84 on the switch arm 81, and such roller has sprung forwardly into the cam recess. The opening of contacts G4—G5 of switch G opens the primary circuits to the punch magnets PM1 to PM6, and to the feed magnet P, such position of switch G being shown in Fig. 13 of the drawings. With the arm 82 swung to the foregoing position, when the roller 84 is in contact with the cam surface 83a of cam 83 of switch G, the arm 81 is forced and maintained in position against pin 80 to hold the contacts G4—G5 of switch G closed, so that the circuits to the punch magnets PM1 to PM6, and to the tape feed magnet P, are set up and in condition for energizing any one of the punch magnets together with the feed magnet P. The foregoing conditions are maintained until cam 83 is rotated to position at which roller 84 moves into cam recess 83b.

The operator then presses the "Feed Key 28" of the keyboard 6 of the apparatus to depress such key, and repeats such depressing strokes of key 28, until the operation of the tape feed becomes inoperative and ineffective, due to the roller 84 of switch G snapping into recess 83b of cam surface 83a, to thereby open the contacts G4—G5 of this switch G. Each depression of the "Feed Key 28" closes contacts K9'—K9 and thus closes the circuit through the feed magnet P of the perforating mechanism to cause the feed roller 70 to be rotated through a partial revolution to feed the tape one step, and simultaneously to rotate the cam 83. Such operation of the "Feed Key 28" is independent of and does not cause operation of any of the punch magnets PM1 to PM6, inclusive, as hereinbefore explained. After the "Feed Key 28" has been depressed a sufficient number of times to have caused the rotation of the cam 83 to position in which the contacts G4—G5 are opened by roller 84 moving into cam recess 83b, so that the circuit through the feed magnet P is opened, the operator then moves lever 82 on the switch G to position forcing the switch arm 81 into engagement with pin 80 to thereafter maintain the contacts G4—G5 closed.

The operator before moving lever 82 depresses the "gauge" key 27 of the keyboard 6, which will cause punch 55 to make a single perforation p in the tape in the fifth perforation column perforation location on the record tape r being fed beneath the punches. This perforation determines a starting point for reference in forming the endless tape and in handling and mounting such tape in the translating mechanism, as will be referred to hereinafter. Depressing the "gauge" key 27, will, in accordance with the code (see Fig. 6), actuate a permutation of the code bars CB, consisting of bars CB5 and CB7, which in turn will close contacts K7—K7'; contacts K8—K8' and contacts K5—K5', to selectively close the circuit through and to energize relay R5 to close contacts D5—D5', and thus energize the punch magnet PM5 to cause actuation of punch 55 to punch a perforation in the fifth perforation column or location on the tape.

The operator then again depresses the "Feed Key," say five (5) strokes, more or less, in order to obtain a blank and unperforated space on the record tape or film following and subsequent to the perforation of the single hole in the tape by the operation of the "gauge" key 27.

Key 22' of the keyboard 6, which corresponds to the carriage return key 22 of the keyboard to the typewriter 10, is then depressed by the operator to cause the apparatus to perforate the combination of code perforations for the typewriter "Carriage Return" function, in order to insure that when the message is automatically translated into functions of the typewriter 10 by the translating mechanism, the message being typed will be started and set up with the desired spacing. The code for the "Carriage Return" function of the typewriter consists of perforations in perforation locations "4" and "6" on record tape, hence, when the carriage return key 22' of keyboard 6 is depressed relays R4 and R6—R6a are energized due to the operation of code bars CB4, CB6 and CB7, to close contacts D4—D4' and D6—D6' and energize punch magnets PM4 and PM6 with resulting operation of punches 54 and 56 to punch the designated code perforations in the tape. Again, it is preferable for the operator to depress the "Feed Key" for several strokes, say three (3), to thus feed the tape through several steps to form a blank or unperforated space between the code perforation of the "carriage return" function and the start of the encoded message.

After the foregoing operations, the apparatus and the tape or film, are in condition for the encoding of the desired message or intelligence in the tape, and the operator may then start "typing" or "spelling out" the message by manual operation of the keys of the keyboard 6. As an example, the word "Tab." will be considered as the message to be encoded on the record tape r.

Following the punching of the coded perforations for the "Carriage Return" function of the typewriter 10, the operator then depresses the space bar 24' of the keyboard 6, as it will be assumed for this example, that the first line of the message is to be indented one space from the left hand margin of the body of the message when typed. Depressing space bar 24' will in accordance with the designated code perforations for the "Space" function of the typewriter 10 (see Fig. 6), actuate code bars CB1, CB2 and CB3 to close switches K1, K2 and K3, and thus, through energization of relays R1, R2 and R3, cause the closing of contacts D1—D1', D2—D2', D3—D3', and K8—K8', to energize punch magnets PM1, PM2 and PM3, together with feed magnet P, to actuate punches 51, 52 and 53 to punch the designated code perforations in the record tape r for the "Space" function.

During the operation of punches 51, 52 and 53 by the designated punch magnets, the circuit through the feed magnet P has been closed by the closing of contacts K8—K8'; and magnet P is energized and its armature is actuated to condition the feed stroke spring 77 for actuating the tape feed magnet through one step when the feed magnet P is de-energized. Immediately following the actuation of space bar 24' and the punching of the code performations, with the return of space bar 24' to inactive position, the feed magnet P is de-energized by the opening of the contacts K8—K8'; and the spring 77 is released to function to cause rotation of feed roller 70 through a partial revolution to move the record tape r forward one step to position the tape for the next perforating operation.

As the "T" of the word "Tab." constituting the message being encoded, is upper case or capitalized, the operator next depresses the "Shift Lock" key 25'. The code perforations for the "Shift Lock" function of the typewriter 10, consist of perforations in tape locations "1," "2," "3" and "6" (see Figs. 6 and 13). Depression of shift lock key 25' will result in energizing punch magnets PM1, PM2, PM3 and PM6, together with feed magnet P, and the actuation thereby of punches 51, 52, 53, and 56, to punch the designated code perforations in the record tape *r*. Upon completion of this punching operation the actuating spring 77 of the tape feed mechanism will automatically operate to feed the tape forward another step beneath the punches 51 to 56.

After the perforation of the code for the "Shift Lock" function of the typewriter 10, the operator depresses the "T" key of keyboard 6, and as the code perforations for the printing character "T" consist of perforations in tape locations "1," "5," and "6," the punch magnets PM1, PM5 and PM6, together with feed magnet P, will be energized to cause punches 51, 55 and 56 to punch such designated code perforations in the tape. The feed spring 77 will, following the punching operation, then actuate the feed mechanism to feed the tape forward one step, such spring having been tensioned by the energization of the feed magnet P.

The operator next depresses the "Shift Release" key 23' of keyboard 6, and the perforating mechanism will, through the energization of punch magnets PM5 and PM6, cause the punches 55 and 56 to punch perforations in perforation locations "5" and "6" of the tape, such combination of perforations being the code designation for the "Shift Release" function of the typewriter 10. It is necessary to perforate the code for the "Shift Release" function into the record tape *r* at this point because the letter following the capital "T" of the word being encoded, is lower case or small type.

The operator next depresses the key of keyboard 6 for the "a" printing character, and as the combination of code perforations for the character "a" consists of perforations in tape locations "1," "2," and "4," the punch magnets PM1, PM2 and PM4, together with feed magnet P, will be energized to cause punches 51, 52 and 54 to punch such designated code perforations in the tape. The feed spring 77 will, of course, have been conditioned by magnet P, and when released will actuate the tape feed mechanism to feed the tape forward one step following such punch operations.

As the next letter of the word being encoded is the letter "b," the operator then depresses the "b" key of keyboard 6. The code perforation for the letter "b," consists of a perforation in tape location "1," hence, when the "b" key of keyboard 6 is depressed, punch magnet PM1 is energized to actuate punch 51 to punch the designated perforation in the record tape *r*, and the feed magnet P is energized to condition spring 77 for actuating the tape feed through one step.

The next printing character of the message to be encoded is a "period," and the code perforations for such character consist of perforations in tape locations "3" and "4" (see Figs. 6 and 13). The operator, therefore, next depresses the "period" key of keyboard 6, with the result that punch magnets PM3 and PM4, together with feed magnet P, are energized and punches 53 and 54 are actuated to punch the designated code perforations in the record tape *r*. Upon completion of the punching operation, the tape feed mechanism is actuated by spring 77 to feed tape *r* forward one step.

Upon the completion of the encoding of the message, the operator then preferably depresses the "Carriage Return" key 22' once, which as hereinbefore described, will cause the perforating apparatus to punch the combinations of the perforations constituting the code for the "Carriage Return" function of the typewriter 10.

The operator next depresses the feed key 28, say for example three (3) times, which as hereinbefore explained, will cause the tape feed of the perforating mechanism to feed the tape forwardly three (3) steps. Such feeding of the tape by operation of feed key 28 is performed and carried out by the apparatus without causing actuation of any of the punches 51 to 56, so that a blank and unperforated space is formed on the tape following the punching of the "Carriage Return" code perforations therein.

Then the operator may, if so desired, depress the key 23' to again perforate the code in the tape for the "Shift Release" function of the typewriter 10, in order to insure that the key basket of the typewriter upon the completion of an automatic typing operation, is left in lower case position.

The next combination of code perforations punched into the tape is the combination constituting the code for the "Stop" function of the automatic translating mechanism of the apparatus of the invention, but preferably before depressing the "Stop" key 29 of the keyboard 6, the operator depresses the feed key 28 once in order to provide a space on the record tape between the last row of code perforations and the code perforations formed in the tape for the "Stop" function. The code perforations for the "Stop" function consist of perforations in tape locations "1," "2," "3," "4" and "6," so that, when key 29 is depressed the punch magnets PM1, PM2, PM3, PM4 and PM6, together with feed magnet P, will be energized and cause the punches 51, 52, 53, 54 and 56, to punch the designated code perforations in the tape *r*.

After completing the above operations the message which, in this instance, consists of the word "Tab." will have been encoded in the record tape *r*, and the operator then throws the switch lever 82 of the gauging switch G to its "off" position, that is, the position in which the contacts G4—G5 will be opened when the roller 84 on the switch arm 81 drops into the cam recess 83b of the cam G. After placing switch lever 82 in the foregoing position, the operator then continues to actuate the feed key 28 of keyboard 6 to feed the tape forwardly step by step through the perforating apparatus until cam 83 has been rotated to position in which the contacts G4—G5 are opened, and the tape feed circuits become ineffective and feeding operation is stopped. After completing the above operation, the operator then swings lever 82 of switch G back to position to engage and maintain the contacts G4—G5 closed and thus condition and set up the circuit to the feed magnet P for closing by the contacts K8—K8'.

The operator before moving lever 82 to closed contacts G4, G5, depresses the "Gauge" key 27 once, and, as hereinbefore explained, such operation of key 27 will cause punch 55 to punch one perforation at the "5" tape location, and this perforation will, as referred to hereinafter, serve as a visual marker to indicate the end of the record tape.

Then, before severing the prepared record tape *r* from the tape supply, the operator depresses the "Feed" key 28 several times, say for example four (4) strokes, in order to provide a length of tape between the single "gauge" perforation in the "5" tape location and the severed end of the completed record tape *r*.

After the foregoing operation of the "Feed" key 28, the operator may then sever the completed tape record *r* from the remainder of the tape, and then form the severed record tape into an endless tape in a manner to be hereinafter described.

In the electric typewriter 10 of this example, the carriage return and rotation of the platen for line spacing are effected automatically when the operator depresses the "Carriage Return" key 22 of the typewriter keyboard. If the message being encoded in the record tape is to consist of a plurality of lines when translated into typing, then the operator will, at the end of each series of words encoded in the tape, which are to comprise a line of typing when translated, perforate the record with the code for the "Carriage Return" function of the typewriter 10. Thus when the record tape is translated, the typewriter carriage return function will be operated at the end of each line of typing and the platen will be automatically rotated to space the paper for the next line. The determination of the number of words for each typed line in the translated message may be arbitrarily made by the operator as he encodes a message; or a prepared copy of the message may be made with the desired line arrangements for the translated copy which will then be followed and encoded with a carriage return code function upon the completion of the encoding of each line of the copy; or the message being encoded may be simultaneously typed on the typewriter 10 by the encoding operation of the keyboard 6, to serve as a visible guide to the operator for line lengths.

While I have set forth the above example of the operation of the apparatus for encoding a message in the form of code perforations in the tape or film, it is to be understood that each operator may develop his own specific technique, or may follow any other sequence of operations preparing the tape or film and the spacing thereon preparatory to the start of the encoding of the message as perforations in the tape, as well as following the completion of such encoding preparatory to severing the complete record from the tape supply; hence the foregoing description of a sequence of operations is set forth herein purely as a guide for purposes of example.

*Simultaneously forming a record tape and typing the message being encoded thereon*

An apparatus of the invention is characterized by the fact that, if desired, and at the option of the operator, the typewriter 10 may be automatically operated by and from the manual operation of the keyboard 6 of the apparatus to form a perforated record tape, to simultaneously type the message being encoded on the tape. In the explanation of the operations of encoding a message in the form of perforations in the tape or film by the operation of the perforating mechanism through the manual actuation of keyboard 6, the typewriter 10 is assumed to have been shut off by switching off the power to the power roll 12 in the normal conventional manner.

The typewriter 10 may, however, be simultaneously automatically actuated by and from the manual operation of keyboard 6 of the apparatus to form a perforated record, through the medium of the actuating mechanism hereinbefore described for operating the key bars 11 of the typewriter 10 by the selective energization of the "N" solenoids.

If, therefore, the typewriter 10 is to be operated simultaneously with the forming of the perforated record by the manual actuation of the keyboard 6, the operator switches on the typewriter 10 and places the desired paper in the typewriter carriage in the usual manner preparatory to typing operations.

Using the word "Tab." as the message being encoded in the perforated tape, and following the operations and sequence of steps described above in the operation of encoding such message as code perforations in the tape, the typewriter 10 will be automatically operated to type the encoded message in the following manner.

The operations and steps following the preparation and positioning of the tape or film in the perforating mechanism, which consists purely of functions of the perforating apparatus and which do not have a corresponding typewriter function, have no operational effect on the typewriter 10 and, hence, need not be here repeated. The first perforating operation to form a combination of code perforations for a typewriter function, consists in the manual operation of the "Carriage Return" key 22′ of the keyboard 6. The code perforation combination for this typewriter function consists of perforations in tape locations "4" and "6."

When key 22′ is depressed, relays R4 and R6 are actuated, with the result that circuits through the "N" solenoids are set up to select out and energize solenoid N3. The armature 110 of solenoid N3 is coupled by a flexible cord 112 with the key bar 11 of typewriter 10 for actuating the "Carriage Return" function of the typewriter. Thus, simultaneously with the actuation of key 22′ and the perforation of the designated code in the perforated record tape being formed, the solenoid N3 is energized and the typewriter mechanism for effecting "Carriage Return" function of the typewriter is operated.

The energizing circuit set up through solenoid N3 is as follows: Line O1 from power terminal T13, line O2, contacts K8—K8′ (closed by code bar CB7), line Y3; contacts C76—C77 which are closed by energization of relay R6—R6*a*; solenoid N3; contacts C48—C49; contacts C24—C23, which are closed by the energization of relay R4; contacts C11—C12; contacts C4—C5; contacts C1—C2; and by lines X1 and L9, to power terminal T14.

In perforating the tape to encode the message "Tab.," the next key of keyboard 6 which is depressed, is the space bar 24′. When space bar 24′ is actuated, relays R1, R2, and R3 are energized and circuits through the "N" solenoids are set up to select out and energize solenoid N46. Energization of solenoid N46, the armature 110 of which is connected with space bar 24 of typewriter 10 by one of flexible cords 112, actuates space bar 24 to operate the space function of the typewriter.

The energizing circuit selected and set up through solenoid N46 by relays R1, R2 and R3, is as follows: From power terminal T13 through contacts K8—K8′ (closed by code bar CB7); line Y3; contacts C109—C108; solenoid N46; contacts C43—C44; contacts C21—C20 which have been closed by energization of relay R3; contacts C9—C8 which have been closed by energization of relay R2; contacts C3—C2 which have been closed by energization of relay R1; and by lines X1 and L9 to power terminal T14.

The next key of key bar 6 actuated in encoding the example message, is the shift lock key 25′ of keyboard 6. When key 25′ is depressed relays R1, R2, R3 and R6 are energized, and a circuit is set up to select out and energize solenoid N47. The armature 110 of solenoid N47 is coupled by one of the flexible cords 112, with the key bar 11 for actuating the "Shift Lock" function of the typewriter 10.

The energizing circuit set up through solenoid N47 is as follows: From power terminal T13 through the closed contacts K8—K8′ (closed by code bar CB7); line Y3; contacts C109—C110, which have been closed by energization of relay R6—6a; solenoid N47; contacts C43—C44; contacts C21—C20, which have been closed by energization of relay R3; contacts C9—C8, closed by energization of relay R2; contacts C3—C2, closed by energization of relay R1; and by lines X1 and L9 to power terminal T14.

The next key operated on the keyboard 6 is the key for the letter "T" and when this key is depressed relays R1, R5—R5a, and R6—R6a, are actuated and a circuit is set up to select out and energize solenoid N29. The armature of solenoid N29 is coupled by one of the flexible cords 112 with the key bar 11 of typewriter 10 for printing the character "t."

The energizing circuit set up through solenoid N29 is as follows: From power terminal T13 through closed contacts K8—K8′ (closed by code bar CB7) and line Y3 to contacts C97—C98 which have been closed by energization of relay R6—R6a; solenoid N29; contacts C65—C64 which have been closed by energization of relay R5—R5a; contacts C34—C35; contacts C16—C17; contacts C7—C8; contacts C3—C2 which have been closed by energization of relay R1, and by lines X1 and L9 to power terminal T14.

The "Shift Release" key 23′ is next operated and causes actuation of relays R5—R5a and R6—R6a to set up a circuit to select out and energize solenoid N1. The armature 110 of solenoid N1 is connected directly to the latch member 121 (see Fig. 4), and actuates that member to release lever 120, which lever is coupled by one of the cords 112 to that key bar 11 of typewriter 10 which actuates the shift release function of the typewriter.

The energizing circuit set up through solenoid N1 by relays R5—R5a and R6—R6a, is as follows: From power terminal T13 to closed contacts K8—K8′, and by line Y3 to contacts C76—C77 which have been closed by energization of relay R6—R6a; solenoid N1; contacts C47—C46 which have been closed by energization of relay R5—R5a; contacts C22—C23; contacts C10—C11; contacts C4—C5; contacts C1—C2; and by lines X1 and L9 to power terminal T14.

The next key of keyboard 6 to be actuated in encoding the example message, is the key for the letter "a." Actuation of this key causes energization of relays R1, R2 and R4, and a circuit is set up thereby to select out and energize solenoid N44. The armature 110 of solenoid N44 is connected by one of the flexible cords 112 to that key bar 11 of typewriter 10 for actuating the "a" type bar of the typewriter.

The energizing circuit set up through the solenoid N44 is as follows: From power terminal T13 through contacts K8—K8′ (closed by code bar CB7); line Y3; contacts C109—C108; solenoid N44; contacts C42—C41 which have been closed by the energization of relay R4; contacts C19—C20; contacts C9—C8 which have been closed by energization of relay R2; contacts C3—C2 which have been closed by energization of relay R1; and by lines X1 and L9 to power terminal T14.

The "b" key of the keyboard 6 of the apparatus is then manually depressed by the operator. Depression of this key causes the energization of relay R1, and a circuit is set up thereby to select out and energize solenoid N26. The armature 110 of solenoid N26 is coupled by one of the flexible cords 112 with that key bar 11 of the typewriter 10 for actuating the "b" type bar.

The energizing circuit set up through the solenoid N26 is as follows: From power terminal T13 to contacts K8—K8′ (closed by code bar CB7) and by line Y3 to contacts C94—C93; solenoid N26; contacts C63—C64; contacts C34—C35; contacts C16—C17; contacts C7—C8; contacts C3—C2 which have been closed by the energization of relay R1; and by lines X1 and L9 to the power terminal T14.

As the message being encoded terminates with a "period," the operator manually depresses the "period" key of the keyboard 6. When this key is depressed relays R3 and R4 are energized, in accordance with the code designated for the "period," and a circuit is set up to select out and energize solenoid N10. The armature 110 of solenoid N10 is coupled by one of the flexible cords 112 with that key bar 11 of typewriter 10 which actuates the "period" type bar.

The energizing circuit set up through solenoid N10 is as follows: From power terminal T13 through the contacts K8—K8′ (closed by code bar CB7); and by line Y3 to contacts C82—C81; solenoid N10; contacts C27—C28; which have been closed by energization of relay R4; contacts C12—C11 which have been closed by energization of relay R3; contacts C4—C5; contacts C1—C2; and by lines X1 and L9 to power terminal T14.

Thus, the typewriter 10 has been automatically operated to type out the message being encoded in a record tape simultaneously with the operation of the perforating mechanism to encode the message in the tape by the manual actuation by the operator of the keyboard 6 of the apparatus. In perforating the tape to encode the message of this example, the operator, as described hereinbefore carried out certain further key operations of the keyboard 6. These operations, however, involve functions limited to the apparatus of the invention and did not include functions or operations of the typewriter 10, with the exception of the actuation of the "Carriage Return" key 22′, and of the "Shift Release" key 23′, and are solely concerned with the technique of preparing the perforated record tape, and hence need not be here repeated. The repeat actuation of the "Carriage Return" and of the "Shift Release" keys 22′ and 23′, which are included in the steps of preparing the record tape, are carried out after the completion of the encoding of the body of the actual message in the tape, and they will, of course, cause the simultaneous operation of these functions of the typewriter 10 as these keys are actuated. However, it is considered unnecessary to repeat the description of the circuits which are set up to effect and carry out such typewriter operations, as such circuits have been described and identified in the foregoing description.

Following a feature of an apparatus embodying the invention, such as the apparatus of the present example, the typewriter 10 may be operated solely from the manually operable keyboard 6 of the apparatus without utilizing the keyboard of the typewriter 10. And, if desired, the keyboard of the typewriter 10 may be eliminated, with the keyboard 6 of the apparatus then adapted to function as both the keyboard for the typewriter 10 and keyboard for the apparatus carrying out the perforating operations to form a record tape *r*. Hence it will be understood that typing or printing units, such as the typewriter 10, without a keyboard, may be operated by and from the apparatus of the invention by utilizing the keyboard of the apparatus. When it is desired to operate the typewriter 10 from the manual keyboard 6 of the apparatus, without operating the tape perforating mechanism by the actuation of the keyboard 6, the operator merely throws the switch lever S5 of switch S to its normal, inactive position, so that the contacts S1—S2 thereof are open and the operating circuits to the perforating mechanism are thereby rendered ineffective and inoperative by the manual actuation of the keys of the keyboard 6. During operation of keyboard 6 as the keyboard for the typewriter 10, the switch H is, of course, in position opening and rendering ineffective the operating circuits for the translating mechanism so that such mechanism is out of operation.

*Forming the endless perforated record tape*

After the completion of the encoding of the message in the form of the code perforations *p* in the record tape or film *r*, and the severing of the completed record tape from the tape supply in the perforating mechanism, all as hereinbefore described and explained, the operator trims each end of the record tape *r* to within approximately one-eighth inch (⅛″) from the single "gauge" perforation which has been punched at each end of the tape. The operator then takes the severed and trimmed length of the record tape *r* in the lefthand with the first "gauge" perforation which has been punched in number "5" tape location, positioned at the right of the center of the tape as the operator faces the tape, and with the record tape right side up. The operator then winds the record over the first, second and third fingers of the lefthand in a clockwise direction. After the record is completely coiled over such fingers, the operator withdraws the starting end of the record which is located at the inside of the coiled tape, axially or laterally outwardly from the lefthand side of the coil and then superimposes the "gauge" perforation which was punched after the completion of the record at the termination or end thereof, over and aligned with the first or starting "guage" hole located at the beginning or start of the record. Then, while holding these ends of the record together between fingers with the "guage" holes alined, the operator fastens the superimposed tape ends together with a strip of "Scotch tape" or the like material, say a strip of approximately one (1″) inch in width. This fastening or adhesive tape is, of course, applied to secure the ends of the tape together in a manner so as not to overlap the sprocket drive holes *h* of the record tape *r*.

Thus, an endless record tape *r* is formed which consists essentially of a roll *r′* formed of coils or convolutions connected by a length of tape made up of a bight *r″*, an upper ply *u′* extending from the upper and outer side of roll *r′*, and a lower ply *l′* extending from the lower side of roll *r′*, to the upper and lower sides respectively of bight *r″*.

*Automatic typing from a perforated record tape*

The typewriter 10 is automatically operated by the apparatus of the invention to type or print a message which has been encoded in the form of code perforations in a record tape, by the operation of the translating mechanism of the apparatus to translate such code perforations into operations of the key bars or levers of the typewriter 10, in accordance with the typewriter characters or typewriter functions respectively represented by the series of rows of transverse code perforations in the record tape.

An endless record tape *r* having the encoded message thereon in the form of the perforations *p* in the tape, may be formed in the manner hereinbefore described, and is mounted for translation by the translating mechanism, by placing the roll *r′* of the endless tape *r* on the fulcrum rod 108 of the tape holder and mounting the bight *r″* formed in the tape by the connected opposite ends thereof, on and over the translating feed roll 90, of the translating mechanism. However, before an endless record tape is mounted on the translating feed roller 90 it is assumed that the roller 90 is properly positioned on its shaft 91, so that the index or starting line 96 on the surface of the conducting sleeve 93 of that roller will accurately align with and across the contact ends of the brushes U1 to U6, inclusive, when the roller 90 is positioned with the brushes at such index line. If the brushes are not in alignment with the index line 96, then the roller 90 may be adjusted on and relative to the shaft 91 to obtain the desired alignment.

Prior to mounting the bight *r″* of the endless record tape on the translating feed roller 90, the operator positions that roller to locate the starting or index line 96 at and centrally across the upper side thereof. The roller 90 may be readily brought to such starting or tape mounting position by starting and stopping the motor M through the operation of the switch H to rotate the roller through partial revolutions until the index line 96 is at the required starting position at the upper side of the roller 90.

In order to condition the translating mechanism for receiving and mounting the endless record tape, the operator first swings the handle 94*c* of the brush holder 94 to a position in which the brushes U1 to U6, inclusive, are raised and swung outwardly to position spaced from the roller; and the presser rolls 95*a*, 95*b* are also swung to positions spaced radially outwardly from the translating feed roller 90. The operator then slips the bight *r″* which has been formed by connecting the opposite ends of the record tape together, over the translating feed roller 90, in such a manner, that the "Gauge" perforations which are aligned at the connected ends of the tape, are centrally aligned with the starting or index line 96 positioned at the upper side of the roller 90. The roll *r′* of the endless record tape *r* is then placed over and is loosely received on the fulcrum rod 108 of the endless tape holder of the translating mechanism, with the upper ply *u′* extending from the upper side of the feed roller 90 to the upper side or outer coil of the roll *r′*, and with the lower ply *l′* extending from the under side of the roller 90 to the core or inner coil of the roll *r′* which is around and next to the fulcrum rod 108 of the holder. The operator then swings the presser rolls 95*a* into operative position engaging and pressing the upper and lower plies *u′* and *l′* of the record tape against the roller 90, and the brush holder 94 is swung downwardly to position the brushes U1 to U6 into operative position with the contact ends of the brushes engaging the outer surface of the bight $r''$ of the endless tape $r$ which is mounted on and engaged over the translating feed roller 90. With the record tape so mounted on and over the translating feed roller 90, the sprocket drive holes $h$ are correctly registered with and receive the sprocket teeth 90$b$ on the sprocket wheels 90$a$ on the opposite ends, respectively, of the feed roller 90, so that each partial revolution of the roller 90 will move the tape a distance to align the next code perforation receiving transverse portion of the tape with the brushes U1 to U6.

The translating feed roller 90 is rotated step by step in a clockwise direction when facing the translating mechanism from the front of the apparatus, with the result that the feed roller draws the lower ply $l'$ of the record tape $r$ from the core or inner coil of roll $r'$ on the rod 108, and moves the tape step by step up over the roller 90 across the brushes U1 to U6, inclusive, and then moves the same as the upper ply $u'$, from the upper side of the roller back to the upper coil of the roller $r'$ on the holder rod 108. Thus, by the foregoing arrangement and combination of translating feed roller 90, fulcrum rod 108, and endless tape $r$, the step by step rotation of the translating feed roller automatically unwinds the tape from the center or core of the roller $r'$ on rod 108, passes the same upwardly over the feed roller 90 and simultaneously rewinds the tape on to the outside of the roll $r'$. The tape then passes from the outside coil through the convolutions which form the roll $r'$ on the rod 108 to the convolution in the core or center of the coil from which it is unwound back to the feed roller 90. In this manner the endless record tape may be continuously passed over and around the translating feed roller 90 for translation of the code perforations thereon; and repeated translations of the coded message may be carried out without removing or readjusting the tape after each translation.

After the endless record tape $r$ is mounted in position on the translating feed roller 90 for translation of the encoded message, the operator then starts the operation of the translating mechanism by throwing the switch H to starting position to momentarily engage the contacts H1—H2 to close the motor circuit and start the operation of the motor M. If the operator wishes to operate the motor M for high speed translation and operation of the typewriter 10, the switch S is positioned closing the contacts S3—S4. If low speed operation is desired the switch S is set with the lever S5 thereof in its central position with contacts S3—S4 out of engagement. If the operator desires to simultaneously actuate the perforating mechanism to duplicate a tape being translated in the translating mechanism, the switch lever S5 of switch S is placed in its position closing contacts S1—S2, with the contacts S3—S4 open so that the motor is operated at low speed.

Assuming for the purposes of the present explanation that the switch S is in position closing contacts S3—S4 for high speed operation of the motor M, then, with the motor placed in operation by closing the contacts H1—H2 of the switch H, the translating feed roller 90 is rotated step by step through partial revolutions by the step by step drive mechanism hereinbefore described. Each partial revolution of the translating feed roller 90 will align a transverse portion of the record tape $r$ with the row of contact brushes U1 to U6, inclusive, the brush U7 being, of course, continuously in contact with the surface of the conductor sleeve 93 of the translating feed roller.

If there are no code perforations in the transverse portion of the tape moved to position aligned with the brushes U1 to U6, then the circuits through such brushes are maintained open by the unperforated portion of the tape interposed between roller sleeve 93 and the brushes. But, if there is a code perforation or perforations aligned with and opposite any one of the brushes, then such brush or brushes will engage the conductor sleeve 93 through the perforations and close a circuit through such brushes, the conductor sleeve 93 and the bush U7.

When the starting switch H is operated to motor starting position the primary circuits through the relays R1 to R6—R6$a$ are conditioned and set up by the actuation of the relay J to close the contacts J3—J4, so that such primary circuits then consist of the common line O1 connected to one side of the relays R1 to R6—R6$a$; the lines L11' to L16' which connect the brushes U1 to U6 with the opposite sides of such relays, respectively; the conductor sleeve 93 of the translating roller 90; the brush U7; contacts F1—F2; closed contacts J4—J3 and by lines L8 and L9 to power terminal T14.

The actuation of the relay J by operation of the starting switch H to motor starting position, by the closing of relay contacts J1—J2, results in closing the circuit through the relay R7 and energizes this relay, so that its armature RA7 is actuated to simultaneously open each of the switches K10 to K16, inclusive, in the lines L11 to L6 inclusive, and line Y3, and to maintain these switches open until contacts J1—J2 are again opened. Thus, the switches K1 to K8, incuits through the relays R1 to R6—R6$a$, inclusive, in the event of closing of any one of the latter switches by accidental manual depression of any one of the keys of the key board 6, during the automatic operation of the typewriter 10.

It is to be here noted that the primary circuit from which the "N" solenoids are selectively energized during automatic typing operation of the typewriter 10 by the manual actuation of the keyboard 6 of the apparatus, is changed for automatic typing of the typewriter 10 from a perforated record tape being translated by the translating mechanism. When the translating mechanism is being operated by the motor M, as a result of the actuation of the relay J to close the motor circuit contacts J3—J4, the actuation of this relay also closes the contacts J1—J2, so that the primary circuit from which the "N" solenoids may be selectively energized consists of lines L1, from power terminal T13; line O6; contacts J2—J1; lines O7, Y6; contacts E2—E1 of the cam switch E; and line Y5 to line Y4 to the common line Y3 to one side of the "N" solenoids, and then from the other side of any selected "N" solenoid through the contacts actuated by those "R" relays which have been placed in circuit, and by the lines X1 to L9 to the power terminal T14.

Utilizing the perforated record tape $r$ which has been perforated to encode a message therein represented by the word "Tab.," as the example, then the first transverse row of code perforations on the tape $r$ to be moved into position in alignment with the brushes U1 to U6, inclusive, by the step by step rotation of roller 90, will be the combination of perforations constituting the code for the "Carriage Return" function of the typewriter 10.

This "Carriage Return" code embodies perforations in tape locations "4" and "6," which perforations will be brought into alignment with brushes U4 and U6, respectively, as the feed roller 90 comes to rest at the end of the feeding step, and such brushes will engage and make electrical contact with the conducting surface of the sleeve 93 of roller 90 through these perforations. The remaining brushes of the series will be maintained out of contact with conductor sleeve 93 by the unperforated body of the record tape *r*. During the feeding step or partial revolution of the feed roller 90, the cam switch F maintains the contacts F1—F2 thereof open, but immediately after the roller 90 completes its feeding step and comes to rest and brushes U4 and U6 are in contact with sleeve 93, the cam switch F closes contacts F1—F2 in the line L17 from the brush U7, and the energizing circuits are completed through relays R4 and R6—6*a*.

The circuits which are set up and closed to energize relays R4 and R6—R6*a*, are as follows: For relay R4, from power terminal T13 by line O1; relay R4; lines L14—L14'; brush U4; sleeve 93; brush U7; line L17; contacts F2—F1; lines L18 and L7 to contacts J4—J3; and by lines L8 and L9 to power terminal T14, and for relay R6—R6*a*: From power terminal T13 through this relay and by lines L16 and L16' to brush U6; conductor sleeve 93; brush U7; cam switch F; relay J; and by lines L8 and L9 to power terminal T14. Thus, as hereinbefore described, the relays R4 and R6—R6*a* are energized and selectively set up a circuit to cause energization of solenoid N3, which results in the operation of the "Carriage Return" function of typewriter 10.

But, while relays R4 and R6—6*a* set up the energizing circuit for solenoid N3, such circuit is maintained open by cam switch E for an interval of time thereafter sufficient to insure the completion of the setting of the contacts actuated by the armatures of these relays, in the proper relationship to complete the energizing circuit through solenoid N3. After such interval of time the cam switch E closes contacts E1—E2 and completes the closing of the energizing circuit through solenoid N3.

Upon the completion of the foregoing operations, cam switch F opens contacts F1—F2 to break the circuits through the brushes just before the next feeding step of roller 90 starts, so that when the conducting sleeve of roller 90 is moved in contact with the brushes U4 and U6 and these brushes break contact with sleeve 93, the circuits therethrough are open and the sleeve 93 and brushes are "dead."

The cam switch E is so timed, as described hereinbefore, that the cam 107 thereof opens contacts E1—E2 in advance of the opening of the circuits energizing relays R4—R6—6*a* by the cam switch F and the resulting de-energization of such relays. Hence, the energizing circuit set up through the solenoid N3 is open and broken after the breaking of engagement between the contacts actuated by the armatures of the relays R4—R6—6*a*, thus preventing any arcing at these said relay contacts.

The translating feed roller 90 is then rotated through a partial revolution to move the record tape *r* one step to thus align the next transverse row of code perforations on the tape with the brushes U1 to U6.

As the next row of code perforations consist of perforations in tape locations "1," "2" and "3," constituting the code for the "Space" function of the typewriter, relays R1, R2 and R3 will be energized and circuits will be set up thereby which will energize solenoid N46, which through its armature 110 and flexible cord or linkage 112, will actuate the "Space" function of the typewriter 10.

The translating feed roller 90 will then be rotated to feed the tape another step and thus bring the code perforations for the "Shift Lock" function of the typewriter into alignment with the brushes U1 to U6, and as the code for this function consists of perforations in tape locations "1," "2," "3," and "6," a permutation of relays R1, R2, R3 and R6—6*a* will be energized and circuits will be set up thereby to select out and energize solenoid N47.

The armature of solenoid 47 is connected through the lever arm 120 with one of the key levers 11 of the "Shift Lock" function of typewriter 10. Hence, when the solenoid N47 is energized, the "Shift Lock" function of the typewriter 10 is operated.

On the next feeding step of the translating feed roller 90, the record tape *r* is moved to align the code perforations for the letter "T" with the brushes U1 to U6, and as this code is formed by perforations in tape locations "1," "5" and "6," the permutation of relays R1, R5—5*a*, R6—6*a* is energized and a circuit is set up thereby for energizing solenoid N29. The armature of solenoid N29 is connected with the key bar or lever 11 of the typewriter 10 for actuating the "T" type bar, by one of the flexible cords 112, and when solenoid N29 is energized, its armature is actuated and operates such key bar to cause the typewriter to print the letter "T."

The next step of the feed roller 90 brings code perforations in tape locations "5" and "6," being the code for the "Shift Release" function of the typewriter 10, into alignment with the brushes U1 to U6, with the result that relays R5—5*a* and R6—6*a* are energized and a circuit is set up for selecting out and energizing solenoid N1. The solenoid N1 is connected with that key lever of the typewriter 10 for actuating the typewriter "Shift Release," by one of the cords 112, so that upon energization of solenoid N1 the "Shift Release" function of the typewriter is operated thereby.

The next row of code perforations of the encoded message consists of perforations in tape locations "1," "2" and "4," being the code for the letter "a," so that, on the next feeding step of roller 90, such row of perforations is aligned with the brushes U1 to U6. Thus, a permutation of relays R1, R2, and R4 is energized and a circuit is selected out and set up thereby to energize solenoid N44. The energization of solenoid N44 will actuate the key bar 11 of typewriter 10 to cause the typing of the letter "a" by the typewriter.

On the next feeding step of roller 90, the code perforation in tape location "1" is brought to alignment position with the brushes U1 to U6, such perforations being the code for the letter "b." Thus, relay R1 is energized and will set up a circuit for energizing solenoid N26. The energization of solenoid N26 will actuate the key lever 11 of the typewriter 10 to cause the typewriter to print the letter "b."

The next feeding step of roller 90 will align the next row of code perforations with the brushes U1 to U6, being perforations in tape locations "3" and "4" constituting the code for the "period." Thus, relays R1 and R4 are energized and select out and set up an energizing circuit for the solenoid N10. The energization of solenoid N10 will actuate the key lever 11 of the typewriter 10 for the "period" type bar, and will cause that type bar to print or type the "period."

The next row of code perforations in the record tape *r* of the present example constitutes the code for the "Stop" function of the apparatus of the invention, and such code perforations are translated by the translating mechanism of the apparatus into an operation of relay J to open the motor circuit to stop operation of motor M and the translating mechanism driven thereby. Such code consists of perforations in tape locations "1," "2," "3," "4," and "6" and, when such row of perforations is aligned with the brush U1 to U6 on the next feeding step of the roller 90, a permutation consisting of relays R1, R2, R3, R4, and R6-6*a*, is energized. The energization of this permutation of relays will select out and set up a circuit for energizing the magnet N49 of the relay J. When magnet N49 is energized its armature 126 is actuated to disengage and open contacts J1—J2 and contacts J3—J4. The opening of contacts J3—J4 will open the operating circuit of the motor M and thus stop operation of the motor and of the translating mechanism driven thereby.

The opening of the contacts J1—J2 by the actuation of the relay J, from the translation by the translating mechanism of the "Stop" code perforations in the tape *r*, will open the circuit through relay R7 and de-energize this relay, so that the switches K10 to K16, inclusive, are restored to their normal closed position and the circuits controlled by manual operation of the keys of keyboard 6 will again be rendered effective for operation.

The circuit set up for energizing magnet N49 of relay J by the "Stop" code perforations of the record tape *r*, through the energization of the permutation of relays R1, R2, R3, R4 and R6—6*a*, is as follows: From power terminal T13 to lines L1, Q1, O1 and O6; contacts J2—J1, lines O7—Y6 to contacts E2—E1; and by lines Y5—Y4 and Y3 to contacts C112—C113 which are closed by relay R6—6*a*; line Y2 to magnet N49; and from magnet N49 by line Y1 to contacts C45—C43 which are closed by relay R4; contacts C21—C20 which are closed by relay R3; contacts C8—C9 which are closed by relay R2; contacts C3—C2 which are closed by relay R1; and then by lines X1 and L9 to power terminal T14.

When relay J is thus actuated by the energization of magnet N49 with the resultant opening of contacts J1—J2 and contacts J3—J4 by the actuation of armature 126, the armature 125 of magnet RJ is actuated by its spring 125*a* and moved to position again engaging and maintaining armature 126 in its position opening contacts J1—J2 and J3—J4, until magnet RJ is energized by the actuation of switch H.

It will be understood, of course, that during the operation of the translating mechanism, the cam switches E and F are cyclically operated to open and to close the circuits through their contacts E1—E2 and F1—F2, respectively, as hereinbefore described in connection with the explanation of the translation of the first row of code perforations constituting the code designation for the "Carriage Return" function of the typewriter 10, presented by the example of perforated record tape *r* having the message, "Tab.," encoded thereon.

Upon completion of the translation of the record tape *r*, and of the typing by the typewriter 10 of the message encoded on that tape, the tape may be again translated by merely operating the lever H7 of the switch H to its position for starting motor M. The translation of the endless record tape *r* may be repeated as many times as desired without removing the tape from the translating mechanism. Or, if repeat translations of record tape *r* are not desired, then the tape may be readily removed from the translating feed roller 90 and the fulcrum rod 108 of the endless tape holder, and the translating mechanism thus conditioned for receiving and mounting another record tape for translation.

*Making a duplicate perforated record from a record being automatically translated*

In the automatic typing operation above described and explained, the translating mechanism and the typewriter 10 were alone operated, as the switch S was assumed to be in position with the contacts S1—S2 controlling the primary circuit for the punch magnets PM1 to PM6 and for the feed magnet P, of the perforating mechanism, open, so that, notwithstanding the closing of the "D" contacts for the magnets of the perforating mechanism by the selective, permutable energization of the relays R1 to R6—6*a*, by the operations of the translating mechanism, the circuits closed by the "D" contacts were rendered ineffective and "dead" by the open contacts S1—S2.

However, the apparatus of my invention as hereinbefore described, is adapted for and capable of operation to cause the perforating mechanism to automatically, simultaneously perforate a record tape in duplication of a perforated record tape being translated on the translating mechanism to automatically operate the typewriter 10 to type the encoded message.

If it is desired to form a duplicate record on the perforating mechanism, the operator, before starting the operation of the translating mechanism by the motor starting switch H, swings switch lever S5 of switch S to position closing the contacts S1—S2 to thus condition the primary circuits for the perforating mechanism for operation by the selective opening and closing of the "D" contacts by selective energization of Relays R1 to R6—6*a*.

It is to be noted that with the arrangement of apparatus and its operating circuits here disclosed as an example, when the switch S is positioned to close the contacts S1—S2, the contacts S3—S4 for setting up and closing the high speed circuit for the motor M, are maintained in open position. Hence, the motor M cannot be operated at high speed with resulting high speed operation of the translating mechanism, during operation of the perforating mechanism. The low speed circuit for motor M operates the translating mechanism and causes the permutable closing of the operating magnets of the perforating mechanism at an efficient rate of speed of operation of the punches 51 to 56 and of the tape feed of the perforating mechanism.

With the contacts S1—S2 of switch S closed, then, when the translating mechanism is placed in operation, with the resulting selective energization of various permutations of the relays R1 to R6—6*a* in accordance with the code perforations moved successively into alignment with the brushes U1 to U6, corresponding permutations of the sets of contacts D1—D1', D2—D2', D3—D3', D4—D4', D5—D5', and D6—D6' will be closed, so that the punch magnets respectively controlled thereby will be energized to punch the designated code perforations in the tape or film being fed step by step through the perforating mechanism by the operation of feed magnet P.

It is deemed unnecessary to here repeat a description and explanation of the operation of the perforating mechanism in perforating a record tape to encode the message "Tab." here utilized as an example, as such encoded message is being translated by the translating mechanism and automatically typed by the actuation of the typewriter 10, because the operation of the perforating mechanism automatically from the operation of the translating mechanism in translating the perforated tape, is the same as that already described herein in connection with the forming of a perforated tape by manual operation of the keys of the keyboard 6 of the apparatus.

The example of apparatus embodying the various features of my invention which I have illustrated and described herein, is designed for operation from a source of electric power of 110 volts, 60 cycles, alternating current, and all of the electrical instrumentalities, units and mechanism embodied in the apparatus are of a character for operation by such types of electrical current. In this manner, I have eliminated all necessity for current conversion units such as rectifiers, transformers, and the like; and I have manually, schematically illustrated a power line for conducting 110 volt, 60 cycle electrical current to the main power terminals T13 and T14 of the apparatus, in Fig. 13 of the accompanying drawings.

It will be clear that my invention is not necessarily limited or restricted in all of its forms and embodiments to the use of 110 volt, 60 cycle, alternating current, as other alternating currents of different voltages and cycles may be employed, as well as direct current, in which latter event equivalent electrical instrumentalities, units and mechanism to those herein disclosed and described for use with alternating current, may be employed.

It will also be evident that various other forms, designs, constructions and combinations may be resorted to without departing from the broad spirit and scope of my invention, and hence I do not intend or desire to limit my invention in all respects to the exact and specific disclosures hereof.

What I claim is:

1. In combination, mechanism for selectively operating the type bar actuating and function actuating levers, respectively, of a typewriter, said mechanism including a series of solenoids each having an armature controlled thereby, the armatures of said solenoids being adapted to be operatively connected with the type bar actuating and typewriter function actuating levers, respectively, of a typewriter, a perforated tape translating mechanism for translating a record tape having a message encoded therein as successive sets of code arranged perforations, electrical circuits for energizing the solenoids of the mechanism for operating the typewriter levers, respectively, of a typewriter, electrical circuits controlled by said translating mechanism for closing various combinations of said circuits in accordance with each code arranged set of perforations, respectively, in a record tape presented for translation, to set up said solenoid energizing circuits to energize a selected solenoid, an electric motor for driving said translating mechanism, a high speed circuit for said motor, a low speed circuit for said motor, a switch for conditioning said motor circuits for selectively rendering either of the said circuits effective to operate said motor, record tape perforating mechanism for encoding a message as successive sets of code arranged perforations in a tape, said perforating mechanism including a set of tape perforating punches and solenoids for actuating said punches, respectively, electrical circuits for energizing the punch actuating solenoids of said perforating mechanism, said punch solenoid circuits being controlled from and selectively permutably energized in accordance with the circuits respectively set up by the operations of the translating mechanism to cause simultaneous operation of the perforating mechanism and of the translating mechanism, a switch for conditioning the electrical circuits for the perforating mechanism, to render said circuits either effective or ineffective to operate the perforating mechanism, and said switch being controlled by the operation of said motor circuit switch to render said perforating mechanism circuits ineffective when the motor switch renders the high speed motor circuit operative and to render said perforating mechanism circuits effective when the motor switch renders the low speed motor circuit inoperative.

2. In combination, electro-mechanical means for selectively operating the type bar actuating and function actuating levers, respectively, of a typewriter, electrical circuits for controlling the selective operation of said means, translating mechanism for translating a record tape having a message encoded as successive sets of code arranged perforations therein, said translating mechanism controlling and setting up combinations of said electrical circuits to cause said typewriter lever operating means to select out and actuate that lever of a typewriter represented by the set of code perforations being translated by said translating mechanism, record tape perforating means including electro-mechanical operating means for encoding a message in a record tape in the form of successive sets of code perforations corresponding to the printing characters and typewriter functions composing the message being encoded, electrical circuits for controlling the electro-mechanical mechanism for operating said tape perforating means, said electrical circuits for the tape perforating means being controlled and selectively set up by operation of the translating mechanism in translating a record tape to cause selective operation of the tape perforating means simultaneously with the operation of the translating mechanism, to form sets of code perforations in the tape duplicating the sets of code perforations, respectively, in the tape being translated by said translating means, a motor for driving said translating means, a high speed operating circuit for said motor, a low speed operating circuit for said motor, and a switch controlling said high and low speed motor circuits for selectively closing either of said circuits for operation of the motor.

3. In combination, electro-mechanical means for selectively operating the type bar actuating and function actuating levers, respectively, of a typewriter, electrical circuits for controlling the selective operation of said means, translating mechanism for translating a record tape having a message encoded as successive sets of code arranged perforations therein, said translating mechanism controlling and selectively setting up combinations of said electrical circuits to cause said typewriter lever operating means to select out and actuate that lever of a typewriter represented by the set of code perforations being translated by said translating mechanism, record tape perforating means including electro-mechanical operating means for encoding a message in a record tape in the form of successive sets of code perforations corresponding to the printing characters and typewriter functions composing the message being encoded, eelctrical circuits for controlling the electro-mechanical mechanism for operating said tape perforating means, said electrical circuits for the tape perforating means being controlled by operation of the translating mechanism in translating a record tape to selectively set up combinations of said circuits to cause selective operation of the tape perforating means simultaneously with the operation of the translating mechanism to form sets of code perforations in the tape in the perforating means duplicating the sets of code perforations in the tape being translated by said translating means, a motor for driving said translating means, a high speed operating circuit to said motor, a low speed operating circuit to said motor, a switch controlling said high speed and low speed motor circuits for selectively closing either of said circuits for operation of the motor, contacts in said electrical circuits for controlling the electro-mechanical mechanism of said tape perforating means, and said contacts being operatively associated with said switch for actuation thereby to close when said switch is actuated to open the low speed motor circuit and to open when said switch is actuated to close the high speed motor circuit.

4. In combination, electro-mechanical means for selectively operating the type bar actuating and function actuating levers, respectively, of a typewriter, electrical circuits for controlling the selective operating of said means, a series of relays for setting up and controlling said electrical circuits to selectively operate said means to operate a selected typewriter lever, translating mechanism for translating a record tape having a message encoded as successive sets of code arranged perforations therein, said translating mechanism controlling said series of relays to successively energize permutations of said relays, respectively, in accordance with the sets of code perforations being successively translated by said translating mechanism to cause said relays to set up said circuits for selectively operating said electro-mechanical means to successively operate the typewriter levers respectively corresponding to the code designations represented by the sets of perforations being successively translated, a switch cyclically operated from said translating mechanism to maintain said electrical circuits to said relays ineffective to energize said relays for an interval of time after the setting up of the relay energizing circuits and to then render said circuits effective, record tape perforating means including electro-mechanical mechanism for encoding a message in a record tape in the form of successive sets of code arranged perforations corresponding to the printing characters and typewriter functions, respectively, composing the message being encoded, electrical circuits for controlling the electro-mechanical mechanism for operating said tape perforating means, said latter electrical circuits being controlled by operation of the translating mechanism when translating a record tape to cause selective operation of the tape perforating means to form sets of code perforations in a tape duplicating the sets of perforations, respectively, in a tape being translated by said translating means, and a switch cyclically operated from said translating mechanism for maintaining the controlling circuits to said typewriter lever operating means and to the electro-mechanical operating mechanism for tape perforating means, ineffective for an interval of time subsequent to the conditioning of said circuits for operation and for then rendering said conditioned circuits effective for operation.

5. In combination, electro-mechanical means for selectively operating the type bar actuating and function actuating levers, respectively, of a typewriter; electrical circuits for controlling the selective operation of said means; a series of relays for setting up and controlling said electrical circuits to selectively operate said means to operate a selected typewriter lever; translating mechanism for translating a record tape having a message encoded as successive sets of code arranged perforations therein; said translating mechanism controlling said series of relays to successively energize permutations of said relays, respectively, in accordance with the sets of code perforations being successively translated by said translating mechannism to cause said relays to set up said circuits for selectively operating said electro-mechanical means to successively operate said electro-mechanical means to cause the same to successively operate the levers of a typewriter, respectively, corresponding to the code designations represented by the sets of perforations being successively translated; a switch cyclically operated in synchronization with the operation of said translating mechanism to maintain said electrical circuits to said relays ineffective to energize said relays for an interval of time after the setting up of the relay energizing circuits and to then render said circuits effective; record tape perforating means including electro-mechanical mechanism for encoding a message in a record tape in the form of successive sets of code arranged perforations corresponding to the printing characters and typewriter functions respectively composing the message being encoded, electrical circuits for controlling the electro-mechanical mechanism for operating said tape perforating means; and said latter electrical circuits being controlled by operation of the translating mechanism when translating a record tape to cause selective operation of the tape perforating means, simultaneously with the operation of the translating mechanism, to form sets of code perforations in a tape duplicating the sets of perforations, respectively, in a tape being translated by said translating means.

6. In combination, a key board comprising a set of manually operable keys, including keys corresponding to the type actuating levers and function actuating levers, respectively, of a typing unit; mechanism operable to selectively operate the type actuating and function actuating levers of a typing unit; electrical circuits for controlling the selective operation of said actuating lever operating mechanism; a series of relays for setting up and controlling said electrical circuits to selectively operate said mechanism to cause the same to operate a selected actuating lever of a typing unit; translating mechanism for translating a record tape having a message encoded as successive sets of code arranged perforations therein; said translating mechanism associated with, and during translating operation thereof controlling, said series of relays to successively energize permutations thereof in accordance with the sets of code perforations being successively translated by said translating mechanism to cause said relays to set up circuits for selectively operating said mechanism for operating the actuating levers of a typing unit; said manually operable keys of said key board being associated with and controlling said series of relays to selectively energize permutations thereof, respectively corresponding to the manual operation of said keys; and means actuated by the operation of the translating mechanism to render the manually operable keys of said key board ineffective to control said relays during operation of the translating mechanism and the control of said relays by the latter mechanism.

7. In combination, a keyboard comprising a set of manually operable keys, including keys corresponding to the type actuating levers and function actuating levers, respectively, of a typing unit; mechanism operable to selectively operate the type actuating and function actuating levers of a typing unit; electrical circuits for controlling the selective operation of said actuating lever operating mechanism; a series of relays adapted to be energized in various permutations thereof for setting up and controlling said electrical circuits to selectively operate said mechanism to cause the same to operate selected actuating levers, respectively, of a typing unit; electrical circuits to said relays for controlling the energization and de-energization thereof; said manually operable keys of said keyboard being associated with and controlling said electrical circuits to said relays to set up said circuits to energize permutations of said relays in accordance with the manual operation of said keys; translating mechanism for translating a record tape having a message encoded as successive sets of code arranged perforations therein; electrical circuits from said translating mechanism to said relay circuits for controlling the latter circuits to selectively energize permutations of said relays in accordance with the sets of code perforations being successively translated by said translating mechanism to cause said relays to set up circuits for selectively operating said mechanism for operating the actuating levers of a typing unit; and means actuated by the operation of the translating mechanism to render the relay circuits controlled by said keys of said keyboard ineffective to control said relays by manual operations of said keys during operation of the translating mechanism; said latter means being actuated by the stopping of operation of said translating mechanism to restore said key controlled circuits to the relays effective for control by manual operation of said keys.

8. In combination, a keyboard comprising a set of manually operable keys, including keys corresponding to the type actuating levers and the function actuating levers, respectively, of a typing unit; mechanism operable to selectively operate the type actuating and function actuating levers, respectively, of a typing unit; a record tape perforating mechanism operable to encode a message as successive sets of code perforations in a tape corresponding to the code designations, respectively, for the typing characters and typing unit functions of which the message is composed; means selectively controlled by the manual operation of the keys of said keyboard for causing selective operation of said typing unit actuating lever operating mechanism in accordance with the manual operation of the keys, respectively, of said keyboard, and for effecting simultaneous selective operation of said record tape perforating mechanism to cause such mechanism to punch code arranged perforations in a record tape corresponding to the code for the manually operated keys, respectively, of the keyboard; a perforated record tape translating mechanism for translating a record tape having a message encoded as successive sets of code arranged perforations therein, said translating mechanism being operatively associated with said mechanism for selectively operating the typing unit actuating levers to cause said lever operating mechanism to select out and actuate the levers of a typing unit corresponding to the successive sets, respectively, of code perforations being translated by said translating mechanism; means selectively controlled by the operation of said translating mechanism to actuate said typing unit lever operating mechanism to cause simultaneous operation of the perforating mechanism to form sets of code perforations in a tape in the perforating means duplicating the sets of code perforations in the tape being translated by said translating mechanism, and means controlled and actuated by the operation of the said translating mechanism for rendering the keys of said keyboard inoperative to effect operation of said perforating mechanism.

9. In combination, a keyboard comprising a set of manually operable keys, including keys corresponding to the type actuating and to the function actuating levers, respectively, of a printing unit; mechanism for selectively operating the type actuating and function actuating levers, respectively, of a typing unit; a tape perforating mechanism for encoding a message as a series of code arranged perforations in a record tape; means selectively controlled by and in accordance with the manual operation of the keys, respectively, of said keyboard for causing simultaneous operation of said typing unit lever actuating mechanism and of said perforating mechanism; a perforated record tape translating mechanism operatively associated with the means controlled by the manual operation of the keys of said keyboard for operating said typing unit lever actuating mechanism in accordance with the code arranged perforations in a record tape being translated in said translating mechanism; means for selectively rendering said tape perforating mechanism inoperative during operation of said typing unit lever operating mechanism by either manual operation of the keys of said keyboard or by translating operations of said translating mechanism; and means selectively operable to render the keys of said keyboard ineffective during operation of said translating mechanism.

10. In combination, a keyboard comprising a set of manually operable keys, including keys corresponding to the type actuating levers and to the function actuating levers, respectively, of a typing unit; mechanism adapted to selectively operate the type and function operating levers, respectively, of a typing unit; perforated record tape translating mechanism for translating a perforated record tape having a message encoded as successive sets of code arranged perforations therein; means selectively controlled either by and in accordance with the manual operation of the keys, respectively, of said keyboard or by said translating mechanism in accordance with the sets, respectively, of code perforations in a perforated tape being translated, for causing operation of said mechanism for operating the type and function actuating levers of a typing unit; and means automatically controlled by operation of said translating mechanism for rendering the keys of said keyboard ineffective to cause operation of said actuating lever operating mechanism during operation of said translating mechanism.

11. In combination, a keyboard comprising a set of manually operable keys, including keys corresponding to the type and function actuating levers, respectively, of a typing unit; mechanism operable to selectively operate the type and function actuating levers, respectively, of a typing unit; a tape perforating mechanism for encoding a message as successive sets of code arranged perforations in a record tape; translating mechanism for translating a perforated record tape having a message encoded as successive sets of code arranged perforations therein; means selectively controlled either by and in accordance with manual operation of the keys, respectively, of said keyboard, or by said translating mechanism in accordance with the sets, respectively, of code perforations in a perforated tape being translated, for causing operation of said mechanism for selectively operating the type and function actuating levers of a typing unit; manually controlled means for rendering said perforating mechanism inoperative during either manual operation of keys of said keyboard or during operation of said translating mechanism; and means automatically actuated by operation of said translating mechanism for rendering the keys of said keyboard ineffective during operation of the translating mechanism.

12. In mechanism for translating a perforated record tape formed with opposite longitudinal edge rows of sprocket holes thereon and having a message encoded as successive sets of code arranged perforations therein disposed transversely thereacross between said rows of sprocket holes; a perforated tape translating feed roller providing opposite end sprockets therearound and having an electrical conducting surface therearound between said sprockets, said feed roller adapted to mount a perforated record tape over and across one side thereof with said sprockets engaged in the rows of sprocket holes, respectively, of a record tape; a series of electrical brush contacts disposed across that side of said roller on which a record tape is to be mounted and adapted to engage a record tape mounted on said roller and to be maintained out of contact with said conducting surface by the unperforated portions of the record tape and to permutably engage the conducting surface of said roller through and in accordance with the permutation of perforations constituting that set of code perforations in a record tape aligned with said brush contacts; means for intermittently rotating said roller in one direction through partial revolutions to move a record tape thereon step by step across said contacts to successively position the successive sets of code perforations, respectively, in a record tape into alignment with said brush contacts; said translating feed roller being provided with an index line on said conducting surface between and located relative to said opposite end sprockets for locating a record tape in starting position on said roller; and means for manually rotating said translating feed roller independently of said means for intermittently rotating said feed roller in the direction of feed rotation.

13. In mechanism for translating a perforated record tape having a message encoded as successive sets of code perforations therein; a translating feed roller for receiving and mounting a record tape thereon, said roller being mounted for rotation for feeding a tape step by step by intermittent partial revolutions of said roller; said translating roller providing an electrical conducting surface therearound; a series of electrical brush contacts positioned across that side of said roller on which a record tape is to be mounted, said brush contacts adapted to engage a record tape and to be maintained out of contact with the conducting surface of the roller by unperforated portions of a record tape and being permutably engaged with the conducting surface of said roller through and in accordance with the permutation of perforations constituting that set of code arranged perforations in a record tape aligned with said brush contacts; a driving shaft adapted to be continuously driven; and an intermittent driving mechanism operatively coupling said continuously driven shaft with said translating feed roller for effecting intermittent partial revolutions of said roller in one direction, said intermittent driving mechanism embodying a cam on said continuously driven shaft, a lever reciprocated by said cam and carrying an actuating pawl, and a ratchet wheel operatively connected with said feed roller and being engaged by said pawl to impart a partial revolution to said feed roller on each feeding stroke of said lever.

14. In mechanism for translating a perforated record tape having a message encoded as successive sets of code arranged perforations therein; a translating feed roller for receiving and mounting a perforated record tape on and over one side thereof, said roller being mounted for rotation for feeding a record tape thereon step by step by intermittent, partial revolutions of said roller; said translating roller providing an electrical conducting surface therearound; a series of electrical brush contacts mounted in position disposed across that side of said roller on which a record tape is to be mounted, said brush contacts adapted to engage a record tape and to be maintained out of contact with the conducting surface of the roller by unperforated portions of a record tape and to be permutably engaged with the conducting surface of said roller through and in accordance with that permutation of perforations constituting the set of code perforations in a record tape aligned with said contacts; a cam shaft adapted to be continuously driven; an intermittent driving mechanism operatively coupling said cam shaft with said translating feed roller for effecting intermittent partial revolutions of said roller in one direction to feed a perforated record tape mounted thereon step by step to successively align said brush contacts with the successive sets of code perforations in the record tape; a switch for opening and closing the electrical circuits through said brush contacts; a cam on said cam shaft for actuating said switch to maintain said circuits open during the entire feeding rotation of said translating roller and to close said circuits subsequent to the completion of the alignment of said brushes with a set of code perforations in a record tape and the engagement thereof with the conducting surface of said roller.

15. In mechanism for translating a perforated record tape having a message encoded as successive sets of code arranged perforations therein: a translating feed roller for receiving and mounting a perforated record tape on and over one side thereof, said roller being mounted for rotation for feeding a record tape thereon step by step by intermittent, partial revolutions of said roller; said translating roller providing an electrical conducting surface therearound; a series of electrical brush contacts mounted in position disposed across that side of said roller on which a record tape is to be mounted, said brush contacts adapted to engage a record tape and to be maintained out of contact with the conducting surface of the roller by unperforated portions of a record tape and to be permutably engaged with the conducting surface of said roller through and in accordance with that permutation of perforations constituting the set of code perforations in a record tape aligned with said contacts; a cam shaft adapted to be continuously driven; an intermittent driving mechanism operatively coupling said cam shaft with said translating feed roller for effecting intermittent partial revolutions of said roller in one direction to feed a perforated record tape mounted thereon step by step to successively align said brush contacts with the successive sets of code perforations in the record tape; a switch for opening and closing the electrical circuits through said brush contacts; a cam on said cam shaft for actuating said switch to maintain said circuits open during the entire feed rotation of said translating roller and to close said circuits subsequent to the completion of the alignment of said brushes with a set of code perforations in a record tape and the engagement thereof with the conducting surface of said roller; a second switch including circuit opening and closing contacts; a second cam on said cam shaft for actuating said second switch, and said second cam being synchronized with said first mentioned cam to close the contacts of said second switch subsequent to the closing of the contacts of said first mentioned switch and to open the contacts of said second switch in advance of the opening of said first mentioned switch.

16. In mechanism for translating a perforated record tape having a message encoded as successive sets of code perforations therein; a tape translating and feeding roller for mounting and feeding a perforated tape step by step, said roller providing an electrical conducting surface thereon and therearound; a series of electrical brush contacts positioned disposed across one side of said roller, said brush contacts being adapted to engage and being maintained out of contact with the conducting surface of the roller by unperforated portions of the record tape and being adapted to permutably engage the conducting surface of said roller through and in accordance with the permutations of perforations constituting that set of code arranged perforations in a record tape which is aligned with said brush contacts; an electrical contact continuously in engagement with the conducting surface of said roller for completing circuits therethrough from brush contacts of said series of contacts in engagement with the conducting surface through tape perforations, respectively; an electrical circuit line connected with the said contact which is in continuous engagement with the conducting surface of said roller; a switch in said circuit line for opening and closing the line; means for intermittently rotating said roller through partial revolutions to move a record tape step by step across said series of brush contacts to successively position the sets of code perforations, respectively, in a record tape into alignment with said brush contacts; and means cyclically operated by said roller rotating means for maintaining said switch open during the entire partial revolution constituting each feeding step of said feed roller and for an interval of time after said roller has fed a record tape to position with a set of perforations therein aligned with said brush contacts and for then closing said switch.

17. In mechanism for feeding and translating an endless record tape having a message encoded as sets of code perforations therein, in combination, a translating feed roller for receiving and mounting a bight of an endless record tape thereon; and an endless record tape holder spaced from said translating feed roller, said holder including a rod member for receiving and freely rotatably mounting a roll of an endless tape, said rod member being positioned with its longitudinal axis inclined toward and radially outwardly from the axis of rotation of said translating feed roller.

18. In mechanism for feeding and translating an endless record tape having a message encoded as sets of code perforations therein, in combination, a translating feed roller for receiving and mounting a bight formed in said endless tape, said roller being mounted for rotation about a horizontally disposed axis; and an endless record tape holder spaced from said translating feed roller and including a fulcrum rod member for receiving a roll of the endless tape, said rod member being inclined horizontally toward and vertically upwardly from and relative to the axis of rotation of said translating feed roller.

19. In mechanism for feeding and translating an endless record tape having a message encoded as code arranged perforations therein, in combination, a translating feed roller for receiving and mounting a bight of an endless record tape thereon and thereover and an endless record tape holder spaced from said translating feed roller, said holder embodying a supporting base member for receiving and supporting one side of a roll of an endless tape, and a fulcrum rod member extending from said base member for rotatably receiving thereon the roll of an endless tape, and said rod member being inclined from said base member outwardly toward and radially from and relative to the axis of rotation of said translating feed roller.

20. In mechanism for feeding and translating an endless record tape having a message encoded as sets of code perforations therein, in combination, a translating feed roller for receiving and mounting a bight formed in said endless tape, said roller being mounted for rotation about a horizontally disposed axis; and an endless record tape holder spaced from said translating feed roller and including a fulcrum rod member for receiving a roll of the endless tape, said rod being inclined horizontally relative to the axis of said roller at an angle in the range of angles of approximately the order of 5° to 10°, and being inclined vertically upwardly relative to the axis of said roller in the range of angles of approximately the order of 10° to 20°.

21. In mechanism for feeding and translating an endless record tape having a message encoded as code arranged perforations therein; in combination, a translating feed roller for receiving and mounting a bight formed in an endless record tape, and an endless record tape holder spaced from said translating feed roller and including a fulcrum rod member for receiving a roll formed in an endless record tape, said rod being inclined toward said roller at an angle relative to the axis of said roller within the range of angles of approximately the order of 5° to 10°, and being inclined in one direction radially from the axis of rotation of said roller at an angle within the range of angles of approximately the order of 10° to 20°.

22. In combination, mechanism for feeding and translating an endless record tape having a message encoded as code arranged perforations therein; said mechanism including a translating feed roller; an endless record tape holder spaced from said translating feed roller and including a fulcrum rod; an endless record tape providing a roll formed of convolutions of said tape rotatably mounted on said fulcrum rod as an axis, said endless record tape extending to and over that side of the feed roller opposite said holder with the tape forming a bight on the roller and with one ply of the tape extending from said bight back to and forming the outer convolution of said roll on the holder and with the opposite ply of said tape extending from the inner convolution of said roll on said fulcrum rod to the bight mounted on said feed roller.

23. In combination, mechanism for feeding and translating an endless record tape; said mechanism including a feed roller; an endless record tape holder spaced from said feed roller; and an endless record tape providing a roll formed of convolutions of said tape freely rotatably mounted on said holder, said endless record tape being extended to and over that side of the feed roller opposite said holder with the tape forming a bight on and around the roller and with one ply of the tape extending from said bight back to and forming the outer convolutions of said roller of tape on the holder and with the opposite ply of said tape extending from the inner coil of said roll to the bight mounted on said feed roller.

24. In combination, mechanism for feeding and translating an endless record tape having a message encoded as code arranged perforations therein; said mechanism including a translating feed roller; an endless record tape holder spaced from said translating feed roller; an endless record tape wound into a roll formed of convolutions of said tape, said roll freely rotatably mounted on said holder, said endless record tape being extended to and over that side of the feed roller opposite said holder with the tape forming a bight on and around the roller with the ply of the tape extending from one side of the bight on the roller back to and forming the outer convolution of said roll of tape on the holder, and with the ply of tape from the opposite side of the bight on said roller which extends from the inner coil of said roll being displaced axially of the roll for a distance at least equal to the width of the ply of tape extending from the inner coil of said roll; and means for rotating said feed roller in a direction to feed the tape from the inner coil of said roll over and around the feed roller and back to the outer convolution of said tape roll.

25. In combination, mechanism for feeding an endless record tape, said mechanism including a rotatably mounted tape feed roller; an endless record tape holder spaced from said feed roller, said holder embodying a fulcrum rod member disposed across the projected paths of tape feed to and from said roller; and an endless record tape providing a roll formed of convolutions of said tape rotatably mounted on said fulcrum rod member as an axis, said endless record tape extending from the inner convolution of said roll on the fulcrum rod to and around the feed roller to form a bight thereon, and the opposite ply of said tape being extended from the bight thereof on the feed roller back to and forming the outer convolution of said roll of tape on the fulcrum rod member, the inner convolution of said roll of tape on the holder being axially displaced outwardly from the roll of tape for a distance at least substantially equal to the width of the ply of tape extending therefrom to the feed roller.

26. In combination, in mechanism for punching code arranged perforations in a record tape; a series of tape perforating punches mounted disposed across the path of tape movement; a set of solenoids for selective energization to selectively actuate said punches, respectively, to force the selected punches to traverse the path of tape movement on the tape punching strokes thereof; mechanism for intermittently feeding tape step by step across said tape perforating punches, said mechanism including a tape feed roller, an operating means for intermittently rotating said roller through partial revolutions to feed a tape thereon step by step; a magnet for energization and de-energization to control the operation of said tape feed roller rotating means to cause step by step rotation thereof; an electrical circuit to said magnet; a switch in said electrical circuit for opening and closing said circuit; a cam operated by rotation of said feed roller for controlling said switch to maintain the switch closed through one complete revolution of said feed roller and to cause said switch to operate to open said circuit upon the completion of one revolution of said feed roller; and a manually operable switch lever for operating said switch, to close said magnet circuit after the opening thereof by the action of said cam.

27. In combination, in mechanism for punching code arranged perforations in a record tape, a series of tape perforating punches mounted disposed across the path of tape movement; a set of solenoids for selective energization to selectively actuate said punches, respectively, to force the selected punches to traverse the path of tape movement on the tape punching strokes thereof; electrical circuits for effecting the selective energization and de-enerization of said set of punch actuating solenoids; mechanism for intermittently feeding a tape step by step across said punches, said mechanism including a tape feed roller, operating means for intermittently rotating said roller through partial revolutions to feed a tape thereon step by step across said punches, a magnet for energization and de-energization to effect the step by step operation of said tape feed roller rotating means; an electrical circuit for controlling said magnet; a switch in said electrical circuit for closing and opening said circuit to energize and de-energize said magnet; a cam operated by rotation of said feed roller for controlling said switch to maintain the switch closed throughout each complete revolution of said feed roller and to cause said switch to operate to open said circuit upon the completion of each revolution of said feed roller; a manually operable switch lever for said switch to close said magnet circuit after the same has been opened by said switch under the control of said cam; and said switch lever being also manually operable to position releasably locking said switch in position maintaining said magnet circuit closed and rendering said cam ineffective to operate said switch upon rotation of said cam by said feed roller.

28. In combination, in mechanism for punching code arranged perforations in a record tape, a series of tape perforating punches mounted disposed across the path of tape movement; a set of solenoids for selective energization to selectively actuate said punches, respectively, to force the selected punches to traverse the path of tape movement on the punching strokes thereof; electrical circuits for selectively energizing and de-energizing solenoids of said set of solenoids; mechanism for intermittently feeding a tape step by step across said tape perforating punches, said mechanism including a tape feed roller having a tape engaging toothed sprocket therearound, operating means for intermittently rotating said sprocketed feed roller through partial revolutions to feed a tape thereon step by step across said punches, a magnet for energization and de-energization to control the operation of said roller rotating means to feed the tape step by step; an electrical circuit for energizing and de-energizing said magnet; a switch in said electrical circuit for operation to open or close said circuit; a cam operated by rotation of said feed roller for causing operation of said switch to open or close said magnet circuit, said cam being provided with a cam surface thereon for engaging said switch to maintain the switch in position closing the circuit throughout one complete revolution of said roller, said cam surface being formed with a portion located thereon relative to the teeth of said sprocket for engagement by the switch to cause the latter to operate to open said circuit upon the completion of one revolution of said feed roller to stop operation of said tape feeding mechanism; and means for operating the switch to close said magnet circuit when said cam is in position with the switch in circuit opening position.

29. In combination, in mechanism for punching code arranged perforations in a record tape; a series of tape perforating punches mounted disposed across the path of tape movement; a set of solenoids for selective energization to selectively actuate said punches, respectively, to force the selected punches to traverse the path of tape movement on punch strokes thereof; electrical circuits for selectively energizing and de-energizing said solenoids; mechanism for intermittently feeding a tape step by step across said tape perforating punches, said mechanism including a tape feed roller, operating means for intermittently rotating said roller through partial revolutions to feed a tape on said roller step by step across said punches, a magnet for intermittent energization and de-energization to control the operation of said feed roller rotating means to cause the roller to feed a tape step by step; an electrical circuit for energizing or de-energizing said magnet; a switch in said electrical circuit for opening and closing the said circuit; a cam operated by rotaton of said feed roller for controlling the operation of said switch to cause the switch to maintain said magnet circuit closed through one complete revolution of said feed roller and to cause said switch to operate to open said magnet circuit upon the completion of one revolution of said feed roller; a manually operable switch lever for operating said switch to close said magnet circuit following the opening thereof under the control of said cam; said magnet circuit being controlled by said solenoid circuits to cause simultaneous energization and de-energization of said magnet and said solenoids; and a second switch for controlling said magnet circuit independently of the control thereof by said solenoid circuits to cause energization and de-energization of said magnet to operate said roller rotating means to feed a tape step by step wnen said first mentioned cam controlled switch is closed either by the operation of said cam or by the operation of the manually operable switch for said lever.

30. In combination, in mechanism for punching code arranged perforations in a record tape, a series of tape perforating punches mounted disposed across the path of tape movement; a set of solenoids for selective energization to selectively actuate said punches, respectively, to force the selected punches to traverse the path of tape movement on the punching strokes thereof; mechanism for intermittently feeding a tape step by step across said tape perforating punches, said mechanism including a tape feed roller, operating means for intermittently rotating said roller through partial revolutions to feed a tape thereon step by step across said punches; a magnet for intermittent energization and de-energization to cause the operation of said feed roller rotating means to intermittently rotate the roller to feed a tape step by step; electrical circuits to said punch actuating solenoids and said magnet for selectively energizing or de-energizing said solenoids and for simultaneously energizing or de-energizing said magnet; a switch controlling said circuits to render the same effective or ineffective to energize any of said solenoids and said magnet; a cam operated by rotation of said feed roller for controlling the operation of said switch to cause the switch to maintain said solenoid and magnet circuits effective to energization of said solenoids and said magnet during one complete revolution of said feed roller and to cause said switch to operate to render said circuits ineffective upon the completion of one revolution of said feed roller; a manually operable switch lever for operating said switch to render said circuits effective independently of said cam when the latter is in position to cause the switch to render the circuits ineffective; and a manually operable switch adapted for intermittent operation to render the circuit to said magnet effective for energizing said magnet independently of and without causing energization of said solenoids, when said cam controlled switch is in position rendering said circuit effective.

31. In combination, in mechanism for punching code arranged perforations in a record tape, a series of tape perforating punches; a set of solenoids for selective energization to selectively actuate said punches, respectively, on the tape perforating strokes thereof; mechanism for intermittently feeding a tape step by step across said tape perforating punches, said mechanism including a tape feed roller, operating means for intermittently rotating said roller through partial revolutions to feed a tape thereon step by step across said punches; a magnet for intermittent energization and de-energization to cause the operation of said feed roller rotating means to intermittently rotate the roller to feed a tape step by step; electrical circuits for said punch actuating solenoids and for said magnet for selectively energizing or de-energizing said solenoids and for simultaneously energizing or de-energizing said magnet; a switch controlling said circuits to render the same effective or ineffective to energize any of said solenoids and simultaneously energize said magnet; means operated by rotation of said feed roller for controlling the operation of said switch to cause the switch to maintain said solenoid and said magnet circuits effective to energize said solenoids and said magnet during a period of intermittent rotation of said roller through step by step tape feeding partial revolutions thereof, and to cause said switch to operate to render said circuits ineffective upon the completion of the period of such rotation of said feed roller; and a manually operable switch lever for operating said switch to render said circuits effective and supersede the control of said feed roller operated means.

32. In combination, in mechanism for punching code arranged perforations in a record tape, a series of tape perforating punches; a set of solenoids for selective energization to selectively actuate said punches, respectively, on tape perforating strokes thereof; mechanism for intermittently feeding a tape step by step across said tape perforating punches; a magnet for intermittent energization and de-energization to cause the operation of said tape feeding mechanism to feed a tape step by step; electrical circuits to said punch actuating solenoids and to said magnet for selectively energizing or de-energizing said solenoids and for simultaneously energizing or de-energizing said magnet; a switch controlling said circuits to render the same effective or ineffective to energize any of said solenoids and said magnet; means actuated by operation of said tape feeding mechanism for controlling the operation of said switch to cause the switch to maintain said solenoid and magnet circuits effective to energize said solenoids and said magnet during a pre-determined period of operation of said mechanism and to cause said switch to automatically operate to render said circuits ineffective upon the completion of the pre-determined period of operation of said tape feeding mechanism; and a manually controlled means for operating said switch to render said circuits effective independently of said means controlled by the operation of said tape feeding mechanism when said switch has been operated to position rendering the circuits ineffective upon the completion of the pre-determined period of operation of said tape feeding mechanism.

33. In combination, in mechanism for punching code arranged perforations in a record tape, a series of tape perforating punches mounted disposed across the path of tape movement; a set of solenoids for selective energization to selectively actuate said punches, respectively, to operate said punches on the perforating strokes thereof; mechanism for intermittently feeding a tape step by step across said perforating punches; a magnet for intermittent energization and de-energization to cause the operation of said tape feeding mechanism to intermittently feed a tape step by step; electrical circuits to said punch actuating solenoids and to said magnet for selectively energizing or de-energizing said solenoids and for simultaneously energizing or de-energizing said magnet; a switch controlling said circuits to render the same effective or ineffective to energize any of said solenoids and said magnet; means actuated by said tape feeding mechanism to maintain said solenoid and said magnet circuits effective to energize any of said solenoids and said magnet during a predetermined period of operation and upon the completion of such period of operation to render said circuits ineffective; manually controlled means for operating said switch to render said circuits effective and to supersede the control of said switch by the means operated by said tape feed mechanism; and a second switch in said circuits for rendering the circuit to said magnet effective for energization and de-energization thereof to cause operation of said tape feeding mechanism to intermittently feed a tape step by step independently of and without causing energization of any of said punch actuating solenoids.

34. In combination, a supporting structure, a typewriter mounted on said supporting structure, said supporting structure providing a kneehole space therein below the typewriter, said typewriter including type bar actuating and typewriter function actuating levers; mechanism for selectively operating the type and function actuating levers of the typewriter, said mechanism including a set of solenoids mounted in position on said supporting structure remote from and spaced below the typewriter at the rear of and unobstructing the kneehole space in said structure, each of said solenoids including an armature controlled thereby; flexible linkages connecting the armatures of said solenoids with the actuating levers, respectively, of said typewriter; said flexible linkages being extended upwardly from said solenoids vertically across the rear side of said kneehole space and being extended forwardly across the upper side of said kneehole space to said typewriter actuating levers, respectively, and means for selectively energizing any one of said solenoids to actuate the armature thereof to cause the linkage connected therewith to operate that actuating lever of the typewriter with which said linkage is connected.

35. In combination, a typewriter including type bar actuating and typewriter function actuating levers; mechanism remote from said typewriter for selectively operating the typing and function actuating levers, respectively, of the typewriter; said mechanism being mounted spaced below the rear portion of said typewriter and embodying a set of solenoids providing a solenoid for each typewriting actuating lever; each of said solenoids including an armature controlled by the energization and the de-energization of the solenoid; a flexible linkage from the armature of each solenoid to the respective lever to be actuated by such solenoid; said flexible linkages being extended upwardly from said set of solenoids toward and forwardly beneath the typewriter to positions for connection with the actuating levers respectively of the typewriter; and means for selectively controlling any one of said solenoids to cause operation of that typewriter actuating lever with which such armature is connected.

36. In combination, a supporting structure; a typewriter mounted on said supporting structure, said supporting structure providing a kneehole space therein below the typewriter, said typewriter including type bar actuating and typewriter function actuating levers; mechanism remote from said typewriter for selectively operating said type bar and function actuating levers of the typewriter; said mechanism including a set of solenoids mounted in position on said supporting structure spaced below and remote from the typewriter at the rear of and unobstructing said kneehole space in said structure; each of said solenoids including an armature controlled thereby; sets of anti-friction guide members mounted across the rear portion of the kneehole space in said structure in position spaced above said set of solenoids; a set of anti-friction guide members mounted at the uper side of said kneehole space in position spaced beneath and extending across said actuating levers of the typewriter; flexible linkages connected with the armatures of said solenoids, respectively, and being extended vertically upwardly therefrom to and forwardly across the guide members, respectively, of said sets of guide members, and being extended forwardly from said sets of guide members to and upwardly around the guide members, respectively, of said set of members beneath the typewriter actuating levers, each of said flexible linkages being extended upwardly from said latter guide members to and connected with that typewriter actuating lever to be operated thereby; and means for selectively energizing any one of said solenoids to actuate the armature thereof for causing operation of that actuating lever of the typewriter with which such armature is respectively connected.

37. In combination a supporting structure providing a kneehole space therein; a typewriter mounted on said supporting structure above said kneehole space, said typewriter including type bar actuating and typewriter function actuating levers horizontally disposed in parallel relation above the forward portion of said kneehole space; mechanism remote from said typewriter for selectively operating said type bar and function actuating levers, respectively, of the typewriter; said mechanism including a set of solenoids mounted in position on said supporting structure spaced below and remote from the typewriter at the rear of and unobstructing said kneehole space; said solenoids being grouped and relatively arranged to correspond, respectively, to the grouping and relative arrangement of said typewriter actuating levers thereabove; each of said solenoids including an armature controlled thereby; spaced sets of anti-friction guide members mounted across the rear portion of the kneehole space in said structure in position spaced above said set of solenoids; a set of anti-friction guide members mounted disposed across the upper side of said kneehole space at the forward portion thereof in position spaced beneath and extending across said horizontally disposed actuating levers, of the typewriter, the anti-friction guide members of said latter set of guide members being substantially aligned vertically with the typewriter actuating levers, respectively, thereabove; and flexible linkages connected with the armatures of said solenoids, respectively, and being extended upwardly therefrom to and forwardly across the guide members, respectively, of said spaced sets of guide members, and being extended forwardly from said sets of guide members to the underside of and upwardly around the forward side of the guide members, respectively, of said set of members at the forward upper side of the kneehole space of said supporting structure, and said linkages being extended upwardly from said latter guide members to the respective typewriter actuating levers positioned thereabove to be operated by said linkages.

38. In combination, electrically controlled mechanism adapted to be operatively connected with actuating levers of a typing unit for selectively operating any one of such levers; electrically controlled perforating mechanism for selectively punching code perforations in a record; electrical circuits for selectively controlling said actuating lever operating mechanism to cause said mechanism to actuate a selected lever; electrical circuits for selectively controlling said perforating mechanism to cause said mechanism to punch selected perforations in a record; coding mechanism common to both said lever operating mechanism controlling circuits and said perforating mechanism controlling circuits, said coding mechanism being arranged for selective operation to cause simultaneous conditioning of a selected circuit or circuits of the controlling circuits for said lever operating mechanism and a selected circuit or circuits of the controlling circuits for said perforating mechanism; a keyboard comprising a set of manually operable keys including keys corresponding to said actuating levers, respectively, each key of said keyboard being mounted and arranged for engaging when operated, said coding mechanism for selectively operating the latter; and a switch unit connected in said controlling circuits and being selectively operable to position closing said perforating mechanism circuits for operation of said mechanism simultaneously with operation of said lever operating mechanism or to position opening said perforating mechanism circuits to render said perforating mechanism inoperative during operation of said lever operating mechanism.

39. In combination, electrically controlled mechanism adapted to be operatively connected with actuating levers of a typing unit for selectively operating any one of such levers; electrical circuits for selectively controlling said lever operating mechanism to cause said mechanism to actuate a selected lever; a series of electrical relays arranged for operation in permutations for selectively conditioning a selected circuit of said lever operating mechanism controlling circuits; a keyboard comprising a set of keys including keys corresponding to said actuating levers, respectively, of a typing unit for selective actuation to operate selected permutations, respectively, of said relays; electrically operated translating mechanism for translating a perforated record having a message encoded as sets of code arranged perforations therein; electrical circuits connected for selective control by said translating mechanism in accordance with the sets of code arranged perforations, respectively, in a record being translated by said mechanism; and said translating mechanism controlled circuits being connected for operating selected permutations of the relays in accordance with the sets of code arranged perforations, respectively, being translated by said latter mechanism.

40. In combination, electrically controlled mechanism adapted to be operatively connected with actuating levers of a typing unit for selectively operating any one of such levers; electrical circuits connected for selectively controlling said lever operating mechanism to cause said mechanism to actuate a selected lever; a series of electrical relays arranged for operation in permutations for selectively conditioning a selected circuit of said lever operating mechanism controlling circuits; a keyboard comprising a set of keys including keys corresponding to said actuating levers, respectively, of a typing unit for selective actuation to operate selected permutations, respectively, of said relays; electrically controlled perforating mechanism connected for selective operation to punch code perforation combinations in a record; electrical circuits for selectively controlling said perforating mechanism and being connected for selective conditioning by the permutations, respectively, of said relays selectively operated by the keys of said keyboard; electrically operated translating mechanism for translating a perforated record having a message encoded as code perforation combinations therein; electrical circuits connected for selective control by said translating mechanism in accordance with the code perforation combinations, respectively, in a record being translated by said mechanism; and said translating mechanism controlled circuits being connected with said relays for operating selected permutations thereof in accordance with the code perforation combinations, respectively, being translated by said translating mechanism.

41. In a mechanism for translating a perforated record tape formed with sprocket holes and having a message encoded as successive sets of code arranged perforations therein disposed transversely thereacross; a perforated tape translating feed roller provided with sprocket teeth and having an electrical conducting surface therearound, said feed roller being adapted to mount a perforated record tape thereon over one side thereof with the tape sprocket holes engaged with said roller sprocket teeth; a series of electrical contacts mounted in position disposed across that side of said roller on which a record tape is to be mounted and being adapted to engage the electrical conducting surface of said roller through perforations in a record tape mounted on said roller; means for intermittently rotating said roller in one direction through partial revolutions to move a record tape thereon step by step across said brush contacts to successively position the sets of code perforations in a record tape into alinement with said brush contacts; and means for manually rotating said translating feed roller independently of said intermittent feed rotating means.

42. In combination, a typewriter having type bar and function actuating levers, said function actuating levers including a lever for actuating the shift lock and shift release functions of the typewriter; mechanism for selectively operating the type and function actuating levers, respectively, of the typewriter, said mechanism including a set of solenoids providing a solenoid for each typewriter actuating lever respectively, including a solenoid for said shift lock and release function actuating lever, each of said solenoids including an armature controlled thereby; a lever arm positioned adjacent the solenoid for operating the shift lock and release function actuating lever of the typewriter, the armature of said latter solenoid being operatively coupled to said lever arm; a flexible linkage from said lever arm to the shift lock and release function actuating lever of the typewriter; a latch member movably mounted adjacent said lever arm, said latch member being formed and mounted to automatically engage and releasably lock said lever arm in shift lock function actuated position; and a solenoid having an armature connected with said latch member for actuating the latter member from locked position by energization of said solenoid to release said lever arm for return of said shift function actuating lever to shift release position.

43. In combination, a typewriter having type and function actuating levers, said function actuating levers including a lever for actuating the shift lock and shift release functions of the typewriter; mechanism for selectively operating the shift lock and shift release function actuating lever of the typewriter, said mechanism including a solenoid for operating said shift lock and shift release function actuating lever; a movable member positioned adjacent said solenoid, said solenoid including an armature operatively coupled to said movable member; a flexible connection from the armature of said solenoid to said shift lock and release function actuating lever of the typewriter; a latch member mounted adjacent said movable member and being formed and arranged to automatically engage and releasably lock said movable member in position maintaining said shift actuating lever in shift lock position; and a solenoid for operating said latch member, said solenoid including an armature coupled to said latch member for actuating said latch member to release said movable member by the energization of said solenoid for operation of said shift actuating lever of the typewriter to shift release position.

44. In combination, a typewriter having type actuating and function actuating levers, said function actuating levers including a shift lever for actuating the shift lock and shift release functions of the typewriter; mechanism for selectively operating said type and function actuating levers respectively of the typewriter, said mechanism including a set of solenoids providing a solenoid for each typewriter actuating lever respectively, including a solenoid for said shift lever, each of said solenoids including an armature controlled thereby and flexible linkages connected with said typewriter actuating levers for operation by said armatures, respectively; locking means for releasably locking the flexible linkage to said shift actuating lever in the shift lock position of such lever; and a solenoid including an armature operatively coupled with said locking means for actuation by energization of said solenoid to operate said means to release said shift actuating lever linkage for return of the latter lever to shift release position.

45. In electrically controlled means for selectively operating any actuating member of a plurality of actuating members, in combination, a set of solenoids each including a field coil and an armature, the armatures of said solenoids being adapted to be operatively coupled with the actuating members, respectively, to be operated thereby, certain of said solenoids of said set being arranged into groups with each group comprised of at least four (4) solenoids; a first switch unit for each such groups, respectively, said first switch unit including a contact in electrical connection with one side of the field coils of one pair of solenoids of the group, a contact in electrical connection with the same side of the field coils of the other pair of solenoids of the group, and a switch member for electrical engagement with either of said contacts to close an electrical circuit to one of said pairs of solenoids and open the circuit to the other pair, or to close a circuit to the latter pair and open the circuit to the former pair of solenoids; a second swich unit for each of such groups, respectively, said second switch unit including an electrical contact in electrical connection with the field coil of one of the solenoids of one pair of solenoids of the group at the side of said coil opposite the side to which said first switch unit is connected, a contact in electrical connection with the field coil of one of the solenoids of the other pair of solenoids of the group at the side thereof opposite the side to which said first switch unit is connected, and a switch member for selective electrical engagement with one or the other of said contacts respectively, of said second switch unit to close an electrical circuit to that solenoid connected with such contact and to open the electrical circuit to the solenoid connected to the other of said contacts of said second switch unit; and the field coil of that solenoid of each of said pairs of solenoids which is unconnected to the contact of said second switch unit to which the other solenoid of the pair is connected, being electrically connected to the connection between the field coil of the solenoid of said other pair and the contact of said second switch unit to which the said latter solenoid is connected.

46. In combination, a group of at least four (4) solenoids each having a field coil and an armature controlled thereby; a power line; a first switch unit for said group of solenoids, said first switch unit including a contact in electrical connection with one side of the field coils of one pair of solenoids of the group, a contact in electrical connection with the same side of the field coils of the other pair of solenoids of the group, and a contact connected with said power line, said contacts of said first switch unit being relatively movable to engage said power line contact with either of said other contacts to close an electrical circuit from the power line to one of said pairs of solenoids and to open the circuit to the other pair of solenoids; a second switch unit including a contact in electrical connection with the field coil of one of the solenoids of one pair of such solenoids at the side of said field coil opposite the side to which said first switch unit is connected, a contact in electrical connection with the field coil of one of the solenoids of the other pair of solenoids at the side thereof opposite the side to which said first switch unit is connected, and a contact connected to said power line, said contacts of said second switch unit being relatively movable to engage said power line contact with either of said other contacts of said second switch unit to close an electrical circuit to that solenoid connected with such latter contact and to open the electrical circuit to the solenoid connected to the other of said contacts; and the field coil of that solenoid of each of said pairs of solenoids which is unconnected to the contact of said second switch unit to which the other solenoid of the pair is connected, bein electrically connected to the connection between the field coil of the solenoid of said other pair and that contact of said second switch unit to which the said latter solenoid is connected.

47. In combination, a group of at least four (4) solenoids each including a field coil and an armature controlled thereby; a power line; a first switch unit for said group of solenoids including a contact in electrical connection with the input sides of the field coils of one pair of the solenoids of the group, a contact in electrical connection with the input sides of the field coils of the other pair of solenoids of the group, and a relatively movable contact connected with said power line and being relatively movable to selectively engage either of said other contacts to close an electrical circuit from said power line to one of said pairs of solenoids and to open the circuit from the power line to the other of said pairs of solenoids; a second switch unit including a contact in electrical connection with the output side of the field coil of one of the solenoids of one pair of said solenoids, a contact in electrical connection with the output side of the field coil of one of the solenoids of the other pair of said solenoids, and a relatively movable contact connected with said power line to selectively engage either of said contacts of said second switch unit to close an electrical circuit from the coil of the solenoid connected with such latter contact to the power line and to open the electrical circuit from the coil of the solenoid connected to the other of said contacts to the power line; and the output side of the field coil of the solenoid of each of said pairs of solenoids which is unconnected to the contact of said second switch unit to which the output side of the field coil of the other solenoid of the pair is connected, being electrically connected to the connection between the output side of the field coil of the solenoid of said other pair and that contact of said second switch unit to which the said latter solenoid is connected.

48. In combination, in an electrical organization for selectively operating any one of a group of four (4) solenoids by selectively actuating either one or both of two (2) switches, a group of four solenoids each including a field coil and an armature controlled thereby; a power circuit; a first switch comprising two (2) stationary contacts and a movable contact, one of said stationary contacts being electrically connected with the input sides of the field coils of one pair of solenoids of said group of solenoids, the other stationary contact being electrically connected with the input sides of the field coils of the other pair of said solenoids, and said movable contact being connected into said power circuit and being movable to selectively engage either of said stationary contacts to close a circuit from said power circuit to the field coils of one of said pairs of solenoids and to open the circuit from the power circuit to the other of said pairs of solenoids; a second switch comprising two (2) stationary contacts and a movable contact, one of said stationary contacts of said second switch being electrically connected to the output side of the field coil of one of the solenoids of one of said pairs of solenoids and the other stationary contact of said second switch being electrically connected to the output side of the field coil of one of the solenoids of the other pair of solenoids, and said movable contact of said second switch being connected to said power circuit and being movable to selectively engage either of said stationary contacts of said second switch to close an electrical circuit from the output side of the field coil of the solenoid with which said stationary contact is connected, to said power circuit; and the output side of the field coil of the solenoid of each of said pairs of solenoids which is unconnected to the stationary contact of said second switch to which the other solenoid of such pair is connected, being connected to the connection between the output side of the field coil of the solenoid of the other of said pairs of solenoids and the stationary contact of said second switch to which said solenoid is connected.

49. In combination, in an electrical organization for selectively operating any one of a group of solenoids including a first solenoid, a second solenoid, a third solenoid, and a fourth solenoid, each of said solenoids including a field coil and an armature controlled thereby; a power circuit; a first switch including a stationary contact connected with the input sides of the field coils of said first and said second solenoids, a stationary contact connected with the input sides of the field coils of said third and said fourth solenoids, and a movable contact connected with said power circuit and being selectively operable to engage either of said stationary contacts to close a circuit from said power circuit to either said first and second solenoids or to said third and fourth solenoids; a second switch including a stationary contact electrically connected with the output side of the field coil of said first solenoid, a stationary contact electrically connected with the output side of the field coil of said fourth solenoid, and a movable contact connected with said power circuit and being selectively operable to engage either one or the other of said stationary contacts; and the output side of the field coil of said second solenoid being electrically connected with the output side of the field coil of said fourth solenoid and the output side of the field coil of said third solenoid being electrically connected with the output side of the field coil of said first solenoid.

50. In combination, in an electrical organization for selectively operating any one of a group of solenoids including a first solenoid, a second solenoid, a third solenoid, and a fourth solenoid, each of said solenoids including a field coil and an armature controlled thereby: a power circuit; a first switch including a first contact connected to the input sides of the field coils of said first and second solenoids, a second contact connected with the input sides of the field coils of said third and said fourth solenoids, and a third contact connected to said power circuit, said contacts being relatively movable to selectively engage said third contact with said first contact or to engage said third contact with said second contact; a second switch including a first contact connected with the output side of said field coil of said first solenoid, a second contact connected with the output side of the field coil of said fourth solenoid, and a third contact connected with said power circuit, said contacts of said second switch being relatively movable to selectively engage said third contact with either said first contact or said second contact; and the output side of the field coil of said second solenoid being connected with the output side of the field coil of said fourth solenoid and the output side of the field coil of said third solenoid being connected with the output side of the field coil of said first solenoid.

51. In combination, in an electrical organization for selectively operating any one of a group of solenoids including a first solenoid, a second solenoid, a third solenoid, and a fourth solenoid, each of said solenoids including a field coil and an armature controlled thereby; a first switch including a stationary contact connected with the input sides of the field coils of said first and second solenoids, a stationary contact connected with the input sides of the field coils of said third and fourth solenoids, and a movable contact operable to engage either of said stationary contacts to close a circuit to either said first and second solenoids or to said third and fourth solenoids; a second switch including a stationary contact electrically connected with the output side of the field coil of said first solenoid, a stationary contact electrically connected with the output side of the field coil of said fourth solenoid, and a movable contact selectively operable to engage either one or the other of said stationary contacts; the output side of the field coil of said second solenoid being electrically connected with the output side of the field coil of said fourth solenoid and the output side of the field coil of said third solenoid being electrically connected with the output side of the field coil of said first solenoid; and said movable contact of the first switch and said movable contact of said second switch each being formed and arranged when in normal inactive opsition to be in engagement with either one or the other of said stationary contacts with which such movable contact is associated.

52. In mechanism for selectively controlling the functions of a typewriter from a keyboard separate from the typewriter, in combination, a set of solenoids adapted to be operatively coupled with the actuating levers, respectively, of a typewriter, a set of electrical relays for permutable operation for selectively and separately controlling the operating functions of said solenoids, respectively, a keyboard comprising a set of key levers, a set of code bars having sets of code projections thereon adapted to be engaged by each key lever, respectively, of said keyboard to actuate a coding permutation of said code bars, a set of electrical switches adapted to be permutably actuated by the projections, respectively, of code bars operated by said key levers, and electrical circuits connecting said switches with said relays for selective conditioning by the permutable operation of said switches to permutably operate said relays.

53. In combination, a typewriter including type bar actuating levers and typewriter function actuating levers; mechanism for selectively operating the type bar actuating and function actuating levers, respectively, of the typewriter; said mechanism including a series of solenoids each having an armature controlled thereby, the armatures of said solenoids being connected with the type bar actuating and the typewriter function actuating levers, respectively, of the typewriter; a key board separate from said typewriter and including manually operable keys corresponding to the type bar and function actuating levers, respectively, of the typewriter; a perforating mechanism adapted for selective operation to encode a message as a series of code arranged perforations in a record, said perforating mechanism including a set of perforating punches, a series of solenoids each having an armature controlled thereby, said armatures being coupled with said punches, respectively; electrical circuits for energizing the solenoids of the mechanism for operating the actuating levers, respectively, of the typewriter; electrical circuits for energizing the punch actuating solenoids of said perforating mechanism; a series of movable electrical contacts in said circuits; a series of relays for selective operation to selectively actuate said contacts for opening and closing said solenoid energizing circuits; and means selectively operated by manual operation of keys of said separate key board for energizing permutations of said relays to actuate the respective contacts in said electrical circuits controlled by such relays, to set up simultaneously circuits for energizing a selected solenoid of the typewriter lever actuating mechanism and to energize a selected permutation of punch solenoids of said perforating mechanism, to cause the typewriter lever actuating mechanism to actuate that lever of the typewriter and the perforating mechanism to punch simultaneously that arrangement of code perforations in a record, respectively, corresponding to the typewriter printing character or function represented by a manually operated key of said separate key board.

54. In a mechanism for selectively controlling the functions of a typewriter from a perforated record, in combination, a series of levers corresponding to the type actuating levers and the typewriter function actuating levers, respectively, of a typewriter; mechanism for selectively operating the type actuating and typewriter function actuating levers, respectively, of a typewriter; said mechanism including a series of solenoids each having an armature actuated by the energization of the solenoid, the armature of said solenoids being adapted to be connected with the actuating levers of a typewriter; a record feeding and perforating mechanism operable to feed a record and to encode a message as successive sets of code arranged perforations punched in the record; said perforating mechanism including a set of record perforating punches and a solenoid for actuating each punch; a record feeding means; a solenoid for controlling the operation of said feeding means to feed the record step by step to said punch; electrical circuits to the solenoids of said typewriter lever actuating mechanism for energizing said solenoids; electrical circuits to the solenoids of said punches for energizing such solenoids; an electrical circuit for energizing the solenoid of the record feeding means of said perforating mechanism; means controlled from and in accordance with the levers respectively operated of said series of levers, for selectively setting up said electrical circuits to cause simultaneous operation of said record feeding and perforating mechanism and of said mechanism for operating the actuating levers of a typewriter; and a controlling switch in the circuit for the solenoid of the record feeding means for opening and closing said circuit independently of the energizing circuits to the punch solenoids for effecting actuation of said record feeding means to feed a record relative to, but without effecting operation of, said punches.

55. In combination, mechanism for selectively operating the type bar actuating and function actuating levers, respectively, of a typewriter, said mechanism including a series of solenoids each having an armature controlled thereby, the armatures of said solenoids being adapted to be connected with the type bar actuating and the typewriter function actuating levers, respectively, of a typewriter, a perforated tape translating mechanism for translating a record tape having a message encoded therein as successive sets of code arranged perforations, electrical circuits for energizing the solenoids of the mechanism for operating the typewriter levers, respectively, of a typewriter, electrical circuits controlled by said translating mechanism for permutable closing thereof in accordance with each code arranged set of perforations in a record tape presented for translation, to set up said solenoid energizing circuits to energize a selected solenoid, record tape perforating mechanism for encoding a message as a series of sets of code arranged perforations in a tape, said perforating mechanism including a set of tape perforating punches and solenoids are actuating said punches, respectively, electrical circuits for energizing the punch actuating solenoids of said punch solenoid circuits for selectively setting up said circuits to energize permutations of said punch solenoids, selectively controllable means in said punch solenoid circuits for selectively setting up said circuits to energize permutations, respectively of said solenoids, and said means being controlled from and being selectively set up in accordance with the circuits respectively set up by said translating mechanism to cause operation simultaneously of the perforating mechanism and of said translating mechanism.

56. In combination, a keyboard comprising a set of manually operable keys, including keys corresponding to the type actuating levers and function actuating levers, respectively, of a typing unit; mechanism adapted to be coupled with the type actuating and function actuating levers of a typing unit and being operable to selectively operate said actuating levers, respectively; said keyboard being separate from a typing unit with which said mechanism may be coupled; a record perforating mechanism operable to encode a message as successive sets of code perforations in a record corresponding to the code designations, respectively, for the typing characters and typing unit functions of which the message is composed; means selectively controlled by the manual operation of the keys of said separate key board for causing selective operation of said typing unit actuating lever operating mechanism in accordance with the operation of the keys, respectively, of said separate key board, and for causing simultaneous selective operation of said record perforating mechanism to cause such mechanism to punch code arranged perforations in a record corresponding to a code for the manually operated keys, respectively, of said separate key board; perforated record translating mechanism for translating a record having a message encoded as sets of code arranged perforations therein, said translating mechanism being operatively associated with said mechanism for selectively operating the typing unit actuating levers to cause said latter mechanism to select out and actuate the levers of a typing unit corresponding to the sets of code perforations being translated by said translating mechanism; and means selectively controlled by the operation of said translating mechanism to actuate said typing unit lever operating mechanism to cause simultaneous operation of the perforating mechanism to form sets of code perforations in a record in the perforating mechanism, duplicating the sets of code perforation, respectively, in the record being translated.

57. In an electrical organization for selectively operating any one of a group of at least four (4) solenoids, by selectively actuating either one or both of two (2) switches, in combination, a group of at least four (4) solenoids each including a field coil and an armature controlled thereby; a power circuit; a first switch comprising a stationary contact electrically connected to the input side of the field coils of one pair of said solenoids, a stationary contact electrically connected to the input side of the field coils of the other pair of solenoids, and a movable contact connected in the input side of said power circuit and being selectively operable to alternately engage either of said stationary contacts; a second switch including a stationary contact electrically connected directly to the output side of the field coil of one of the solenoids of one of said pairs of solenoids; a stationary contact electrically connected directly to the output side of the field coil of one of the solenoids of the other pair of said solenoids, and a movable contact connected with said power circuit and being selectively operable to alternately engage either of said stationary contacts of said second switch; and an electrical connection indirectly connecting the output side of said power circuit with that solenoid of each pair of said solenoids which is not directly connected to a stationary contact of said second switch.

58. In electrically controlled mechanism for selectively operating any actuating member of a plurality of actuating members, in combination, a plurality of solenoids each including a field coil and an armature controlled thereby; a power line; electrical connections between said power line and the input sides of the field coils of said solenoids; a single switch unit in the connections between said power line and the input sides of said solenoids, said switch unit being constructed and arranged for selective operation to either close a circuit through said connections from said power line to one pair of said solenoids and to open a circuit therethrough from said power line to the other pair of said solenoids, or to close the circuit to said latter pair and open the circuit to said former pair of said solenoids; electrical connections directly connecting said power line with the output sides of the field coils of one of the solenoids of each of said pairs of solenoids and electrical connections indirectly connecting said power line with the output sides of the field coils of the other of the solenoids of each of said pairs of solenoids a single switch unit connected in said electrical connections between the output sides of said field coils and said power lines; and said second mentioned switch unit being constructed and arranged for selective operation to either close the circuit from said power line to the field coil of one solenoid of said first mentioned pair of solenoids and to open a circuit from the field coil of one solenoid of said second mentioned pair of solenoids, or to open the circuit from said power line to said first mentioned solenoid and close the circuit from said power line to said second mentioned solenoid.

59. In electrically controlled mechanism for selectively operating any actuating member of a plurality of actuating members, in combination, a plurality of solenoids each including a field coil and an armature controlled thereby; a power line; electrical connections from said power line to the input sides of the field coils of said solenoid; a first switch unit connected in said electrical connections and being constructed and arranged for selective operation to either close a circuit from said power line through said electrical connections to one pair and to open a circuit to another pair of said solenoids, or to close the circuit to said latter pair and open the circuit to said former pair of solenoids; electrical connections for directly connecting said power line with the output side of one solenoid of each of said pairs of solenoids and for indirectly connecting said power line with the output side of the field coil of the other solenoid of each of said pairs of solenoids; a second switch unit connected in said electrical connections from said power line to the output sides of said solenoids; and said second switch unit being constructed and arranged for selective operation to either close the circuit to said power line from the output side of one solenoid of each of said pairs of solenoids and to open a circuit from the output side of the other solenoid of each of said pairs of solenoids, or to close the circuit to said power line from said latter solenoid and open the circuit to said power line from said former solenoid.

60. In combination, a plurality of electrically controlled mechanisms; a power line; electrical connections from said power line to the input sides of said electrically controlled mechanisms; a switch unit connected in said electrical connections from said power line to the input sides of said mechanisms and said switch unit being constructed and arranged for selective operation to either close a circuit from said power line through said electrical connections to one pair and to open a circuit to another pair of said electrically controlled mechanisms, or to close the circuit to said latter pair and open the circuit to said former pair of said mechanisms; electrical connections for directly connecting said power line with the output side of one mechanism of each of said pairs of electrically controlled mechanisms and for indirectly connecting said power line with the output side of the other mechanism of each of said pairs of mechanisms; a second switch unit connected in said electrical connections from said power line to the output sides of said electrically controlled mechanisms and said second switch unit being constructed and connected for selective operation to either close the circuit to said power line from the output side of one electrically controlled mechanism of each of said pairs of mechanisms and to open a circuit from the output side of the other mechanism of each of said pairs of mechanisms, or to close the circuit to said power line from said latter mechanism and open the circuit to said power line from said former mechanism; and said first mentioned switch unit and said second switch unit each being selectively operable independently of the other.

ARTHUR H. BUCKLEY.

REFERENCES CITED

The following references are of record in the file of this patent:

UNITED STATES PATENTS

| Number | Name | Date |
|---|---|---|
| 638,591 | Murray | Dec. 5, 1889 |
| 848,653 | Hutches, Jr. | Apr. 2, 1907 |
| 888,807 | Hutches | May 26, 1908 |
| 964,678 | Nicholas | July 19, 1910 |
| 983,254 | Swing | Jan. 31, 1911 |
| 1,034,131 | Main | July 30, 1912 |
| 1,194,357 | Cardwell | Aug. 15, 1916 |
| 1,292,944 | Wright | Jan. 28, 1919 |
| 1,520,478 | More | Dec. 23, 1924 |
| 1,717,819 | Von Boeckmann | June 18, 1929 |
| 1,800,596 | Bryce | Apr. 14, 1931 |
| 1,827,362 | Hiltz | Oct. 31, 1931 |
| 1,848,106 | Carroll | Mar. 8, 1932 |
| 1,896,554 | Peirce | Feb. 7, 1933 |
| 1,969,045 | Smith | Aug. 7, 1934 |
| 1,975,791 | Hopkins | Oct. 9, 1934 |
| 1,985,101 | Lasker | Dec. 18, 1934 |
| 2,002,516 | Ackerman | May 28, 1935 |
| 2,003,636 | Maul | Oct. 9, 1935 |
| 2,018,420 | Robinson | Oct. 22, 1935 |
| 2,181,999 | Mills | Dec. 5, 1939 |
| 2,183,820 | Nelson | Dec. 19, 1939 |
| 2,199,541 | Harrison | May 7, 1940 |
| 2,240,562 | Lake et al. | May 6, 1941 |
| 2,318,299 | Doty | May 4, 1943 |
| 2,377,205 | Bickley | May 29, 1945 |
| 2,377,801 | Mills | June 5, 1945 |
| 2,378,371 | Tholstrup | June 12, 1945 |
| 2,390,413 | Ayres | Dec. 4, 1945 |